(12) United States Patent
Kume et al.

(10) Patent No.: US 12,741,645 B2
(45) Date of Patent: Sep. 22, 2026

(54) HMI CONTROL APPARATUS AND DRIVING CONTROL APPARATUS

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 454 days.

(21) Appl. No.: 18/318,020

(22) Filed: May 16, 2023

(65) Prior Publication Data

US 2023/0286509 A1 Sep. 14, 2023

Related U.S. Application Data

(63) Continuation of application No. PCT/JP2021/034869, filed on Sep. 22, 2021.

(30) Foreign Application Priority Data

Nov. 20, 2020 (JP) ................................ 2020-193417
Jun. 15, 2021 (JP) ................................ 2021-099467

(51) Int. Cl.
*B60K 35/10* (2024.01)
*B60K 35/28* (2024.01)
(Continued)

(52) U.S. Cl.
CPC ...... *B60W 30/18163* (2013.01); *B60W 10/20* (2013.01); *B60W 30/12* (2013.01); *B60W 50/14* (2013.01); *B60W 2420/403* (2013.01)

(58) Field of Classification Search
CPC ........ B60K 2360/166; B60K 2360/172; B60K 35/28; B60K 2360/1438; B60K 2360/175; B60K 35/10; B60W 2540/215; B60W 60/0051; B60W 2050/146; B60W 2552/05; B60W 2552/10; B60W 30/18163;
(Continued)

(56) References Cited

U.S. PATENT DOCUMENTS 9,487,139 B1 * 11/2016 Ishida .................. B60W 30/08
2017/0372608 A1 * 12/2017 Sugimoto ............ G08G 1/0145
(Continued)

FOREIGN PATENT DOCUMENTS

JP 2008032603 A 2/2008
JP 2011162132 A 8/2011
(Continued)

*Primary Examiner* — Hossam M Abd El Latif
(74) *Attorney, Agent, or Firm* — Harness, Dickey & Pierce, P.L.C.

(57) ABSTRACT

A human machine interface (HMI) control apparatus configured to control an HMI apparatus mounted on a host vehicle, is configured to acquire lane information including a presence state of an adjacent lane adjacent to a currently traveling lane of the host vehicle; and present, using the HMI apparatus, automation related information based on the acquired lane information. The automation related information corresponds to a driving automation level that is executable or a driver requirement that is required to be executed by a driver, regarding the adjacent lane or a lane change from the currently traveling lane to the adjacent lane.

16 Claims, 23 Drawing Sheets

(51) Int. Cl.

| | |
|---|---|
| ***B60W 10/20*** | (2006.01) |
| ***B60W 30/12*** | (2020.01) |
| ***B60W 30/18*** | (2012.01) |
| ***B60W 50/14*** | (2020.01) |
| ***B60W 60/00*** | (2020.01) |
| ***G08G 1/16*** | (2006.01) |

(58) Field of Classification Search

CPC ...... B60W 10/20; B60W 30/12; B60W 50/14; B60W 2420/403; G08G 1/16

USPC ........................................................... 701/23

See application file for complete search history.

(56) References Cited

U.S. PATENT DOCUMENTS

| | | | |
|---|---|---|---|
| 2018/0052458 A1 | | 2/2018 | Tsuji et al. |
| 2018/0074497 A1 | | 3/2018 | Tsuji et al. |
| 2018/0093676 A1 | | 4/2018 | Emura et al. |
| 2018/0105185 A1 | | 4/2018 | Watanabe et al. |
| 2018/0105186 A1 | | 4/2018 | Motomura et al. |
| 2018/0113474 A1 | | 4/2018 | Koda et al. |
| 2019/0039627 A1 | * | 2/2019 | Yamamoto .......... B60W 50/082 |
| 2019/0168772 A1 | | 6/2019 | Emura et al. |
| 2019/0283770 A1 | | 9/2019 | Kubota et al. |
| 2020/0082793 A1 | * | 3/2020 | Ichinokawa ........... B60K 35/23 |
| 2020/0231159 A1 | * | 7/2020 | Tsuji ...................... G08G 1/167 |
| 2021/0339770 A1 | * | 11/2021 | Tamori .............. B60W 60/0015 |
| 2022/0100202 A1 | * | 3/2022 | Koda .................. G05D 1/0285 |

FOREIGN PATENT DOCUMENTS

| | | | |
|---|---|---|---|
| JP | 2017132332 | A | 8/2017 |
| JP | 2019001350 | A | 1/2019 |
| JP | 2019145175 | A | 8/2019 |
| JP | 2019156265 | A | 9/2019 |
| JP | 2020114699 | A | 7/2020 |
| WO | WO-2016170763 | A1 | 10/2016 |

* cited by examiner

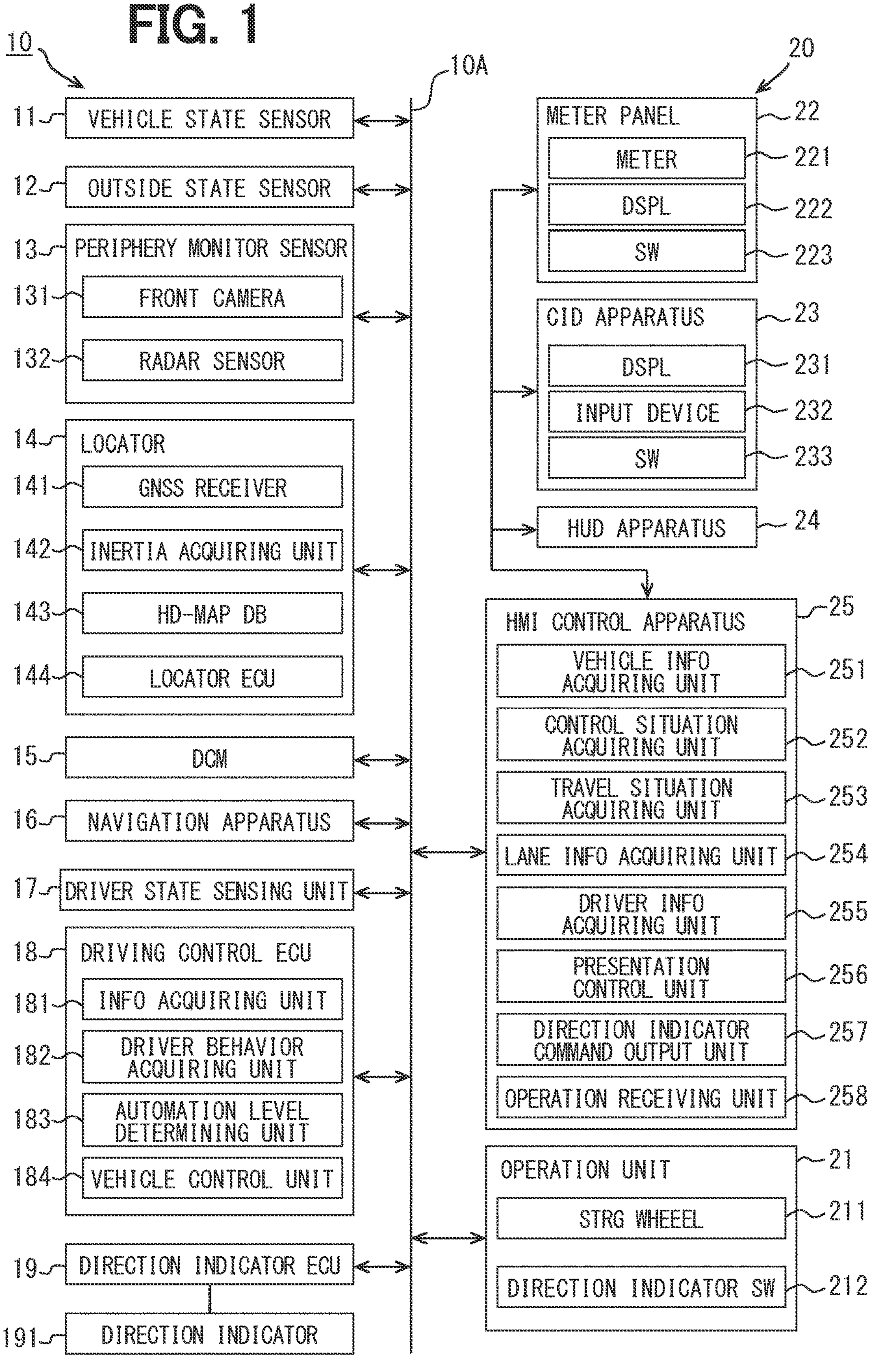
FIG. 1
10
10A
20
11 VEHICLE STATE SENSOR
12 OUTSIDE STATE SENSOR
13 PERIPHERY MONITOR SENSOR
131 FRONT CAMERA
132 RADAR SENSOR
14 LOCATOR
141 GNSS RECEIVER
142 INERTIA ACQUIRING UNIT
143 HD-MAP DB
144 LOCATOR ECU
15 DCM
16 NAVIGATION APPARATUS
17 DRIVER STATE SENSING UNIT
18 DRIVING CONTROL ECU
181 INFO ACQUIRING UNIT
182 DRIVER BEHAVIOR ACQUIRING UNIT
183 AUTOMATION LEVEL DETERMINING UNIT
184 VEHICLE CONTROL UNIT
19 DIRECTION INDICATOR ECU
191 DIRECTION INDICATOR
22 METER PANEL
221 METER
222 DSPL
223 SW
23 CID APPARATUS
231 DSPL
232 INPUT DEVICE
233 SW
24 HUD APPARATUS
25 HMI CONTROL APPARATUS
251 VEHICLE INFO ACQUIRING UNIT
252 CONTROL SITUATION ACQUIRING UNIT
253 TRAVEL SITUATION ACQUIRING UNIT
254 LANE INFO ACQUIRING UNIT
255 DRIVER INFO ACQUIRING UNIT
256 PRESENTATION CONTROL UNIT
257 DIRECTION INDICATOR COMMAND OUTPUT UNIT
258 OPERATION RECEIVING UNIT
21 OPERATION UNIT
211 STRG WHEEEL
212 DIRECTION INDICATOR SW

FIG. 2

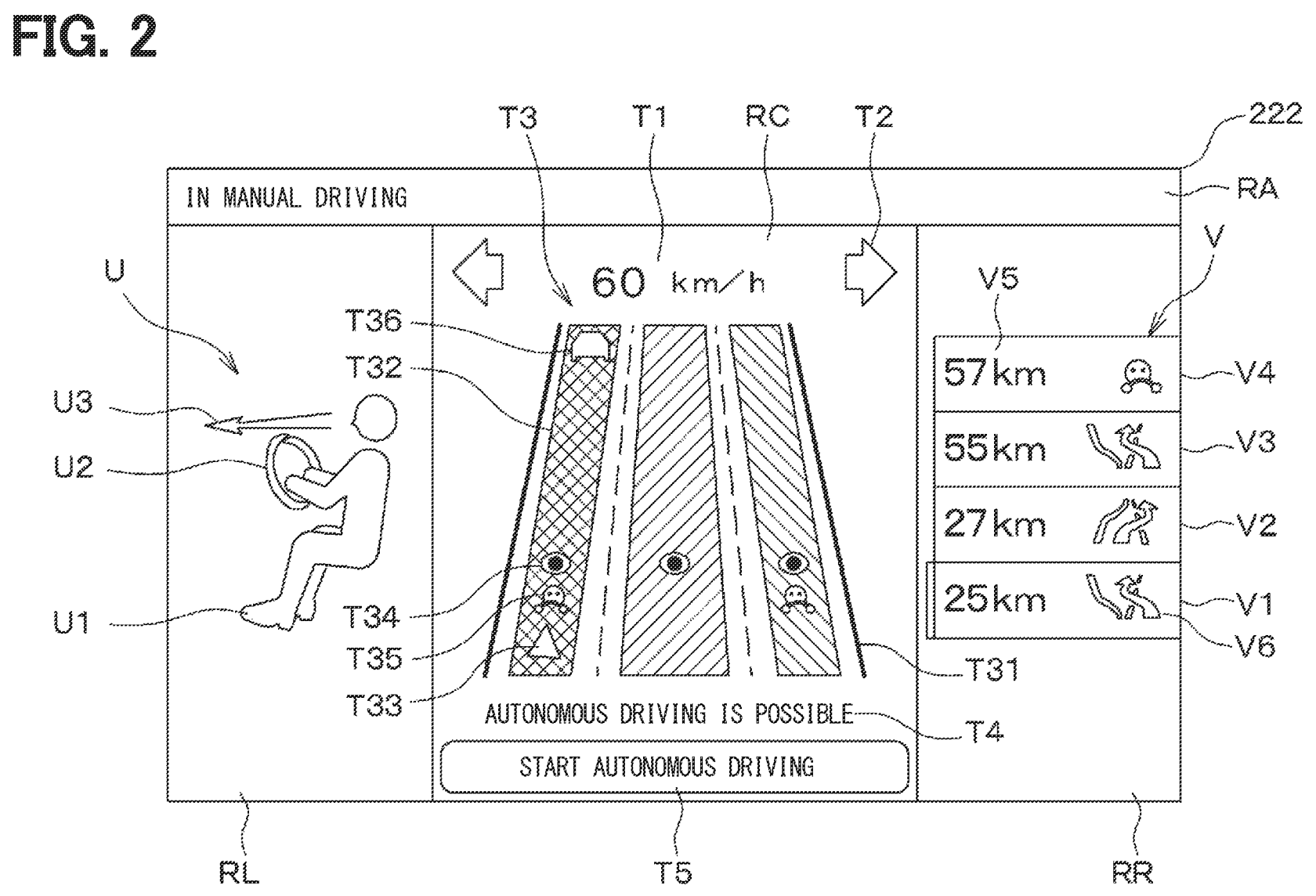

222
RA
V
V4
V3
V2
V1
V6
RR
V5
57km
55km
27km
25km
T31
T4
T2
RC
T1
60 km/h
T3
AUTONOMOUS DRIVING IS POSSIBLE
START AUTONOMOUS DRIVING
T5
IN MANUAL DRIVING
T36
T32
T34
T35
T33
U
U3
U2
U1
RL

T3
T1
RC
T2
222
RA
IN HANDS-OFF DRIVING
U
70 km/h
V
V5
T32
55km
V4
U3
53km
V3
U2
25km
V2
U1
T34
23km
V1
V6
T33
T31
RL
RR

222
RA
V
V4
V3
V2
V1
V6
RR
V5
53km
51km
23km
21km
T2
RC
T1
T3
60 km/h
T31
T4
T34
T35
AUTONOMOUS DRIVING SWITCH OPERATED
START AUTONOMOUS DRIVING
T5
IN HANDS-OFF DRIVING
T36
T32
T33
U
U3
U2
U1
RL

FIG. 10

IN HANDS-OFF DRIVING 60 km/h

LANE CHANGE WILL BE STARTED

IN HANDS-OFF DRIVING 60 km/h

Figure 13:
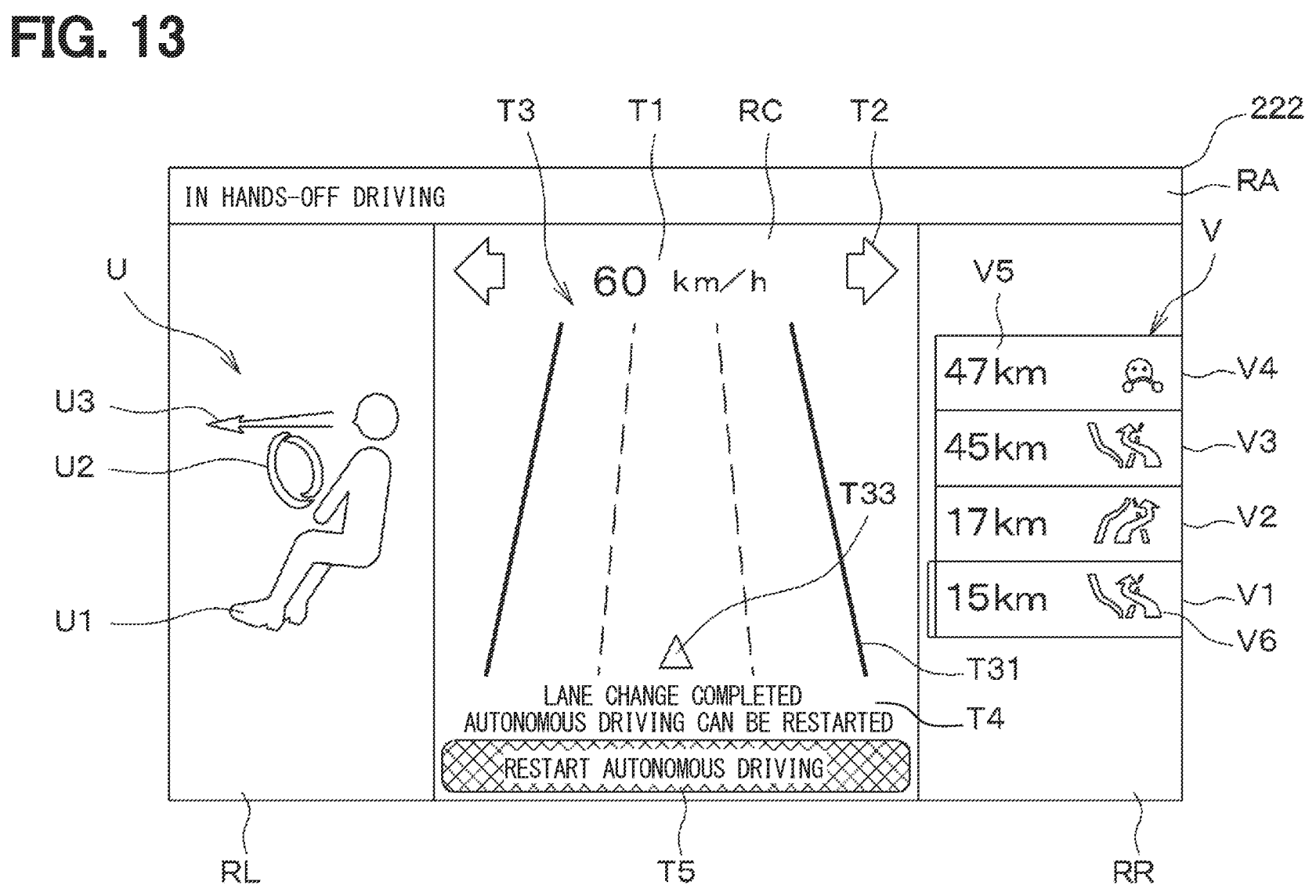

LANE CHANGE COMPLETED
AUTONOMOUS DRIVING CAN BE RESTARTED

RESTART AUTONOMOUS DRIVING

IN HANDS-OFF DRIVING 70 km/h 9.5km 7.5km

Figure 14:
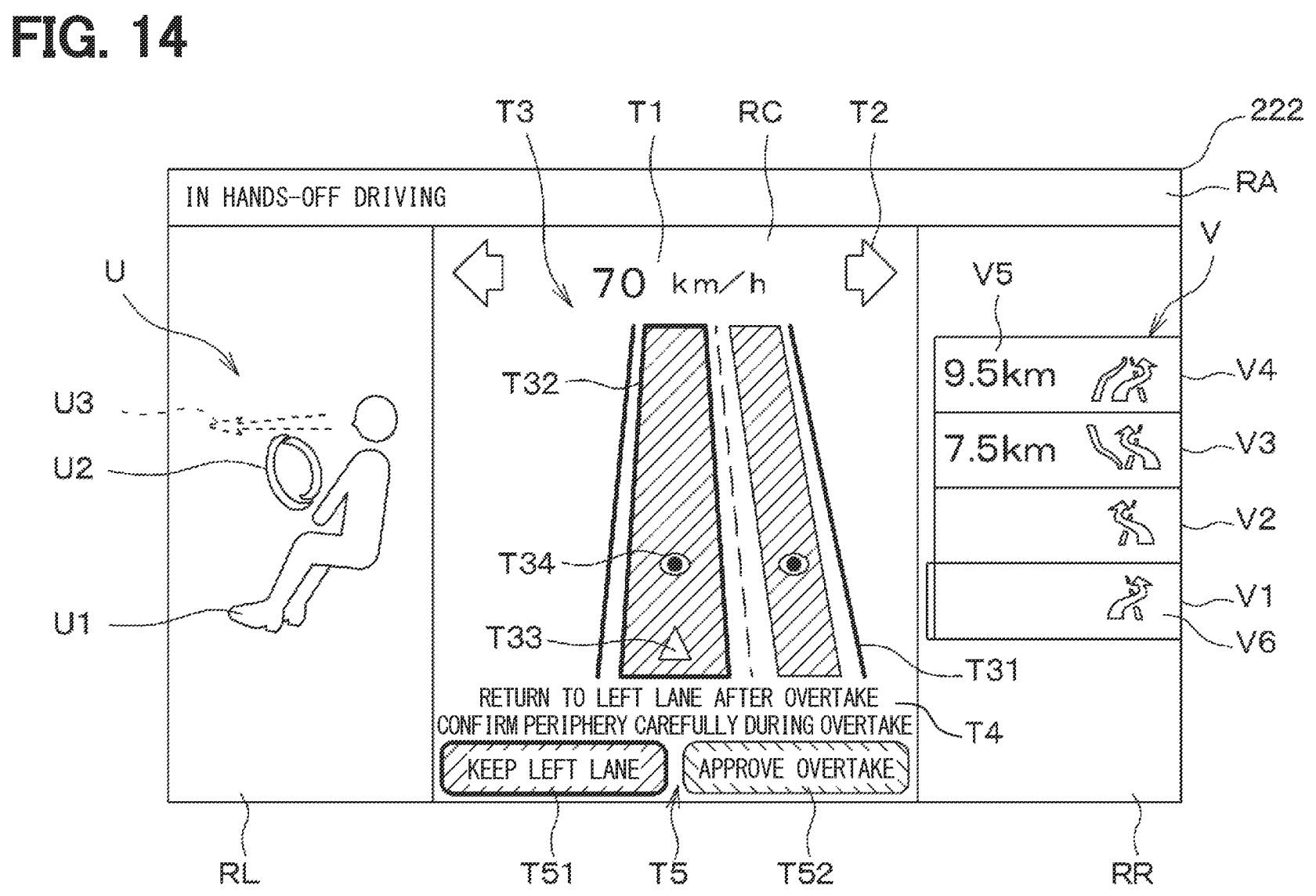

RETURN TO LEFT LANE AFTER OVERTAKE

CONFIRM PERIPHERY CAREFULLY DURING OVERTAKE

KEEP LEFT LANE

APPROVE OVERTAKE

Figure 15:
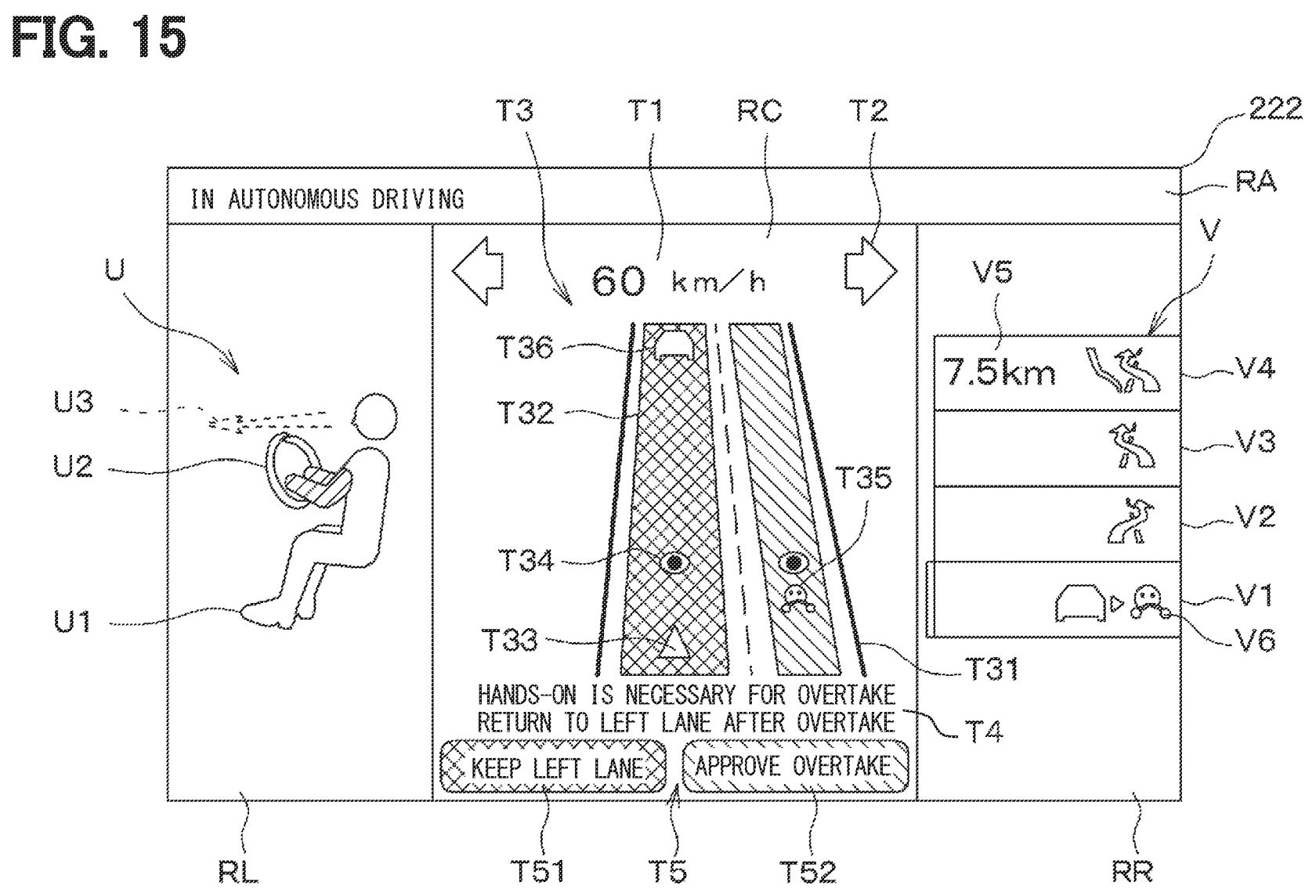

222
RA
IN AUTONOMOUS DRIVING
RC
60 km/h
T1
T2
T3
RL
U
U1
U2
U3
V
V1
V2
V3
V4
V5
V6
7.5km
RR
T31
T32
T33
T34
T35
T36
HANDS-ON IS NECESSARY FOR OVERTAKE
RETURN TO LEFT LANE AFTER OVERTAKE
T4
KEEP LEFT LANE
APPROVE OVERTAKE
T5
T51
T52

FIG. 16

222
RA
V
V4
V3
V2
V1
V6
RR
V5
37km
35km
7.0km
5.0km
T2
T35
T34
RC
km/h
60
T1
T5
T3
IN AUTONOMOUS DRIVING
T36
T32
T31
T33
RL
U
U2
U1

B
S1713
LV3?
NO
YES
NOTIFY SWITCH TO LV2
S1714
S1715
TRAVEL PURPOSE LANE?
NO
YES
NOTIFY SWITCH TO HANDS-ON DRIVING
S1716
S1717
NOTIFIED CONTENTS PERFORMED?
NO
YES
S1718
DIRECTION INDICATOR ON?
NO
YES
S1719
DIRECTION INDICATOR SWITCHING-OFF INTERRUPTION
START LC CONTROL
DISPLAY LC EXECUTION INFO
S1721
S1720
CONTINUE NOTIFICATION FOR PREDETERMINED TIME
C

FIG. 18

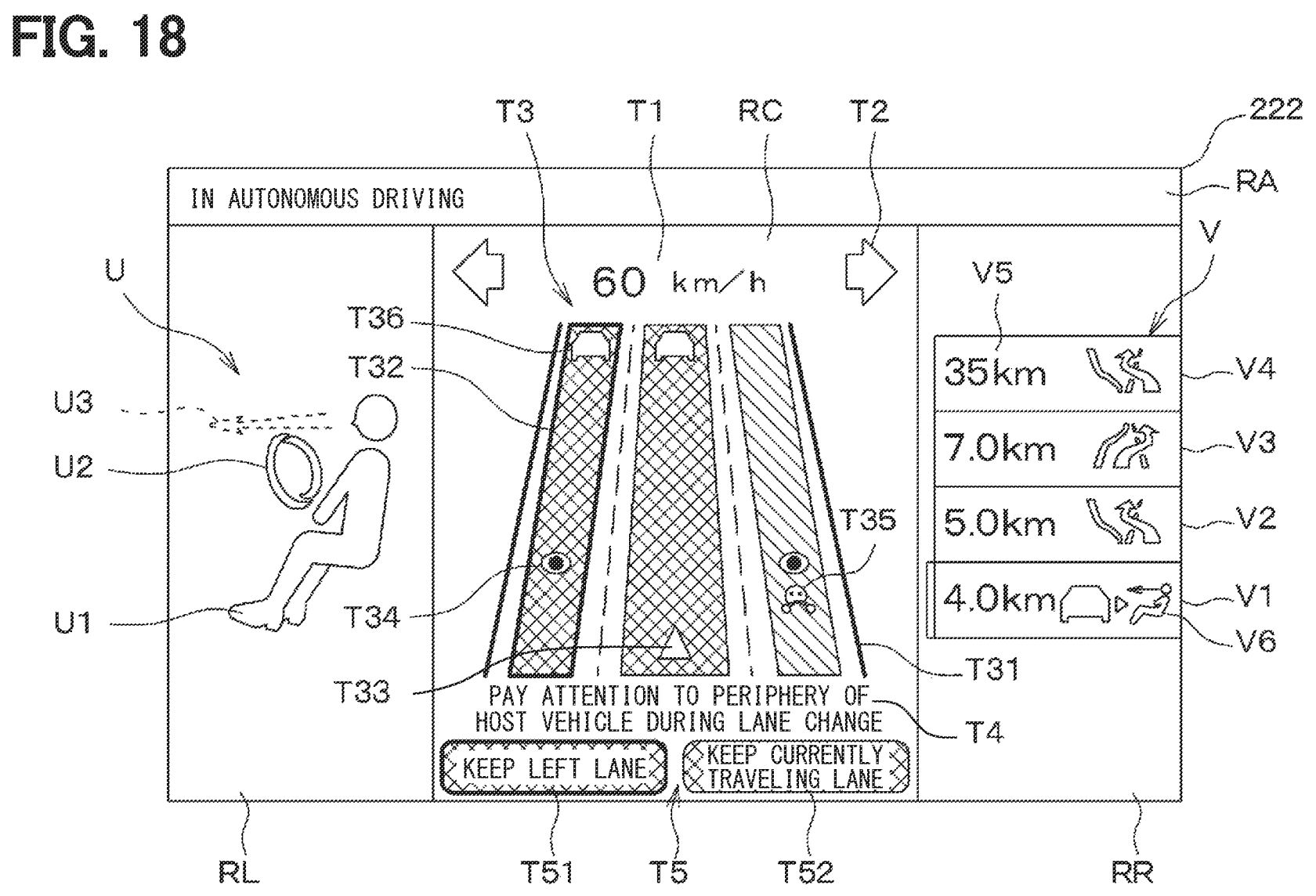

IN AUTONOMOUS DRIVING 60 km/h

PAY ATTENTION TO PERIPHERY OF HOST VEHICLE DURING LANE CHANGE

KEEP LEFT LANE

KEEP CURRENTLY TRAVELING LANE

IN AUTONOMOUS DRIVING 60 km/h

Figure 19:
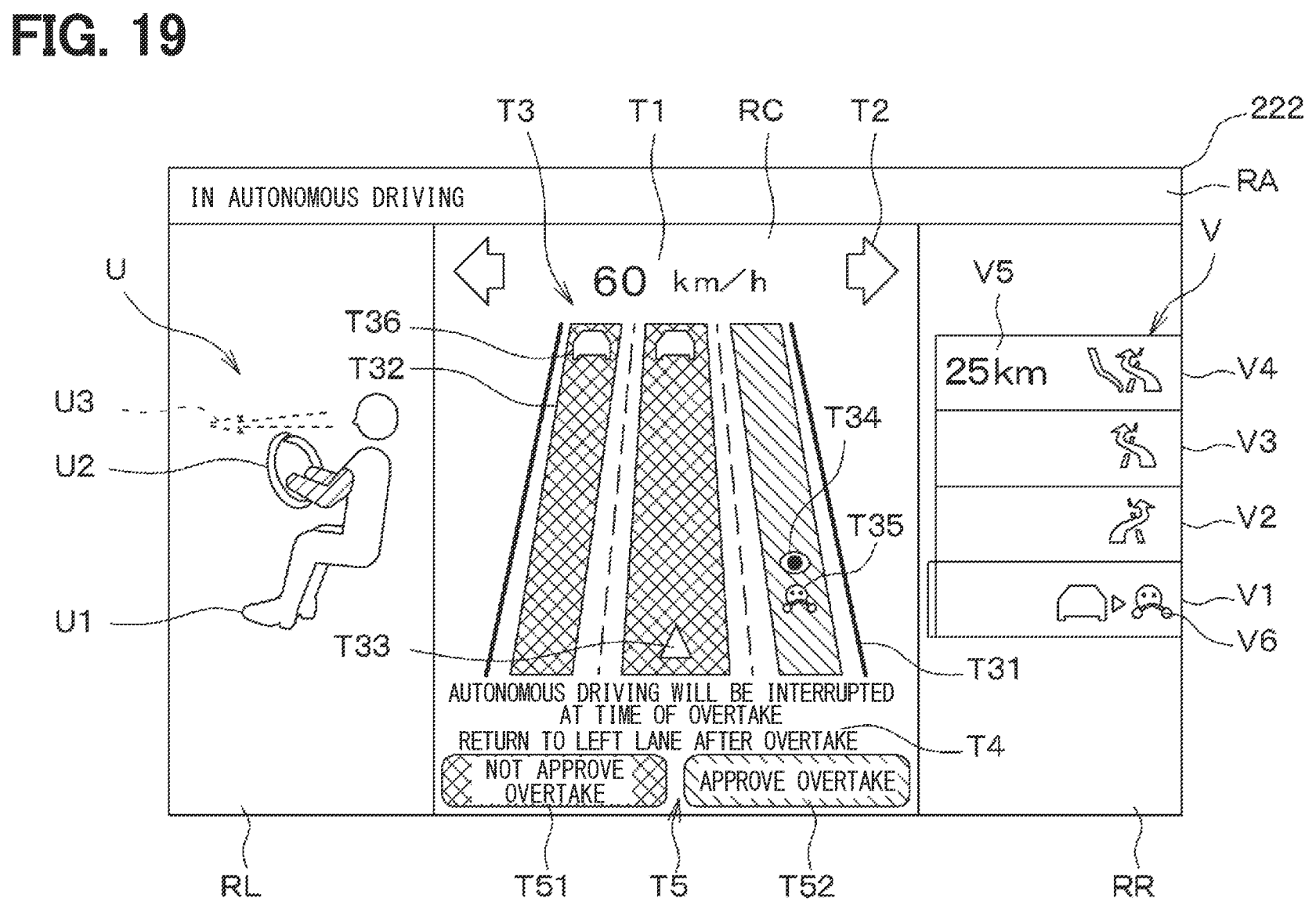

25km

AUTONOMOUS DRIVING WILL BE INTERRUPTED AT TIME OF OVERTAKE

RETURN TO LEFT LANE AFTER OVERTAKE

NOT APPROVE OVERTAKE

APPROVE OVERTAKE

222 RA V V4 V3 V2 V1 V6 V5 RR T2 RC T1 T3 T31 T4 T34 T35 T52 T5 T51 T36 T32 T33 U U3 U2 U1 RL

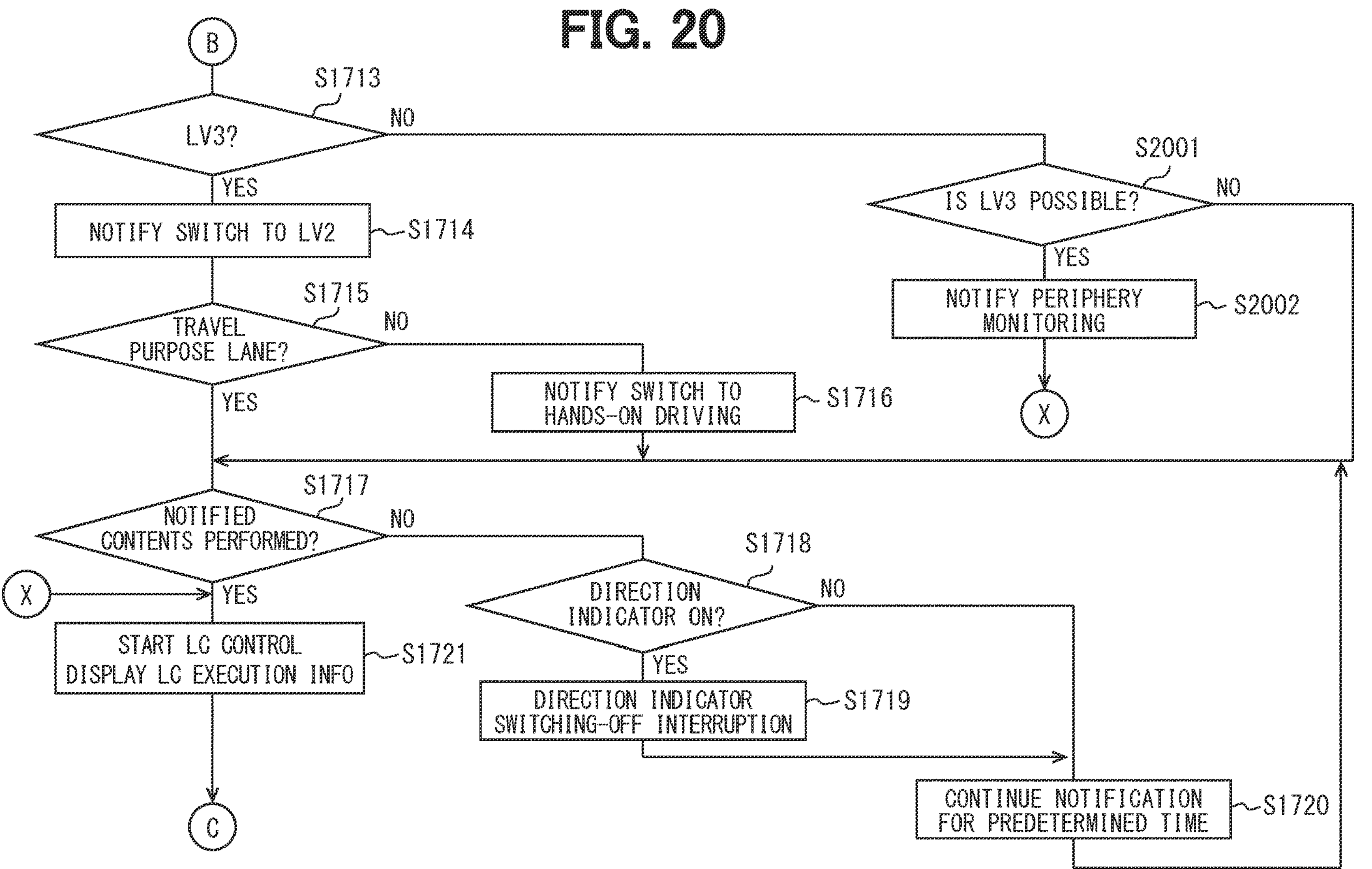
FIG. 20
B
S1713
LV3?
YES
NO
NOTIFY SWITCH TO LV2
S1714
S1715
TRAVEL PURPOSE LANE?
YES
NO
NOTIFY SWITCH TO HANDS-ON DRIVING
S1716
S1717
NOTIFIED CONTENTS PERFORMED?
YES
NO
X
START LC CONTROL
DISPLAY LC EXECUTION INFO
S1721
C
S2001
IS LV3 POSSIBLE?
YES
NO
NOTIFY PERIPHERY MONITORING
S2002
X
S1718
DIRECTION INDICATOR ON?
YES
NO
DIRECTION INDICATOR SWITCHING-OFF INTERRUPTION
S1719
CONTINUE NOTIFICATION FOR PREDETERMINED TIME
S1720

Figure 21:
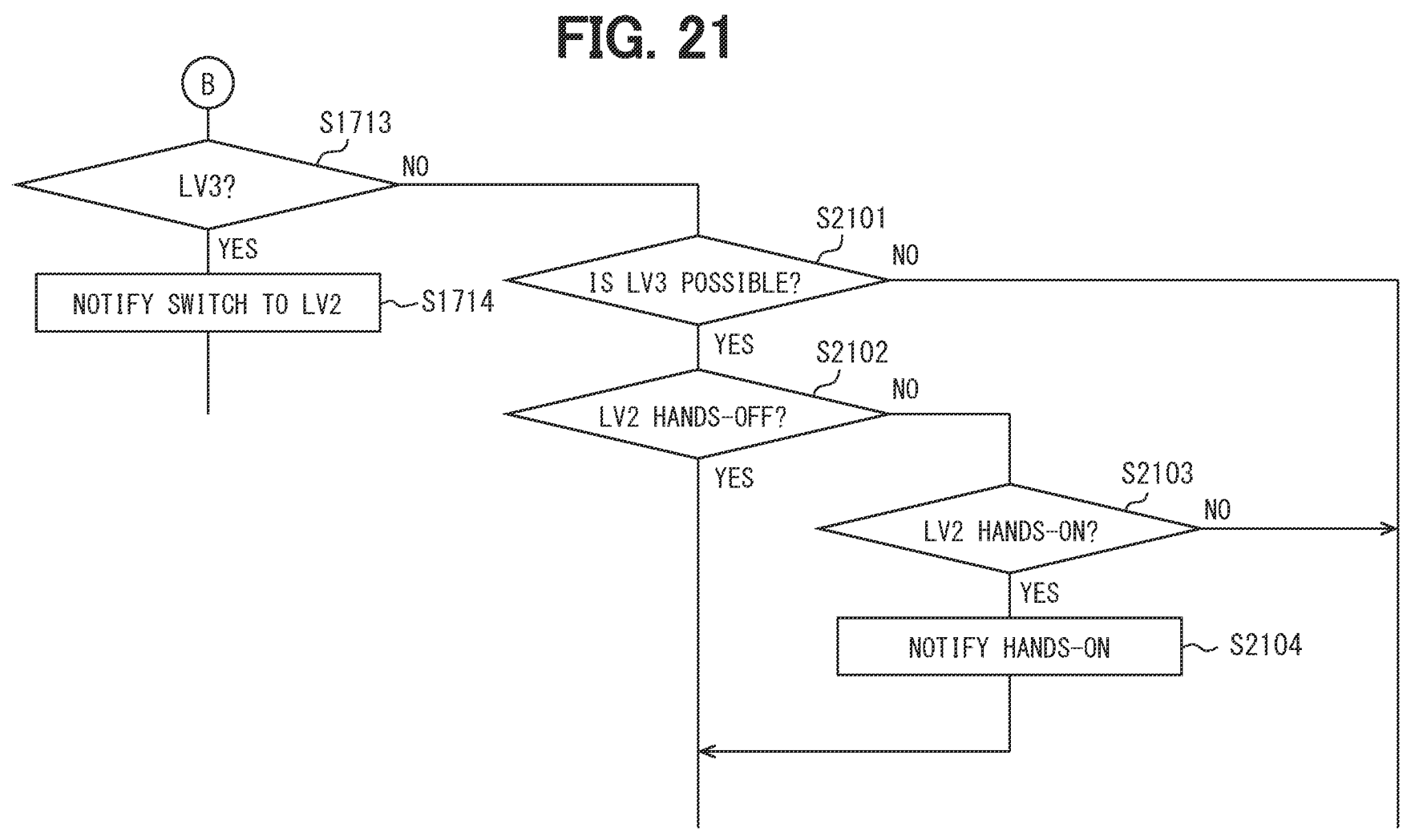

YES

NO

S1714 NOTIFY SWITCH TO LV2

S2101 IS LV3 POSSIBLE?

YES

NO

S2102 LV2 HANDS-OFF?

YES

NO

S2103 LV2 HANDS-ON?

YES

NO

S2104 NOTIFY HANDS-ON

HMI CONTROL APPARATUS AND DRIVING CONTROL APPARATUS

CROSS REFERENCE TO RELATED APPLICATIONS

The present application is a continuation application of International Patent Application No. PCT/JP2021/034869 filed on Sep. 22, 2021, which designated the U.S. and claims the benefits of priority from Japanese Patent Application No. 2020-193417 filed on Nov. 20, 2020 and Japanese Patent Application No. 2021-099467 filed on Jun. 15, 2021. The entire disclosures of all of the above applications are incorporated herein by reference.

TECHNICAL FIELD

The present disclosure relates to an human machine interface (HMI) control apparatus that controls an HMI apparatus mounted on a vehicle. The present disclosure also relates to a driving control apparatus that controls driving of a vehicle.

BACKGROUND

Conventionally, various techniques for sensing a road situation and performing lane change control on the basis of the sensed road situation have been conventionally proposed. For example, the in a known autonomous driving apparatus, control unit performs control to change lanes of the host vehicle to another lane in response to sending a congestion state of currently traveling lane of the host vehicle.

SUMMARY

The present disclosure provides a human machine interface (HMI) control apparatus, which controls an HMI apparatus mounted on a host vehicle. The HMI control apparatus is configured to: acquire lane information including a presence state of an adjacent lane adjacent to a currently traveling lane of the host vehicle; and present, using the HMI apparatus, automation related information based on the acquired lane information. The automation related information corresponds to a driving automation level that is executable or a driver requirement that is required to be executed by a driver, regarding the adjacent lane or a lane change from the currently traveling lane to the adjacent lane.

BRIEF DESCRIPTION OF DRAWINGS

Objects, features and advantages of the present disclosure will become apparent from the following detailed description made with reference to the accompanying drawings.

FIG. 1 is a block diagram illustrating a schematic configuration of an in-vehicle system including a driving control apparatus and an HMI control apparatus according to an embodiment.

FIG. 2 is a schematic diagram illustrating a display example of a meter display according to a first operation example of HMI control apparatus illustrated in FIG. 1.

FIG. 10 is a schematic diagram illustrating a display example of the meter display according to the first operation example of HMI control apparatus illustrated in FIG. 1.

FIG. 11 is a schematic diagram illustrating a display example of the meter display according to the first operation example of HMI control apparatus illustrated in FIG. 1.

FIG. 12 is a schematic diagram illustrating a display example of the meter display according to the first operation example of HMI control apparatus illustrated in FIG. 1.

FIG. 13 is a schematic diagram illustrating a display example of the meter display according to the first operation example of HMI control apparatus illustrated in FIG. 1.

FIG. 14 is a schematic diagram illustrating a display example of the meter display according to the first operation example of HMI control apparatus illustrated in FIG. 1.

FIG. 15 is a schematic diagram illustrating a display example of the meter display according to the first operation example of HMI control apparatus illustrated in FIG. 1.

FIG. 16 is a schematic diagram illustrating a display example of the meter display according to the first operation example of HMI control apparatus illustrated in FIG. 1.

FIG. 18 is a schematic diagram illustrating a display example of the meter display according to a second operation example of HMI control apparatus illustrated in FIG. 1.

FIG. 19 is a schematic diagram illustrating a display example of the meter display according to the second operation example of HMI control apparatus illustrated in FIG. 1.

FIG. 20 is a flowchart schematically illustrating a third operation example of HMI control apparatus illustrated in FIG. 1.

FIG. 21 is a flowchart schematically illustrating a fourth operation example of HMI control apparatus illustrated in FIG. 1.

DETAILED DESCRIPTION

Figure 3:
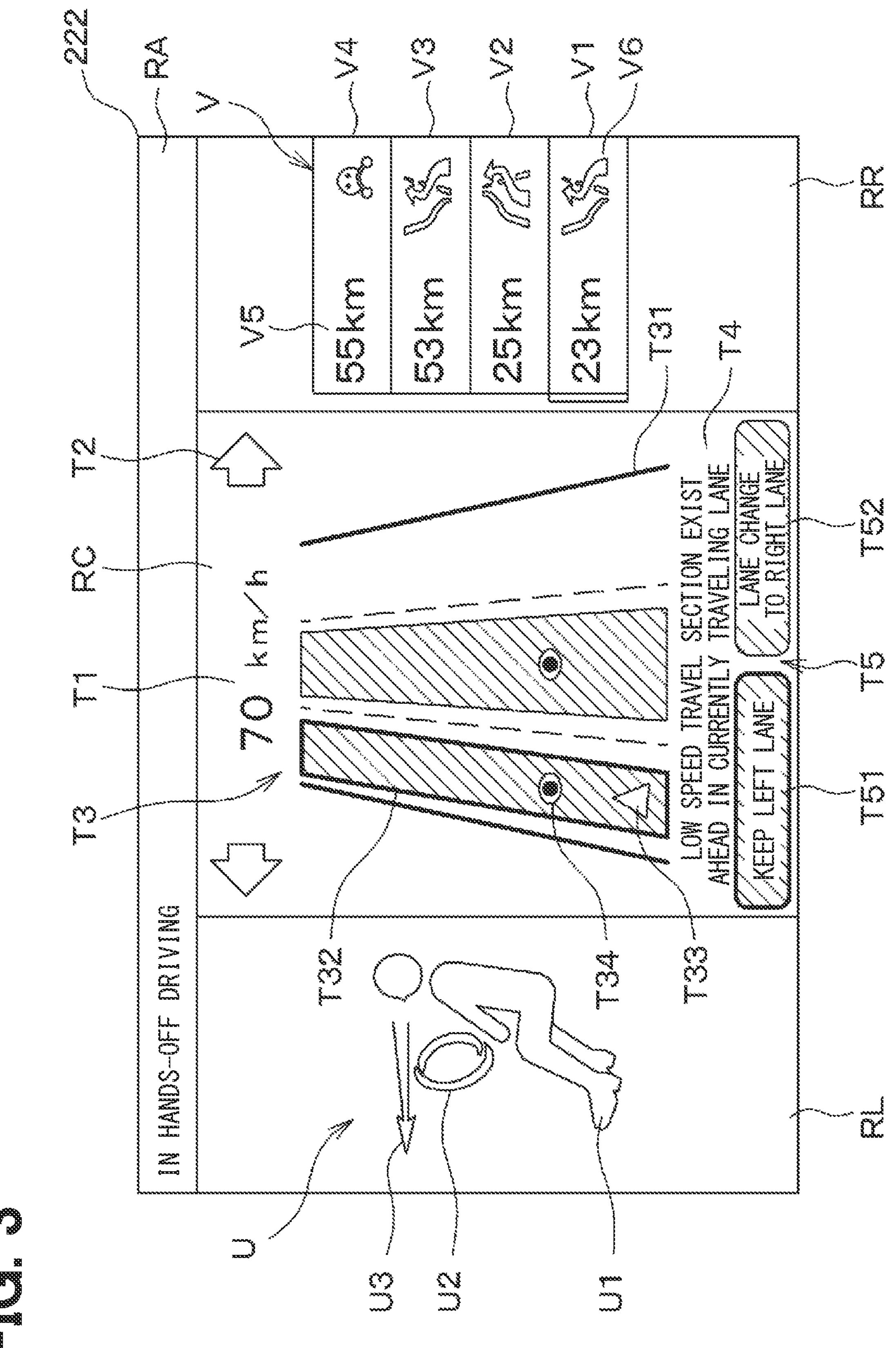
FIG. 3 is a schematic diagram illustrating a display example of the meter display according to the first operation example of HMI control apparatus illustrated in FIG. 1.

In an autonomous driving which imposes a periphery monitoring obligation on a driver, a host vehicle may encounter a scene where a lane change is necessary or recommended, or a scene where the driver wants to change lanes. Here, depending on the road traffic legislation of each country, it may be requested to keep the currently traveling lane in autonomous driving, and it may be necessary to interrupt or end the autonomous driving for a lane change. When the autonomous driving is interrupted or ended, driver requirements, such as the periphery monitoring obligation, change. Alternatively, depending on the road traffic legislation of each country, the execution condition of autonomous driving may be limited to traveling in a specific lane type, for example, a travel purpose lane except for an overtake purpose lane.

As such, selection of traveling lane of the host vehicle affects an executable driving automation level, and the driver requirements corresponding to the driving automation level. Therefore, various types of controls related to automated lane change performed by an in-vehicle system need to be appropriately executed in accordance with lane types, such as a travel purpose lane, an overtake purpose lane, and the like. That is, for example, in such situations described above, creation of a situation in which a driver appropriately grasps the information relating to the relationship between a lane change and the driving automation level and/or the driver requirements improves the convenience of a vehicle capable of autonomous driving. More specifically, for example, appropriate information is provided to a driver at necessary timing, so that appropriate determination of the driver relating to selection of a lane or lane change can be supported. Alternatively, for example, automated lane change control by an in-vehicle system can be smoothly executed.

According to an aspect of the present disclosure, a human machine interface (HMI) control apparatus, which is configured to control an HMI apparatus mounted on a host vehicle, includes: a lane information acquiring unit that acquires lane information including a presence state of an adjacent lane adjacent to a currently traveling lane of the host vehicle; and a presentation control unit that presents, using the HMI apparatus, automation related information based on the lane information acquired by the lane information acquiring unit, the automation related information corresponding to a driving automation level that is executable or a driver requirement that is required to be executed by a driver, regarding the adjacent lane or a lane change from the currently traveling lane to the adjacent lane.

According to another aspect of the present disclosure, a driving control apparatus, which is configured to control driving of a vehicle, includes: a behavior acquiring unit that acquires, as a driver behavior, a behavior of a driver of the vehicle; an automation level determining unit that determines a driving automation level of the vehicle; and a vehicle control unit that executes a driving control of the vehicle based on the driving automation level determined by the automation level determining unit. In a case where a lane change request occurs during execution of a superior automation level, which is the driving automation level at which a periphery monitoring is not imposed on the driver as a driver requirement that is required to be executed by the driver, the vehicle control unit starts execution of lane change in response to (i) a driver behavior corresponding to the periphery monitoring being confirmed, or (ii) switch to an inferior automation level, which is the driving automation level at which the periphery monitoring is imposed on the driver as the driver requirement, being completed.

With the above-described configurations, the present disclosure can improve operation convenience of a vehicle, which is capable of performing automated lane change by an in-vehicle system.

EMBODIMENTS

Hereinafter, embodiments of the present disclosure will be described with reference to the drawings. If descriptions of various modifications applicable to one embodiment are inserted in the middle of a series of descriptions relating to the embodiment, understanding of the embodiment may be hindered. Therefore, the modifications will be described not in the middle of the series of descriptions relating to the embodiment, but collectively after the series of descriptions.

(Configuration)

Referring to FIG. 1, an in-vehicle system 10 is configured to be mounted on a car as a vehicle so that the in-vehicle system 10 exhibits a function as a driving automation system in the vehicle. Hereinafter, a vehicle on which the in-vehicle system 10 is mounted may be referred to as a "host vehicle". More specifically, in the present embodiment, the in-vehicle system 10 is configured to be able to perform at least automated steering driving.

The "automated steering driving" means that the driving automation system is in charge of or executes at least steering, that is, a lateral vehicle motion control subtask, among the dynamic driving tasks defined in the standard "SAE J3016" published by SAE International. SAE is the abbreviation for Society of Automotive Engineers. The "dynamic driving tasks" are all operational and tactical functions that need to be performed in real time when a vehicle is operated in road traffic, excluding strategic functions. The "strategic functions" are trip scheduling, waypoint selection, and the like, or more specifically, include determining or selecting "whether to go, and when, where, and how to go".

That is, the "automated steering driving" is typically a driving automation level corresponding to level 1 or level 2 in "SAE J3016". However, the "automated steering driving" is a concept including what is called "autonomous driving". The "autonomous driving" refers to a driving automation level that corresponds to levels 3 to 5 in "SAE J3016" and at which the driving automation system is in charge of, that is, executes all the dynamic driving tasks. The level X in "SAE J3016" is hereinafter referred to as "SAE level X". X is any of 0 to 5.

Hereinafter, it is expressed that as the numerical value of X of SAE level X is larger, or as the number of the dynamic driving tasks that the driving automation system is in charge of, that is, executes increases, the driving automation level is "higher". The variation of the driving automation level to a higher level is referred to as a "rise" in the driving automation level. On the other hand, it is expressed that as the numerical value of X described above is smaller, or as the number of the dynamic driving tasks that the driving automation system is in charge of, that is, executes decreases, the driving automation level is "lower". The variation of the driving automation level to a lower level is referred to as a "decline" in the driving automation level.

The contents of SAE levels 0 to 5 are specifically as follows: In the following description of the contents of each level, a "driver" is an occupant in charge of or executing the dynamic driving tasks, typically, an occupant seated in a driver's seat of the host vehicle, and may also be referred to as a "driver's seat occupant". "OEDR" is an abbreviation for Object and Event Detection and Response, and is also referred to as "object and event detection and response". The OEDR includes monitoring of the driving environment. The monitoring of the driving environment includes detection, recognition, and classification of objects and events. The monitoring of the driving environment also includes preparation for responding to an object and an event as necessary. A "limited domain" is a specific condition under which a certain driving automation system or a function thereof is designed to operate, and is also referred to as an operational design domain or ODD. The ODD is the abbreviation for Operational Design Domain. The limited domain includes at least one of a plurality of constraint conditions, such as a geographical constraint condition, an environmental constraint condition, a speed constraint condition, and a time constraint condition.

Level 0: Manual driving—A driver executes all the dynamic driving tasks.

Level 1: Driving assistance—The driving automation system persistently executes, among the dynamic driving tasks, vertical vehicle motion control subtasks (that is, start, acceleration/deceleration, and stop), or a lateral vehicle motion control subtask (that is, steering) in a specific limited domain. However, the driving automation system does not simultaneously execute both the vertical vehicle motion control subtask and the lateral vehicle motion control subtask.

Level 2: Advanced driving assistance—The driving automation system persistently executes, among the dynamic driving tasks, the vertical vehicle motion control subtasks and the lateral vehicle motion control subtask in a specific limited domain. It is expected that the driver executes the OEDR, which is a subtask of the dynamic driving tasks, to supervise the driving automation system.

Level 3: Conditional autonomous driving—The driving automation system persistently executes all the dynamic driving tasks in a specific limited domain. In principle, the driver is not obliged to execute the OEDR, such as monitoring the traffic environment around the host vehicle. However, in a case where it becomes difficult to continue the driving automation level, the driving automation system requests the driver to switch the driving mode with sufficient time. The driver needs to appropriately respond to the request.

Level 4: Advanced autonomous driving—The driving automation system persistently executes all the dynamic driving tasks in a specific limited domain. In a case where it becomes difficult to continue the driving automation level in the limited domain, the situation is responded by the driving automation system.

Level 5: Fully autonomous driving—The driving automation system persistently executes all the dynamic driving tasks, not within a specific limited domain but unlimitedly. In a case where it becomes difficult to continue the driving automation level, the situation is also responded by the driving automation system, not within a specific limited domain but unlimitedly.

In the present embodiment, the in-vehicle system 10 is configured to be able to perform the driving automation levels of SAE levels 0 to 3 in the host vehicle. More specifically, the in-vehicle system 10 is configured to be able to execute ACC and LKA corresponding to SAE level 1. The ACC is adaptive cruise control, that is, inter vehicle distance control. The LKA is the abbreviation for Lane Keeping Assistance, and is lane keeping assistance control.

The in-vehicle system 10 is also configured to be able to execute what is called "low speed autonomous driving" corresponding to SAE level 3. The "low speed autonomous driving" is autonomous driving executed under the condition that the host vehicle travels on a predetermined automatically drivable road in a predetermined low speed range (for example, 60 km/h or lower) while keeping a currently traveling lane, which is a lane on which the host vehicle is traveling. The "automatically drivable road" is a road only for cars preliminarily set as a road on which the autonomous driving is possible. The automatically drivable road is typically a road that is only for cars and has a legal maximum speed exceeding 60 km/h, and is, for example, an expressway. In the present embodiment, the execution condition of the low speed autonomous driving includes a fact that the host vehicle is traveling on a travel purpose lane (that is, a lane that is not an overtake purpose lane). Hereinafter, in the present specification, unless otherwise specified, such low speed autonomous driving is simply referred to as the "autonomous driving".

The in-vehicle system 10 is also configured to be able to execute hands-on driving and hands-off driving corresponding to SAE level 2. The "hands-on driving" is a driving automation level at which on the assumption that a driver drives the host vehicle, the driving automation system, which operates in parallel, timely executes driving assistance control. That is, the hands-on driving is advanced driving assistance that requests the driver to execute the hands-on state, and periphery monitoring as the dynamic driving task. The "periphery monitoring" refers to monitoring of a traffic environment around the host vehicle, or more specifically, a road situation, a traffic situation, a presence state of an obstacle, and the like. The "road situation" refers to a topographical situation of a road, such as presence or absence of a curve, or a curve curvature. The "traffic situation" refers to a traffic volume, that is, a presence situation of other vehicles. The "presence state of an obstacle" includes presence or absence, a type, a relative position, a relative speed, and the like of an obstacle. The "obstacle" includes a person, an animal, parked and stopped vehicles, an object dropped on the road, and the like. The "hands-on state" is a state in which the driver can interfere in the steering of the host vehicle, that is, the lateral vehicle motion control subtask, and is typically a state in which the driver holds a steering wheel 211 to be described later. The "hands-off driving" is a driving automation level at which the driving automation system automatically executes start, steering, acceleration/deceleration, and stop controls on condition that the driver appropriately responds to an intervention request or the like from the driving automation system. That is, the hands-off driving is advanced driving assistance that does not request the driver to be in the hands-on state but requests the driver to execute periphery monitoring as the dynamic driving task.

As described above, the in-vehicle system 10 is configured to be able to execute, as automated steering control, the hands-on driving and the hands-off driving in which a periphery monitoring obligation is imposed on the driver, and the autonomous driving in which the periphery monitoring obligation is not imposed on the driver. In the present embodiment, it is assumed that the hands-off driving is executed in condition that the host vehicle is traveling on an automatically drivable road. That is, it is assumed that the in-vehicle system 10 is configured not to execute neither the hands-off driving nor the autonomous driving on an ordinary road.

(Overall System Configuration)

The in-vehicle system 10 is an in-vehicle network including an in-vehicle communication line 10A, and a plurality of nodes and the like connected to each other via the in-vehicle communication line 10A. The in-vehicle system 10 is configured to be able to execute various types of vehicle controls during driving of the host vehicle, various notification operations accompanying the various vehicle controls, and the like. The in-vehicle system 10 is configured to conform to a predetermined communication standard, such as a CAN (an international registered trademark: the international registered number 1048262A). The CAN (an international registered trademark) is the abbreviation for Controller Area Network.

The in-vehicle system 10 includes a vehicle state sensor 11, an outside state sensor 12, a periphery monitoring sensor 13, a locator 14, a DCM 15, a navigation apparatus 16, a driver state sensing unit 17, a driving control ECU 18, a direction indicator ECU 19, and an HMI apparatus 20. The DCM is the abbreviation for data communication module. The ECU is the abbreviation for electronic control unit. The vehicle state sensor 11 to the HMI apparatus 20 are connected to each other via the in-vehicle communication line 10A.

The HMI apparatus 20 includes an operation unit 21, a meter panel 22, a CID apparatus 23, an HUD apparatus 24, and an HMI control apparatus 25. The CID is the abbreviation for center information display. The HUD is the abbreviation for head-up display. The operation unit 21 is connected to the HMI control apparatus 25 via the in-vehicle communication line 10A such that the operation unit 21 can communicate information with the HMI control apparatus 25. The meter panel 22, the CID apparatus 23, and the HUD apparatus 24 are connected to the HMI control apparatus 25 via a subsidiary communication line, which is different from the in-vehicle communication line 10A, such that the meter panel 22, the CID apparatus 23, and the HUD apparatus 24 can communicate information with the HMI control apparatus 25. The HMI control apparatus 25 is provided as a node connected to the in-vehicle communication line 10A. Details of the configurations of the operation unit 21, the meter panel 22, the CID apparatus 23, the HUD apparatus 24, and the HMI control apparatus 25 will be described later.

(Various Sensors)

The vehicle state sensor 11 is provided to generate outputs corresponding to various amounts related to the driving state of the host vehicle. The "various amounts related to the driving state" include various amounts related to the state of driving operation by the driver or the driving automation system, such as an accelerator operation amount, a brake operation amount, a shift position, and a steering angle. The "various amounts related to the driving state" also include physical amounts related to the behavior of the host vehicle, such as a vehicle speed, an angular velocity, forward and rearward acceleration, and left and right acceleration. That is, well-known sensors necessary for vehicle driving control, such as an accelerator opening degree sensor, a steering angle sensor, a wheel speed sensor, an angular velocity sensor, and an acceleration sensor, are collectively referred to as the vehicle state sensor 11 to simplify the illustration and description. The vehicle state sensor 11 is provided to be able to provide sensing outputs to each unit, such as the driving control ECU 18, via the in-vehicle communication line 10A.

The outside state sensor 12 is provided to generate outputs corresponding to various amounts mainly related to the natural environment among the traffic environment around the host vehicle. The "various amounts related to the natural environment" include physical amounts, such as an outside air temperature, rainfall, and illuminance. That is, well-known sensors, such as an outside air temperature sensor, a raindrop sensor, and an illuminance sensor, are collectively referred to as the outside state sensor 12 to simplify the illustration and description. The outside state sensor 12 is provided to be able to provide sensing outputs to each unit, such as the driving control ECU 18, via the in-vehicle communication line 10A.

The periphery monitoring sensor 13 is provided to mainly detect the traffic environment around the host vehicle except for the traffic environment detected by the outside state sensor 12. More specifically, the periphery monitoring sensor 13 is configured to be able to detect a moving object and a stationary object in a predetermined detection range around the host vehicle. The "moving object" includes a pedestrian, a cyclist, an animal, and another vehicle that is driving. The "stationary object" includes an object dropped on the road, a guardrail, a curb, parked and stopped vehicles, a road sign, a road surface marking, roadside structures (for example, a wall, a building, and the like), and the like. The periphery monitoring sensor 13 may also be referred to as an "ADAS sensor". The ADAS is the abbreviation for advanced driver assistance system.

In the present embodiment, the periphery monitoring sensor 13 includes a front camera 131 and a radar sensor 132 as configurations for detecting a moving object and a stationary object. The front camera 131 is provided to capture images in front of and diagonally in front of the host vehicle. The front camera 131 is a digital camera apparatus, and includes an image sensor, such as a CCD or a CMOS. The CCD is the abbreviation for charge coupled device. The CMOS is the abbreviation for complementary metal oxide semiconductor (MOS).

The radar sensor 132 is a millimeter wave radar sensor, a sub-millimeter wave radar sensor, or a laser radar sensor configured to transmit and receive radar waves. The radar sensor 132 is mounted on a front surface portion of the vehicle body of the host vehicle. The radar sensor 132 is configured to output a signal corresponding to a position and a relative speed of the reflection point. The "reflection point" is a point that is on a surface of an object existing around the host vehicle and is assumed to have reflected the radar wave. The "relative speed" is a relative speed of the reflection point, that is, an object that has reflected the radar wave, relative to the host vehicle.

(Locator)

The locator 14 is configured to determine highly precise position information and the like of the host vehicle by what is called combined positioning. More specifically, the locator 14 includes a GNSS receiver 141, an inertia acquiring unit 142, a high definition map DB 143, and a locator ECU 144. The GNSS is the abbreviation for global navigation satellite system. The DB is the abbreviation for database. The "highly precise position information" is, for example, position information having position precision to such an extent that the position information can be used for advanced driving assistance or the autonomous driving of SAE level 2 or higher, or more specifically, an error is less than 10 cm.

The GNSS receiver 141 is provided to receive positioning signals transmitted from a plurality of positioning satellites, that is, artificial satellites. In the present embodiment, the GNSS receiver 141 is configured to be able to receive positioning signals from a positioning satellite in at least one of satellite positioning systems, such as the GPS, the QZSS, GLONASS, Galileo, the IRNSS, and the BeiDou Navigation Satellite System. The GPS is the abbreviation for Global Positioning System. The QZSS is the abbreviation for Quasi-Zenith Satellite System. The GLONASS is the abbreviation for Global Navigation Satellite System. The IRNSS is the abbreviation for Indian Regional Navigation Satellite System.

The inertia acquiring unit 142 is configured to acquire acceleration and angular velocity acting on the host vehicle. In the present embodiment, the inertia acquiring unit 142 is provided as a three axis gyro sensor and a three axis acceleration sensor incorporated in a box-shaped housing of the locator 14.

The high definition map DB 143 is mainly constituted by a nonvolatile rewritable memory to store the high definition map information that is rewritable, and to hold the stored contents even during power interruption. The nonvolatile rewritable memory is, for example, a hard disk, an EEPROM, a flash ROM, or the like. The EEPROM is the abbreviation for electronically erasable and programmable ROM. The ROM is the abbreviation for read only memory. The high definition map information may also be referred to as high definition map data. The high definition map information includes map information more precise than map information used in a conventional car navigation system corresponding to a position error of about several meters. More specifically, the high definition map DB 143 stores information that can be used for advanced driving assistance or the autonomous driving, such as three dimensional road shape information, lane number information, and regulation information, in accordance with a predetermined standard, such as the ADASIS standard. The ADASIS is the abbreviation for Advanced Driver Assistance Systems Interface Specification.

The locator ECU 144 is configured as what is called an in-vehicle microcomputer including a CPU, a ROM, a RAM, an input/output interface, and the like (not illustrated). The CPU is the abbreviation for central processing unit. The RAM is the abbreviation for random access memory. The locator ECU 144 is configured to sequentially determine the position, the direction, and the like of the host vehicle on the basis of positioning signals received by the GNSS receiver 141, the acceleration and the angular velocity acquired by the inertia acquiring unit 142, the vehicle speed acquired from the vehicle state sensor 11, and the like. The locator 14 is provided to be able to provide determination results of the position, the direction, and the like determined by the locator ECU 144, to each unit, such as the navigation apparatus 16, the driving control ECU 18, and the HMI control apparatus 25, via the in-vehicle communication line 10A.

(DCM)

The DCM 15 is an in-vehicle communication module. The DCM 15 is provided to be able to communicate information with a base station around the host vehicle by wireless communication conforming to a communication standard, such as LTE or 5G. The LTE is the abbreviation for Long Term Evolution. The 5G is the abbreviation for 5th Generation.

More specifically, for example, the DCM 15 is configured to acquire the latest high definition map information from a probe server on a cloud. The DCM 15 cooperates with the locator ECU 144 to store the acquired latest high definition map information in the high definition map DB 143. The DCM 15 is configured to acquire traffic information, such as traffic jam information, from the above-described probe server and/or a predetermined database. The "traffic jam information" includes the position and length of a traffic jam section. More specifically, the traffic jam information includes a traffic jam head position, a traffic jam tail position, an approximate traffic jam distance, an approximate traffic jam time period, and the like. The traffic information is also referred to as "road traffic information".

(Navigation Apparatus)

The navigation apparatus 16 is provided to calculate a planned travel route from the current position of the host vehicle to a predetermined destination. In the present embodiment, the navigation apparatus 16 is configured to calculate a planned travel route on the basis of a destination set by the host vehicle driver or the like, high definition map information acquired from the locator 14, and position information and direction information of the host vehicle acquired from the locator 14. The navigation apparatus 16 is provided to be able to provide various types of information including route information as the calculation result to each unit, such as the driving control ECU 18 and the HMI control apparatus 25, via the in-vehicle communication line 10A. That is, the navigation apparatus 16 displays a navigation screen display for map display, route display, and the like on the HMI apparatus 20.

(Driver State Sensing Unit)

The driver state sensing unit 17 is provided to sense a driver state. The "driver state" is a state of the driver in the host vehicle. The "driver state" includes a driver behavior and the awakening state of the driver. The "driver behavior" includes the direction of the face, line-of-sight direction, posture, and the like of the driver. The driver state sensing unit 17 is also configured to be able to provide the sensing result of the driver state to each unit, such as the driving control ECU 18 and the HMI control apparatus 25, via the in-vehicle communication line 10A.

More specifically, the driver state sensing unit 17 is configured to sense the driver state by image recognition based on an image captured with an in-vehicle camera including an image sensor, such as a CCD or a CMOS. That is, the driver state sensing unit 17 is provided to constitute what is called a driver status monitor that warns about a decline in the awakening state of the driver, and the like. The driver state sensing unit 17 is also configured to sense an operation state of the accelerator and the brake operated by the driver, a holding state and an operation state of the steering wheel 211 described later held and operated by the driver, and the like.

(Driving Control Apparatus)

The driving control ECU 18 is provided to control driving of the host vehicle on the basis of signals and information acquired from the vehicle state sensor 11, the outside state sensor 12, the periphery monitoring sensor 13, the locator 14, and the like. That is, the driving control ECU 18 as a driving control apparatus of the present disclosure is configured to execute predetermined driving control operations. In the present embodiment, the "predetermined driving control operations" include vehicle control operations, that is, dynamic driving task executing operations corresponding to SAE levels 1 to 3.

In the present embodiment, the driving control ECU 18 is configured to be able to set the driving automation level of the host vehicle to any of SAE levels 0 to 3. The driving control ECU 18 is also configured to be able to selectively execute any one of the hands-on driving of SAE level 2, the hands-off driving of SAE level 2, and the low speed autonomous driving of SAE level 3, as the driving automation levels of SAE levels 2 and higher.

The driving control ECU 18 has a configuration as what is called an in-vehicle microcomputer including a CPU, a ROM, a nonvolatile rewritable memory, a RAM, an input/output interface, and the like (not illustrated). More specifically, the driving control ECU 18 includes an information acquiring unit 181, a driver behavior acquiring unit 182, an automation level determining unit 183, and a vehicle control unit 184, as functional configurations or functional units implemented on the in-vehicle microcomputer.

The information acquiring unit 181 is provided to acquire at least the travel state of the host vehicle. The "travel state"

includes the driving state, the traffic environment, and the like sensed or acquired by the vehicle state sensor 11, the outside state sensor 12, the periphery monitoring sensor 13, and the like. The information acquiring unit 181 is provided to also acquire current highly precise position information of the host vehicle, and lane information and traffic information on a road on which the host vehicle is currently traveling. The "lane information" includes the number of lanes and the lane type. The "lane type" includes a travel purpose lane, an overtake purpose lane, and the like. That is, the information acquiring unit 181 acquires information necessary for vehicle control corresponding to SAE levels 1 to 3, from the vehicle state sensor 11, the outside state sensor 12, the periphery monitoring sensor 13, the locator 14, the DCM 15, and the like.

The driver behavior acquiring unit 182 is provided to acquire the driver behavior of the host vehicle. More specifically, the driver behavior acquiring unit 182 acquires (that is, receives), from the driver state sensing unit 17, the driver behavior sensed by the driver state sensing unit 17.

The automation level determining unit 183 is provided to determine the driving automation level of the host vehicle on the basis of the travel state acquired by the information acquiring unit 181, the driver state acquired by the driver behavior acquiring unit 182, and the like. The driving control ECU 18 is provided to be able to provide the determination result of the driving automation level determined by the automation level determining unit 183, to each unit, such as the HMI control apparatus 25, via the in-vehicle communication line 10A.

More specifically, the automation level determining unit 183 determines whether a start condition of a predetermined driving automation level is satisfied. In a case where while the condition is satisfied, approval operation by the driver is received, the automation level determining unit 183 starts the driving automation level. Further, in a case where while the driving automation level is executed, the continuation condition fails to be satisfied or the ending condition is satisfied, the automation level determining unit 183 executes a control necessary for ending the driving automation level.

In the present embodiment, in a case where the vehicle control unit 184 executes a lane change on condition that a driver requirement corresponding to periphery monitoring is satisfied, the automation level determining unit 183 starts a superior automation level after the lane change is completed. The "driver requirements" are requirements requested of the driver, and are, for example, periphery monitoring, a hands-on state, and the like. The "superior automation level" is a driving automation level at which periphery monitoring as a driver requirement is not imposed, or more specifically, SAE level 3 or higher, that is, the autonomous driving. On the other hand, a driving automation level at which periphery monitoring as a driver requirement is imposed may be hereinafter referred to as an "inferior automation level". More specifically, the inferior automation level is SAE levels 0 to 2.

The vehicle control unit 184 is provided to execute driving control of the host vehicle on the basis of the driving automation level determined by the automation level determining unit 183. That is, the vehicle control unit 184 is configured to execute vehicle motion control subtasks, such as vehicle speed control, steering control, and braking control, according to the determination result of the driving automation level determined by the automation level determining unit 183. More specifically, in a case where a lane change request occurs during execution of the superior automation level, the vehicle control unit 184 starts execution of the lane change on condition that a driver behavior corresponding to periphery monitoring has been confirmed or switch to the inferior automation level has been completed. In a case where after execution of a lane change is determined, it is sensed that the driver neglects periphery monitoring before a start of vehicle control (for example, steering control) for the lane change, the vehicle control unit 184 waits for or cancels the lane change. In a case where after the start of the vehicle control for the lane change, it is sensed that the driver neglects periphery monitoring, the vehicle control unit 184 executes a warning, such as a lane departure alert, a lane change cancellation, or a return to the lane before the lane change.

(Turn Signals)

The direction indicator ECU 19 is configured to control a lighting or blinking state of direction indicator 191 on the basis of an operation state of a direction indicator switch 212 to be described later, or the like. At least the pair of direction indicator 191, which are direction indicators, are provided at least at left and right sides of each of a front surface and a rear surface of the host vehicle.

(HMI Apparatus)

The HMI apparatus 20 is what is called a vehicular HMI, and has a configuration for providing information communication between the host vehicle and an occupant including the driver. More specifically, the HMI apparatus 20 is configured to present various types of information relating to the host vehicle to the driver at least visually, and receive input operation of the driver corresponding to the presentation contents. The various types of information to be presented are, for example, various types of guidance, an input operation instruction, an input operation content notification, a warning, and the like.

The operation unit 21 is mainly configured such that the operation unit 21 can receive driver's manual input operation related to basic driving operation, and the operation unit 21 can provide the result of the received manual input operation, to each unit, such as the driving control ECU 18 and the HMI control apparatus 25, via the in-vehicle communication line 10A. More specifically, the operation unit 21 includes the steering wheel 211, the direction indicator switch 212, and the like.

The steering wheel 211 is fixed to a steering shaft (not illustrated) rotatably supported by a steering column (not illustrated). The direction indicator switch 212 is configured to output a signal corresponding to an operation state of a direction indicator lever (not illustrated), which is an operation lever provided for the steering column described above. The operation unit 21 also includes a steering switch (not illustrated) and the like. The steering switch is provided for a spoke portion (not illustrated) or the like of the steering wheel 211.

As described above, the HMI apparatus 20 includes the meter panel 22, the CID apparatus 23, and the HUD apparatus 24 provided for the dashboard (not illustrated). That is, in the present embodiment, the HMI apparatus 20 has a configuration as what is called a "dashboard HMI" attached to the above-described dashboard. The HMI apparatus 20 also includes a loudspeaker (not illustrated) for executing information presentation by sound.

The meter panel 22 includes a meter 221, a meter display 222, and a meter switch 223. The meter 221 is provided to execute meter display, such as a vehicle speed, a cooling water temperature, and a remaining amount of fuel, and the like of the host vehicle. The meter display 222 is an information display unit or an information display region provided at the vehicle-width-directional center of the meter panel 22. The meter display 222 is provided to display various types of information, such as, the date and time, the outside air temperature, the travel distance, and received radio stations. In the present embodiment, the meter display 222 has a configuration as a display device, which is a liquid crystal display or an organic EL display, including a substantially rectangular displayable region. The EL is the abbreviation for electroluminescence. The meter switch 223 is provided to be able to receive various types of operation relating to a displayed state or displayed contents displayed in the meter 221 and/or the meter display 222.

The CID apparatus 23 is attached to the above-described dashboard. The CID apparatus 23 is provided to be able to display a navigation display screen for a map display, a route display, and the like displayed by the navigation apparatus 16. The CID apparatus 23 is provided to be able to also display information and contents different from the navigation display screen. More specifically, the CID apparatus 23 is configured to be able to execute a display and setting operations related to traveling modes, such as "comfort", "normal", "sports", and "circuit".

The CID apparatus 23 is configured to be able to also execute a display related to second tasks available to the driver in the autonomous driving of SAE level 3. The second tasks are tasks executed by the driver except for driving operation. More specifically, the second tasks include, for example, book reading, portable communication terminal operation, video content viewing, and the like. The second tasks are also referred to as "non-driving tasks" or "secondary activities".

The CID apparatus 23 includes a CID display 231, an input device 232, and a CID switch 233. The CID display 231 is provided at a vehicle-width-directional substantially central position of the above-described dashboard, or more specifically, at a position between the driver's seat and the seat next to the driver. The CID display 231 is visible to at least the driver. The CID display 231 has a configuration as a display device, which is a liquid crystal display or an organic EL display. The CID display 231 is configured to display the video in a video content in a case where the second task is viewing of the video content. The "video content" is, for example, a movie, a concert video, a music video, a television broadcast, or the like.

The input device 232 is a transparent touch panel. The input device 232 is provided to be put on the CID display 231 to cover the CID display 231. That is, the input device 232 is configured such that while the input device 232 allows the driver or the like to visually recognize a display on the CID display 231, the input device 232 can receive input operation by the driver or the like corresponding to the display. The CID switch 233 includes a plurality of manually operated switches arranged around the CID display 231 and the input device 232.

The HUD apparatus 24 is provided to display a display image including characters and/or symbols in front of the driver. In the present embodiment, the HUD apparatus 24 is configured to form a virtual display image in front of the driver's seat by using augmented reality (AR) technology, so that the display image is superimposed and displayed on the foreground including the road surface of the heading destination of the host vehicle. The "superimposed display" in the HUD apparatus 24 refers to displaying information (for example, a building name) related to a superimposition target (for example, a building) included in the foreground, such that the related information is put on the superimposition target, or in the vicinity of the superimposition target, so that the superimposition target and the related information are displayed such that the superimposition target and the related information are correlated with each other. Various displays, such as a route display, a heading direction display, and a traffic information display, for the forward road surface also correspond to the "superimposed display". More specifically, the HUD apparatus 24 projects display image light onto a predetermined projection range in a windshield (not illustrated) to make the driver visually recognize reflected light of the display image light reflected by the windshield, so that the display image is displayed by AR.

(HMI Control Apparatus)

The HMI control apparatus 25 is provided to control operations of the HMI apparatus 20. That is, the HMI control apparatus 25 has a configuration as an HCU that controls operations of the meter panel 22, the CID apparatus 23, the HUD apparatus 24, and the like included in the HMI apparatus 20. The HCU is the abbreviation for HMI control unit.

The HMI control apparatus 25 has a configuration as what is called an in-vehicle microcomputer including a CPU, a ROM, a nonvolatile rewritable memory, a RAM, an input/output interface, and the like (not illustrated). The HMI control apparatus 25 has the following functional configurations or functional units implemented on the microcomputer. That is, the HMI control apparatus 25 includes a vehicle information acquiring unit 251, a control situation acquiring unit 252, a travel situation acquiring unit 253, a lane information acquiring unit 254, a driver information acquiring unit 255, a presentation control unit 256, a direction indicator command output unit 257, and an operation receiving unit 258.

The vehicle information acquiring unit 251 is configured to acquire information related to the driving state of the host vehicle. More specifically, the vehicle information acquiring unit 251 acquires various amounts related to the driving state of the host vehicle sensed or acquired by the vehicle state sensor 11.

The control situation acquiring unit 252 is configured to acquire the execution situation of automated steering control in the host vehicle. More specifically, the control situation acquiring unit 252 acquires, from the driving control ECU 18, an execution situation and an execution plan situation of the autonomous driving or driving assistance performed by the driving control ECU 18, that is, a determination result of the driving automation level determined by the automation level determining unit 183.

The travel situation acquiring unit 253 is configured to acquire the travel situation of the host vehicle. More specifically, the travel situation acquiring unit 253 acquires the traffic environment around the host vehicle sensed or acquired by the outside state sensor 12 and the periphery monitoring sensor 13. The travel situation acquiring unit 253 also acquires, from the locator 14 and the navigation apparatus 16, the current position of the host vehicle, a planned travel route, and traffic information on the planned travel route.

The lane information acquiring unit 254 is configured to acquire lane information on a road on which the host vehicle is traveling. More specifically, the lane information acquiring unit 254 acquires, from the locator 14, lane information around the current position of the host vehicle. The "lane information" acquired by the lane information acquiring unit 254 includes the lane type of the currently traveling lane. The "lane information" also includes the presence state of an adjacent lane adjacent to the currently traveling lane. In a case where an adjacent lane exists, such "lane information" also includes the lane type of the adjacent lane.

The driver information acquiring unit 255 is configured to acquire, from the driver state sensing unit 17, a sensing result of a driver state sensed by the driver state sensing unit 17. The driver state acquired by the driver information acquiring unit 255 includes the existence or nonexistence of a driver behavior (for example, a periphery monitoring motion) corresponding to a predetermined driver requirement (for example, the periphery monitoring obligation), or includes information necessary for determining the existence or nonexistence. In a case where a predetermined driving mode switch request has been made, the driver state acquired by the driver information acquiring unit 255 also includes the existence or nonexistence of a corresponding driving mode switch motion, or includes information necessary for determining the existence or nonexistence.

The presentation control unit 256 is configured to control an information presentation operation performed by the HMI apparatus 20. That is, the presentation control unit 256 controls the image output and the sound output in the meter panel 22, the CID apparatus 23, and the HUD apparatus 24 to execute presentation of various types of information to a host vehicle occupant including the driver. The "various types of information" include route information, traffic information, various types of messages, and the like.

In the present embodiment, the presentation control unit 256 is configured to present, using the HMI apparatus 20, a lane change from the currently traveling lane to an adjacent lane, or automation related information regarding the adjacent lane, on the basis of lane information acquired by the lane information acquiring unit 254. The "automation related information" is information corresponding to an executable driving automation level and/or driver requirements regarding the currently traveling lane and/or an adjacent lane which is the lane change destination. More specifically, the presentation control unit 256 visually displays the automation related information on the meter display 222. The presentation control unit 256 can also set the presentation contents of the automation related information according to the type of each lane including an adjacent lane. That is, the presentation control unit 256 presents the automation related information with a content corresponding to whether a lane that is a presentation target of the automation related information (for example, at least the currently traveling lane and/or an adjacent lane) is a travel purpose lane or an overtake purpose lane.

The direction indicator command output unit 257 is configured to output, to the direction indicator ECU 19, an interruption command signal for the lighting control of the direction indicator 191 by the direction indicator ECU 19 based on the operation state of the direction indicator switch 212. More specifically, in a state where operation with the direction indicator switch 212 for making the direction indicator 191 light up or blink is performed, in a predetermined case, the direction indicator command output unit 257 outputs a switching-off interruption command signal to the direction indicator ECU 19. The switching-off interruption command signal is an interruption signal for stopping lighting or blinking of the direction indicator 191 during control by the direction indicator ECU 19 for making the direction indicator 191 light up or blink. Similarly, in a state where operation with the direction indicator switch 212 for making the direction indicator 191 light up or blink is not performed, in a predetermined case, the direction indicator command output unit 257 outputs a lighting-up interruption command signal to the direction indicator ECU 19. The lighting-up interruption command signal is a signal for making the direction indicator 191 light up or blink.

The operation receiving unit 258 is configured to receive input operation by a host vehicle occupant including the driver using the HMI apparatus 20, that is, the operation unit 21, the meter switch 223, the input device 232, or the CID switch 233. More specifically, the operation receiving unit 258 acquires or monitors the state of the result of the received above-described input operation corresponding to various types of information presented by the presentation control unit 256.

(Operation Outline)

Hereinafter, the operations of the driving control ECU 18 and the HMI control apparatus 25 according to the present embodiment, and the outlines of the control method and the control program executed by the driving control ECU 18 and the HMI control apparatus 25, as well as the action or the effect obtained by the driving control ECU 18 and the HMI control apparatus 25 will be described.

In the driving control ECU 18, the information acquiring unit 181 acquires various types of information including the travel state of the host vehicle. More specifically, the information acquiring unit 181 acquires the driving state and the traffic environment of the host vehicle, from the vehicle state sensor 11, the outside state sensor 12, and the periphery monitoring sensor 13. The information acquiring unit 181 also acquires, from the locator 14 and the navigation apparatus 16, current highly precise position information on the host vehicle, a planned travel route, and lane information and traffic information on the planned travel route. The driver behavior acquiring unit 182 acquires the driver behavior of the host vehicle from the driver state sensing unit 17. The information acquiring unit 181 and/or the driver behavior acquiring unit 182 also acquires various operation states of the HMI apparatus 20 operated by the driver or the like.

The automation level determining unit 183 determines the driving automation level of the host vehicle on the basis of the travel state acquired by the information acquiring unit 181, the driver behavior acquired by the driver behavior acquiring unit 182, and the like. More specifically, on the basis of information acquired by the information acquiring unit 181 and the driver behavior acquiring unit 182, the automation level determining unit 183 determines whether a start condition of a predetermined driving automation level corresponding to any of SAE levels 1 to 3 is satisfied.

For example, when the host vehicle enters an automatically drivable road, at least one of the start conditions of the hands-off driving and/or the autonomous driving is satisfied. In a case where the vehicle speed of the host vehicle is in the above-described low speed range, at least another one of the start conditions of the autonomous driving is satisfied. When a start condition of a predetermined driving automation level, for example, the hands-on driving, the hands-off driving, or the autonomous driving is satisfied, the automation level determining unit 183 informs the HMI control apparatus 25 that the start condition has been satisfied.

When the HMI control apparatus 25 receives the information that the start condition has been satisfied, the presentation control unit 256 uses the HMI apparatus 20, for example, the meter display 222 and a loudspeaker (not illustrated), to notify the driver that the predetermined driving automation level can be started. The presentation control unit 256 also executes information presentation that urges, on the driver, approval operation, which is input operation for approving the start of the driving automation level, and waits for the input operation for a predetermined time.

When the operation receiving unit 258 receives the approval operation, the HMI control apparatus 25 informs the driving control ECU 18 that the driver's approval operation has been received. In the driving control ECU 18, when the driver behavior acquiring unit 182 acquires the information to the effect that the approval operation has been received, the automation level determining unit 183 starts execution of the driving automation level for which the start condition has been satisfied and the execution has been approved. Then, according to the driving automation level determined by the automation level determining unit 183, that is, execution of which has been started by the automation level determining unit 183, the vehicle control unit 184 executes vehicle speed control, steering control, braking control, and the like.

In the autonomous driving of SAE Level 3, execution of the dynamic driving tasks by the driver, i.e., for example, periphery monitoring, steering control operation, and acceleration/deceleration control operation, are not requested in principle. For this reason, in the autonomous driving, the driver is not requested to constantly hold the steering wheel 211, and is not even requested to constantly maintain a driving posture to the extent that the driver can operate the accelerator pedal and the brake pedal at any time. Thus, in the autonomous driving, the driver can execute a second task.

On the other hand, in the hands-on driving or the hands-off driving of SAE level 2, the driver is requested to execute the dynamic driving tasks including at least periphery monitoring. That is, in the hands-on driving, periphery monitoring and a hands-on state are requested of the driver. In the hands-off driving, the hands-on state is not requested of the driver, but the driver is requested to execute periphery monitoring.

In the present embodiment, executable or recommended driving automation levels are different depending on lane types. More specifically, when the host vehicle enters an automatically drivable road, the hands-on driving and the hands-off driving are possible in a travel purpose lane and an overtake purpose lane. However, in an overtake purpose lane, the hands-on driving is recommended considering the necessity of moving to a travel purpose lane as soon as possible, and the like. The host vehicle can perform the autonomous driving by traveling in a low speed range while keeping a currently traveling lane which is a travel purpose lane. That is, the autonomous driving cannot be executed while an overtake purpose lane is traveled.

In the hands-on driving and the hands-off driving, the in-vehicle system 10 can automatically change lanes. On the other hand, in the autonomous driving, the in-vehicle system 10 cannot automatically change lanes. That is, for example, in a case where in the autonomous driving, a lane change request occurs due to operation of the direction indicator switch 212 operated by the driver, or the like, it is necessary to interrupt or end the autonomous driving being executed to actually execute the lane change as requested. The switch from the autonomous driving to the hands-on driving or the hands-off driving allows an automated lane change performed by the in-vehicle system 10.

As such, selection of a lane in which the host vehicle will travel affects an executable driving automation level, and the driver requirements corresponding to the driving automation level. Therefore, various types of controls related to automated lane change performed by the in-vehicle system 10 need to be appropriately executed in accordance with the lane type. Creation of a situation in which the driver appropriately grasps the information relating to the relationship between a lane change and the driving automation level and/or the driver requirements improves the convenience of the host vehicle configured such that automated lane change control by the in-vehicle system 10 is possible. More specifically, for example, the above-described information is provided to the driver at necessary timing, so that appropriate determination of the driver can be supported. Alternatively, for example, automated lane change control by the in-vehicle system 10 can be smoothly executed. Therefore, the presentation control unit 256 presents, using the HMI apparatus 20, the driving automation level and/or the driver requirements, as the automation related information, for a currently traveling lane and/or an adjacent lane.

FIGS. 2 to 16 illustrate specific examples of information presentation operations by the HMI apparatus 20 (that is, the meter display 222 in the present embodiment) executed by the HMI control apparatus 25 (that is, the presentation control unit 256). Referring to FIG. 2, the presentation control unit 256 displays various types of information in each of an upper display region RA, a central display region RC, a left display region RL, and a right display region RR in the meter display 222.

The upper display region RA is an elongated band-shaped region extending in a lateral direction, that is, a width direction at the uppermost portion of the display screen of the meter display 222. Hereinafter, the display screen of the meter display 222 may be simply referred to as the "display screen". The upper display region RA is provided over the entire width of the display screen. In the upper display region RA, status information is displayed. The status information is information indicating a driving automation level currently being executed, such as "IN HANDS-OFF DRIVING".

The central display region RC, the left display region RL, and the right display region RR are arranged under the upper display region RA and adjacent to the upper display region RA. The central display region RC is provided at the width-directional center of the display screen, that is, between the left display region RL and the right display region RR. The central display region RC is formed to be wider than the left display region RL and the right display region RR. The left display region RL is arranged to the left of the central display region RC. The right display region RR is arranged to the right of the central display region RC.

The central display region RC is a region for displaying a vehicle speed display T1, direction indicator display T2, a graphic road display T3, a guidance information display T4, and an input button display T5. The vehicle speed display T1 and the direction indicator display T2 are provided at the uppermost portion of the central display region RC. The guidance information display T4 and the input button display T5 are provided at the bottom of the central display region RC. The graphic road display T3 is provided at the up-down-directional center, that is, the height-directional center of the central display region RC.

The vehicle speed display T1 is a display of the current vehicle speed of the host vehicle. The vehicle speed display T1 is provided between the pair of direction indicator display T2. The direction indicator display T2 are displays of arrow-shaped images that usually light up or blink in conjunction with a lighting or blinking state of the pair of left and right direction indicator 191. That is, the HMI apparatus 20 can execute the direction indicator display T2 as direction indication displays, which are displays corresponding to direction indication modes for the direction indicator 191, which are direction indicators.

The graphic road display T3 is a graphic display corresponding to lane information and automation related information. That is, the graphic road display T3 is a display for presenting the number of lanes within a predetermined short distance range (for example, within 1 km) from the host vehicle, the position of the currently traveling lane, and the driving automation level and driver requirements in each lane. More specifically, in the graphic road display T3, driving lane line display T31, an automation level display T32, a host vehicle icon T33, a monitoring obligation icon T34, a hands-on icon T35, and an autonomous driving icon T36 can be displayed. The automation level display T32 to the autonomous driving icon T36, except for the host vehicle icon T33, correspond to "automation related information displays".

The driving lane line displays T31 are graphic displays showing a road-width-directional lane arrangement and a divergence structure within a predetermined short distance range from the host vehicle, which is a heading destination of the host vehicle on the road on which the host vehicle is currently traveling. The driving lane line displays T31 are drawn like diagonal lines such that the driving lane line displays T31 are closer to the width-directional central position of the central display region RC as the driving lane line displays T31 extend from the lower side to the upper side in the display screen. That is, the space between adjacent ones of the driving lane line displays T31 is narrower as the adjacent driving lane line displays T31 extend from the lower side to the upper side in the display screen. Accordingly, a lane divided by the pair of driving lane line displays T31 adjacent to each other is displayed with a sense of perspective such that the heading direction of the host vehicle is a direction toward the upper side in the display screen, and the width is narrower toward the upper side away from the host vehicle. The automation related information display is displayed as necessary at a position corresponding to each lane divided by a pair of ones of the driving lane line displays T31.

The automation level display T32 is a graphic display indicating a driving automation level corresponding to each lane. In the present example, the automation level display T32 is a band-shaped or thick-line-shaped graphic display extended in a lane along a direction in which the lane is extended.

The automation level display T32 is displayed in different display modes such that the hands-on driving, the hands-off driving, and the autonomous driving can be distinguished from each other. More specifically, the distinction of the display modes between the hands-on driving, the hands-off driving, and the autonomous driving can be made with, for example, at least one of hue, saturation, brightness, transparency, and pattern, typically at least hue. In the present specific example, the automation level display T32 corresponding to the hands-on driving is a yellow band-shaped display. The automation level display T32 corresponding to the hands-off driving is a green band-shaped display. The automation level display T32 corresponding to the autonomous driving is a blue band-shaped display.

The host vehicle icon T33 is a display of the lane currently being traveled clearly indicated by an isosceles-triangular image whose vertex is directed upward, that is, in the heading direction of the host vehicle. The monitoring obligation icon T34 is a graphic display indicating that the periphery monitoring obligation is imposed on the driver. In the present example, the monitoring obligation icon T34 is constituted by a figure representing an "eye". The hands-on icon T35 is a graphic display indicating that the hands-on state is requested of the driver. In the present example, the hands-on icon T35 is constituted by a figure obtained by deforming a state in which the driver holds the steering wheel 211. The autonomous driving icon T36 is a graphic display indicating the autonomous driving. In the present example, the autonomous driving icon T36 is constituted by a figure obtained by deforming a front view of the car.

The guidance information display T4 is a text display indicating traffic information and various types of guidance information. More specifically, for example, in a case where the hands-off driving can be started, the guidance information display T4 displays a fact that the hands-off driving can be started. The same applies to a case where the autonomous driving can be started. In a case where the guidance information display T4 is displayed together with an input button display T5, the guidance information display T4 corresponds to a display for urging or requesting input operation related to the displayed input button display T5.

The input button display T5 is an operation-button-shaped graphic display for receiving input operation by the driver or the like. The input button display T5 is provided under the position where the guidance information display T4 is displayed, that is, at the lowermost portion in the central display region RC.

The input button display T5 is not displayed, one input button display T5 is displayed, or a plurality of input button displays T5 is displayed as necessary. FIG. 2 illustrates an example in which one input button display T5 is displayed. FIG. 3 illustrates an example in which two input button displays T5 are displayed. As illustrated in FIG. 3, in a case where two input button displays T5 are displayed, one of the two input button displays T5 is referred to as a first input button display T51, and the other is referred to as a second input button display T52. The first input button display T51 is arranged to the left of the second input button display T52.

The left display region RL is a region for displaying a driver requirement display U. The driver requirement display U is a graphic display for visually presenting the driver with information of the driver requirements. As the driver requirement display U, a driver icon U1, a steering icon U2, and a line-of-sight icon U3 can be displayed.

The driver icon U1 is an icon image imitating a driver seated on the driver's seat. The steering icon U2 is an icon image imitating the steering wheel 211. The line-of-sight icon U3 is an arrow-shaped icon image corresponding to driver's periphery monitoring obligation and extending from the head of the driver icon U1. The driver requirement display U corresponds to the "automation related information display".

The right display region RR is a region for displaying a time chart V. The time chart V displays various events from the current position of the host vehicle to the destination arrival in time series within a displayable range. The "events" include, for example, an entry into an automatically drivable road, an exit from an automatically drivable road, a divergence, a driving mode switch, the destination arrival, and the like. More specifically, in the present embodiment, for the time chart V, a first segment V1, a second segment V2, a third segment V3, and a fourth segment V4 can be provided. The first segment V1, the second segment V2, the third segment V3, and the fourth segment V4 are arranged in this order from the lower side to the upper side. In a case where the number of displayable events is less than four, the segments are sequentially deleted from the fourth segment V4.

In the first segment V1, an event planned in the nearest future is displayed. The first segment V1 is displayed such that the first segment V1 is more conspicuous than the other segments, for example, as illustrated in FIG. 2, the left vertical ruled line is displayed with high luminance. In the second segment V2, an event planned next to the event displayed in the first segment V1 is displayed. In the third segment V3, an event planned next to the event displayed in the second segment V2 is displayed. In the fourth segment V4, an event planned next to the event displayed in the third segment V3 is displayed.

In each of the first segment V1 to the fourth segment V4, a distance display V5 and an event icon V6 are displayed. The distance display V5 is a text display indicating the planned travel distance from the current position of the host vehicle. The event icon V6 is an icon indicating the type of the event. The segment in which a distance display V5 is displayed but an event icon V6 is not displayed indicates the destination arrival. On the other hand, in a case where an event icon V6 is displayed but a distance display V5 is not displayed, it is assumed that the event corresponding to the event icon V6 is an event at the present time or for a relatively short time period from the present time.

(Display Examples)

Hereinafter, specific examples of information presentation, that is, display by the HMI apparatus 20 in various scenes or cases encountered by the host vehicle will be shown with reference to FIGS. 2 to 16 in addition to FIG. 1. In each specific example, as described above, the meter display 222 is used as an information presentation device in the HMI apparatus 20. In addition to various types of information displays on the meter display 222, a sound output corresponding to the information display is appropriately executed as necessary.

(First Display Example)

FIG. 2 illustrates a display example in a scene where the host vehicle has entered an automatically drivable road. In the present example, it is assumed that the host vehicle in manual driving has entered an automatically drivable road, and has changed lanes from an acceleration lane to a first travel purpose lane on a main roadway having three lanes on each side. In this case, the presentation control unit 256 presents, using the HMI apparatus 20, the automation related information regarding all the lanes in which the host vehicle can head in the same direction as the current heading direction on the traveling road, which is the road on which the host vehicle is traveling. The presentation control unit 256 also sets the presentation contents of the automation related information according to the type of each lane.

More specifically, in the present example, the presentation control unit 256 displays status information by text display of "IN MANUAL DRIVING" in the upper display region RA. The presentation control unit 256 also displays, in the left display region RL, the driver requirement display U corresponding to the manual driving. That is, the driver icon U1 is displayed in the "hands-on state" in which the hands are placed on the steering icon U2. The line-of-sight icon U3 is set to a displayed state, that is, a lighted state.

In manual driving, traveling in a high speed range exceeding 60 km/h is possible within the speed limit range. However, the host vehicle may travel in a travel purpose lane at a substantially constant speed in a range of the minimum speed or higher and 60 km/h or lower. Alternatively, the host vehicle may enter, for example, a low speed travel section of 60 km/h or lower or a traffic jam section due to traffic concentration. In these cases, the autonomous driving can be started on condition that the currently traveling lane is kept.

Therefore, FIG. 2 illustrates an example in which the host vehicle is traveling at 60 km/h, which is the upper limit speed of the autonomous driving, as displayed in the vehicle speed display T1 in the central display region RC. At the present time, the host vehicle is traveling in the first travel purpose lane, and the driver has not performed lane change operation. Therefore, the pair of direction indicator display T2 are both in a switched-off state. Then, when the start condition of the autonomous driving is satisfied, the presentation control unit 256 displays a guidance information display T4 and an input button display T5 relating to the autonomous driving start in the central display region RC, as illustrated in FIG. 2.

Further, in the central display region RC, the presentation control unit 256 displays the automation related information on all the lanes of three lanes on each side, that is, the first travel purpose lane, which is the currently traveling lane, a second travel purpose lane, which is an adjacent lane, and an overtake purpose lane, which is not an adjacent lane. Accordingly, automation level displays T32 and various icons, such as the monitoring obligation icon T34, are displayed in all the lanes.

On the basis of information acquired by the travel situation acquiring unit 253, the presentation control unit 256 determines whether the host vehicle has entered an automatically drivable road. Then the presentation control unit 256 presents, using the HMI apparatus 20, the automation related information substantially at the same time as the determination timing at which it is determined that the host vehicle has entered the automatically drivable road. More specifically, the presentation control unit 256 displays the automation related information at a timing when it is determined that a lane change from the acceleration lane to the first travel purpose lane has been completed. Thereafter, the presentation control unit 256 displays the guidance information display T4 and the input button display T5 at a time when the start condition of the autonomous driving is satisfied as the host vehicle stably travels at the upper limit speed of the autonomous driving or lower in the first travel purpose lane.

Here, "substantially at the same time" means that intentional delay processing or waiting processing for control does not exist between the determination timing and the presentation timing, that is, the display timing. Therefore, even if one or more processing steps exist between the determination timing and the presentation timing in a flowchart, unless the processing step generates an intentional delay state or wait state for control, both the determination timing and the presentation timing can be referred to as "substantially at the same time". The processing for generating an intentional delay state or wait state for control is specifically, for example, time measurement processing or a wait loop for intentionally generating a lapse of a predetermined time. Therefore, for example, even if some arithmetic processing exists between the determination timing and the presentation timing, and consequently, a short time difference to a predetermined extent (for example, several hundred msec) occurs between the determination timing and the presentation timing, the determination timing and the presentation timing can be referred to as "substantially at the same time".

More specifically, in the present example, immediately after the lane change from the acceleration lane to the first travel purpose lane, the host vehicle is in manual driving. Therefore, an automation level display T32 is not displayed in the currently traveling lane. Further, in manual driving, steering operation and periphery monitoring are requested of the driver. Therefore, a monitoring obligation icon T34 and a hands-on icon T35 corresponding to the driver requirements at the present time are displayed in the currently traveling lane. On the other hand, when the start condition of the autonomous driving is satisfied, an automation level display T32 corresponding to the autonomous driving for indicating that the autonomous driving can be started, and an autonomous driving icon T36 for indicating that the autonomous driving can be started are displayed in the currently traveling lane. FIG. 2 illustrates a state in which the start condition of the autonomous driving is satisfied, and the automation level display T32 and the autonomous driving icon T36 are displayed in the currently traveling lane.

In a case where a lane change to the second travel purpose lane, which is an adjacent lane, is performed, the hands-on driving or the hands-off driving is possible in the second travel purpose lane. For example, it is possible to switch to the hands-on driving or the hands-off driving before the lane change, and automatically execute the lane change after the switch. Alternatively, it is possible to change lanes by manual driving, and then switch to the hands-on driving or the hands-off driving. Therefore, among the hands-on driving and the hands-off driving, an automation level display T32 corresponding to the hands-off driving having a higher driving automation level is displayed in the second travel purpose lane. In the hands-off driving, the driver is not requested to hold the steering wheel 211, but the periphery monitoring obligation is imposed on the driver. Therefore, a monitoring obligation icon T34 is displayed in the second travel purpose lane.

In a case where the overtake purpose lane is traveled, the hands-on driving and the hands-off driving are possible, but the hands-on driving is recommended. Therefore, in the overtake purpose lane, an automation level display T32 corresponding to the hands-on driving is displayed. In the overtake purpose lane, a monitoring obligation icon T34 and a hands-on icon T35 corresponding to the hands-on driving are also displayed.

FIG. 2 illustrates, as a specific example, a time chart V corresponding to the following events. The host vehicle is going to head in a divergence direction at a junction 25 km ahead (that is, see the first segment V1), and is going to join another automatically drivable road 27 km ahead (that is, see the second segment V2). Further, the host vehicle is going to change lanes to a deceleration lane for exiting the automatically drivable road at an interchange 55 km ahead (that is, see the third segment V3), and is going to switch to the hands-on driving or the manual driving before the host vehicle passes a toll gate 57 km ahead (that is, see the fourth segment V4).

(Second Display Example)

FIG. 3 illustrates a display example in which, after the situation illustrated in FIG. 2, the host vehicle has accelerated to a vehicle speed exceeding the upper limit speed of the autonomous driving while maintaining the travel in the first travel purpose lane, and then has switched to the hands-off driving. In the hands-off driving, traveling in a high speed range exceeding 60 km/h is possible within the speed limit range. Therefore, FIG. 3 illustrates an example in which the host vehicle is traveling at 70 km/h exceeding the upper limit speed of the autonomous driving, as displayed in the vehicle speed display T1 in the central display region RC. Further, at the present time, the driver has not performed lane change operation. Therefore, the pair of direction indicator display T2 are both in a switched-off state.

In this case, the presentation control unit 256 displays status information by text display of "IN HANDS-OFF DRIVING" in the upper display region RA. The presentation control unit 256 also displays a driver requirement display U corresponding to the hands-off driving in the left display region RL. In the hands-off driving, the driver is not requested to hold the steering wheel 211, but the periphery monitoring obligation is imposed on the driver. Therefore, the driver icon U1 is displayed in the "hands-off state", in which the hands are apart from the steering icon U2. The line-of-sight icon U3 is set to a displayed state, that is, a lighted state.

In the present example, it is assumed that after the switch to the hands-off driving, a low speed travel section appears in front of the currently traveling lane. In the hands-off driving, a lane change can be executed without interrupting or ending the currently executed hands-off driving. Therefore, the host vehicle can automatically change lanes to the second travel purpose lane to avoid low speed traveling under the hands-off driving, or can keep the currently traveling lane considering the entry into the low speed travel section and switch to the autonomous driving. That is, the present example corresponds to a scene where the host vehicle may change lanes from the currently traveling lane to an adjacent lane. Therefore, the presentation control unit 256 presents, using the HMI apparatus 20, the automation related information regarding the currently traveling lane and the adjacent lane.

More specifically, in the first travel purpose lane, which is the currently traveling lane, an automation level display T32 corresponding to the currently executed hands-off driving, and a monitoring obligation icon T34 corresponding to driver requirements at the present time are displayed. The hands-off driving can be maintained before and after the lane change from the currently traveling lane to the adjacent lane. Therefore, an automation level display T32 corresponding to the hands-off driving and a monitoring obligation icon T34 corresponding to driver requirements at the time of traveling in the adjacent lane are also displayed in the second travel purpose lane, which is the adjacent lane. The automation level display T32 corresponding to the hands-off driving in the first travel purpose lane and the automation level display T32 corresponding to the hands-off driving in the second travel purpose lane are displayed such that both the automation level displays T32 can be distinguished from each other. More specifically, in the present example, the outline of the automation level display T32 corresponding to the hands-off driving in the first travel purpose lane is displayed with high saturation or high luminance.

The presentation control unit 256 also displays a selective display with a guidance information display T4 and an input button display T5 in the central display region RC. The "selective display" is a display corresponding to selection operation for selecting a planned travel lane of the host vehicle, and corresponds to an HMI display for making the driver select whether to change lanes. More specifically, in the present example, in the guidance information display T4, information to the effect that a low speed travel section has occurred in front of the currently traveling lane. As the input button display T5, a first input button display T51 for selecting keeping the currently traveling lane, and a second input button display T52 for selecting a lane change to the right adjacent lane are displayed.

The presentation control unit 256 displays, using the HMI apparatus 20, the selective display such that the selective display is correlated with the display of the automation related information corresponding to the driving automation level. That is, the display of the input button display T5 is associated with the display of the automation level display T32. More specifically, as illustrated in FIG. 3, the first input button display T51 for selecting keeping the currently traveling lane is displayed on the left side in a display mode similar to the display mode of the automation level display T32 corresponding to the hands-off driving in the first travel purpose lane. The second input button display T52 for selecting a lane change to the second travel purpose lane, which is the right adjacent lane, is displayed on the right side in a display mode similar to the display mode of the automation level display T32 corresponding to the hands-off driving in the second travel purpose lane.

The presentation control unit 256 displays the automation related information display and the selective display substantially at the same time as the determination timing at which it is determined that the host vehicle may change lanes from the currently traveling lane to the adjacent lane. The determination timing in this case is a timing at which it is determined that the planned travel distance or the planned travel time period between the host vehicle and the low speed travel section in front of the currently traveling lane has become less than a predetermined value. At the present time, the host vehicle is traveling on the first travel purpose lane. Therefore, the overtake purpose lane that is not adjacent to the first travel purpose lane, which is the currently traveling lane, is not a direct lane change destination from the currently traveling lane. Therefore, in the present example, in the overtake purpose lane, automation related information, that is, an automation level display T32, a monitoring obligation icon T34, and a hands-on icon T35 are not displayed.

As described above, in the present example, the presentation control unit 256 displays, using the HMI apparatus 20, the automation related information display and the selective display, as the HMI display for making the driver determine whether to change lanes. Accordingly, the driver can appropriately grasp the information relating to the relationship between the lane change and the driving automation level and/or the driver requirements. Therefore, the driver's determination relating to the lane change can be well supported.

(Third Display Example)

Figure 4:
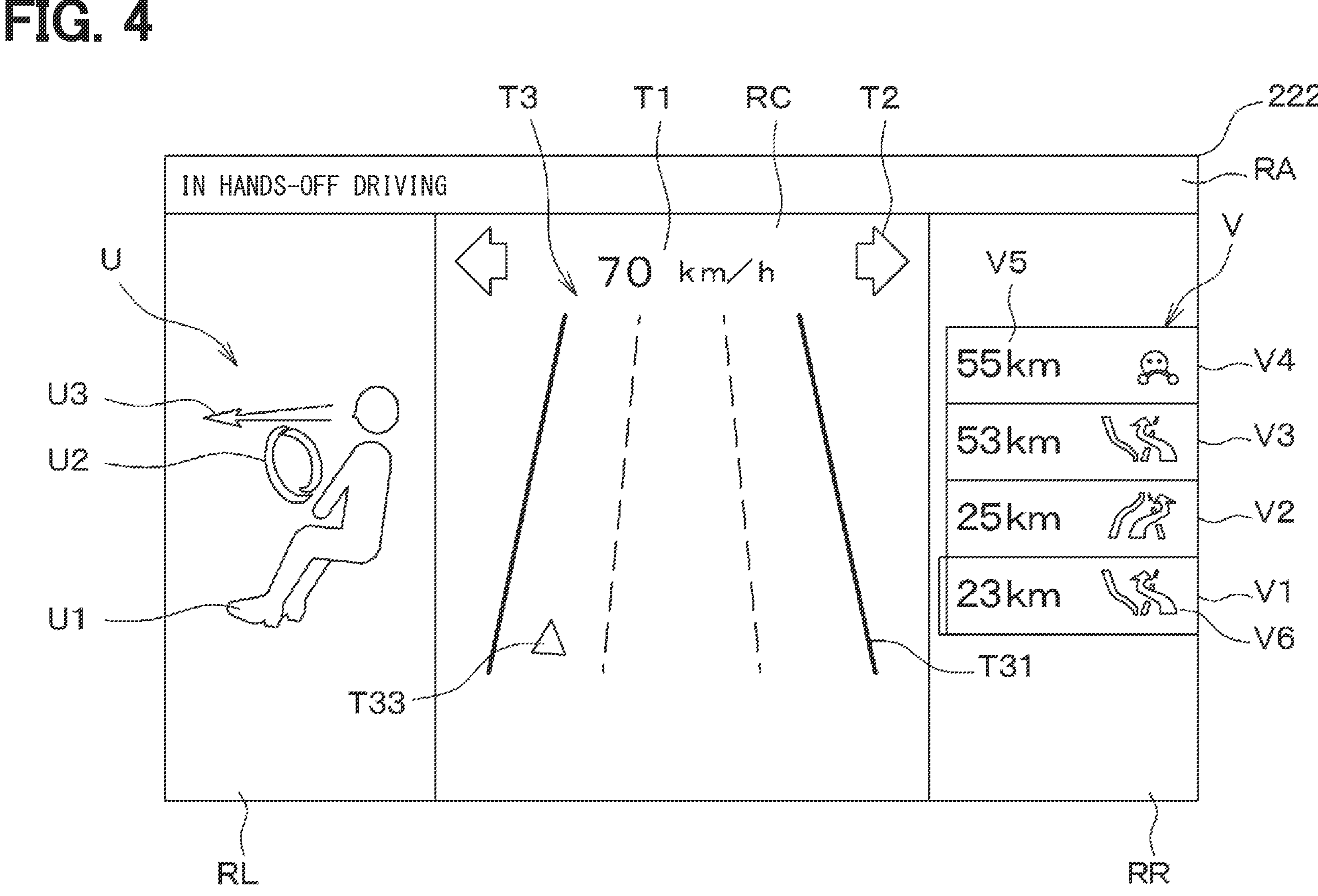
FIG. 4 is a schematic diagram illustrating a display example of the meter display according to the first operation example of HMI control apparatus illustrated in FIG. 1.

FIG. 4 illustrates a display example in a case where in the situation illustrated in FIG. 3, input operation is performed on the first input button display T51 for selecting keeping the currently traveling lane. In the present example, the in-vehicle system 10, that is, the driving control ECU 18 is executing the hands-off driving. Therefore, the presentation control unit 256 displays status information by text display of "IN HANDS-OFF DRIVING" in the upper display region RA. The presentation control unit 256 also displays a driver requirement display U corresponding to the hands-off driving in the left display region RL.

In the present example, the driver has selected a refusal of the lane change. That is, the present example corresponds to a case where the lane change from the currently traveling lane to the adjacent lane is not executed. Therefore, in this case, the presentation control unit 256 does not display the HMI display for making the driver determine whether to change lanes. More specifically, in the present example, the presentation control unit 256 deletes the automation related information display and the selective display in the currently traveling lane and the adjacent lane. Accordingly, the visibility of the HMI display in a case where the driver has selected the keeping the currently traveling lane is improved.

(Fourth Display Example)

Figure 5:
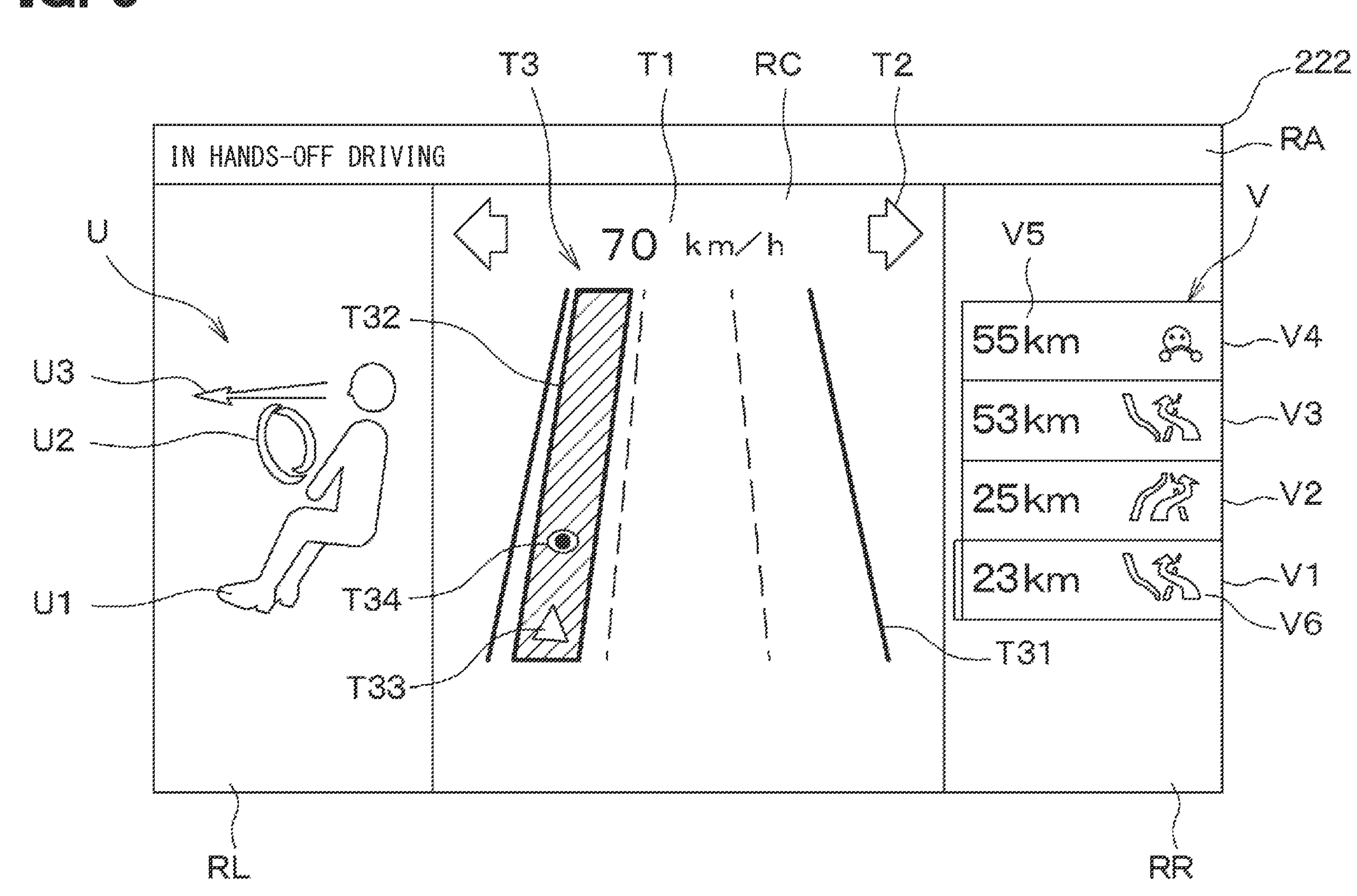
FIG. 5 is a schematic diagram illustrating a display example of the meter display according to the first operation example of HMI control apparatus illustrated in FIG. 1.

FIG. 5 illustrates a display example in a case where in the situation illustrated in FIG. 3, no input operation is performed on the first input button display T51 and the second input button display T52. In the present example, the in-vehicle system 10 is executing the hands-off driving. Therefore, the presentation control unit 256 displays status information by text display of "IN HANDS-OFF DRIVING" in the upper display region RA. The presentation control unit 256 also displays a driver requirement display U corresponding to the hands-off driving in the left display region RL.

In the present example, the driver has not selected a permission for or a refusal of the lane change. That is, the present example corresponds to a case where the lane change from the currently traveling lane to the adjacent lane is not executed. Therefore, in this case, the presentation control unit 256 does not display the HMI display for making the driver determine whether to change lanes.

That is, in the present example, the presentation control unit 256 changes the HMI display regarding the driving automation level and the driver requirements, from the display regarding the currently traveling lane and the adjacent lane to the display regarding only the currently traveling lane. More specifically, the presentation control unit 256 does not display the selective display, and deletes the automation related information display regarding the adjacent lane. On the other hand, the presentation control unit 256 maintains the automation related information display regarding the currently traveling lane. Accordingly, in a case where the driver does not select a permission for or a refusal of the lane change, the visibility of the HMI display is improved.

(Fifth Display Example)

Figure 6:
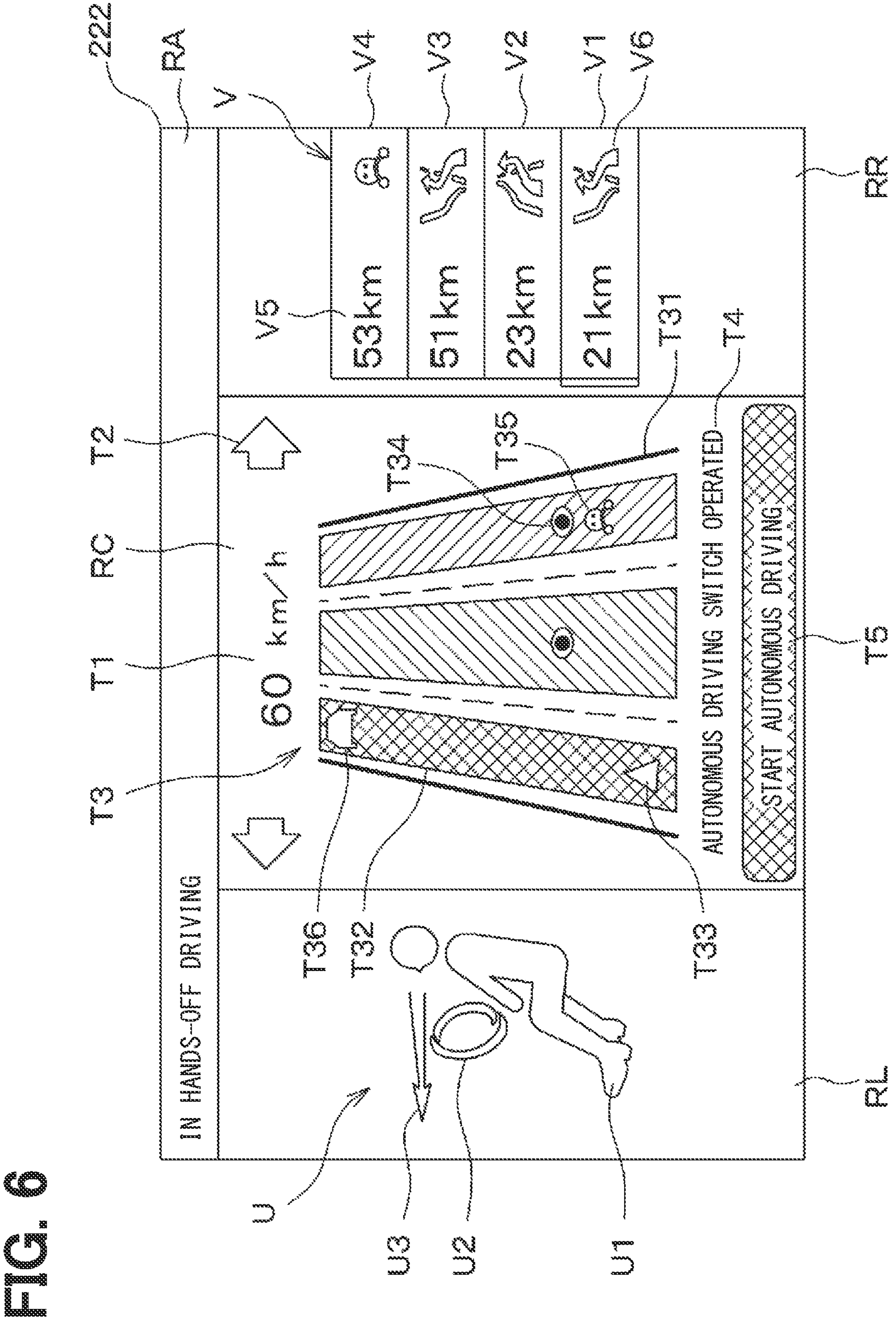
FIG. 6 is a schematic diagram illustrating a display example of the meter display according to the first operation example of HMI control apparatus illustrated in FIG. 1.

FIG. 6 illustrates a display example in a case where from the situation illustrated in FIG. 5, the host vehicle decelerates to the upper limit speed of the autonomous driving, and then an autonomous driving switch provided in the operation unit 21 is operated. That is, the present example corresponds to a scene where the driver has executed autonomous driving start operation. In this case, the presentation control unit 256 presents, using the HMI apparatus 20, automation related information regarding all the lanes in which the host vehicle can head in the same direction as the current heading direction on the traveling road. The presentation control unit 256 presents, using the HMI apparatus 20, the automation related information substantially at the same time as an determination timing at which it is determined that the above-described autonomous driving switch is operated. Accordingly, the driver can grasp well the lane information and the automation related information corresponding to each lane.

Even if the driver operates the autonomous driving switch, the operation may be erroneous operation. Therefore, in the present example, the in-vehicle system 10, that is, the driving control ECU 18 continues the hands-off driving until the driver performs approval operation. Therefore, the presentation control unit 256 displays status information by text display of "IN HANDS-OFF DRIVING" in the upper display region RA. The presentation control unit 256 also displays a driver requirement display U corresponding to the hands-off driving in the left display region RL. The presentation control unit 256 also executes, with a guidance information display T4 and an input button display T5, a display for receiving approval operation for the autonomous driving start.

(Sixth Display Example)

Figure 7:
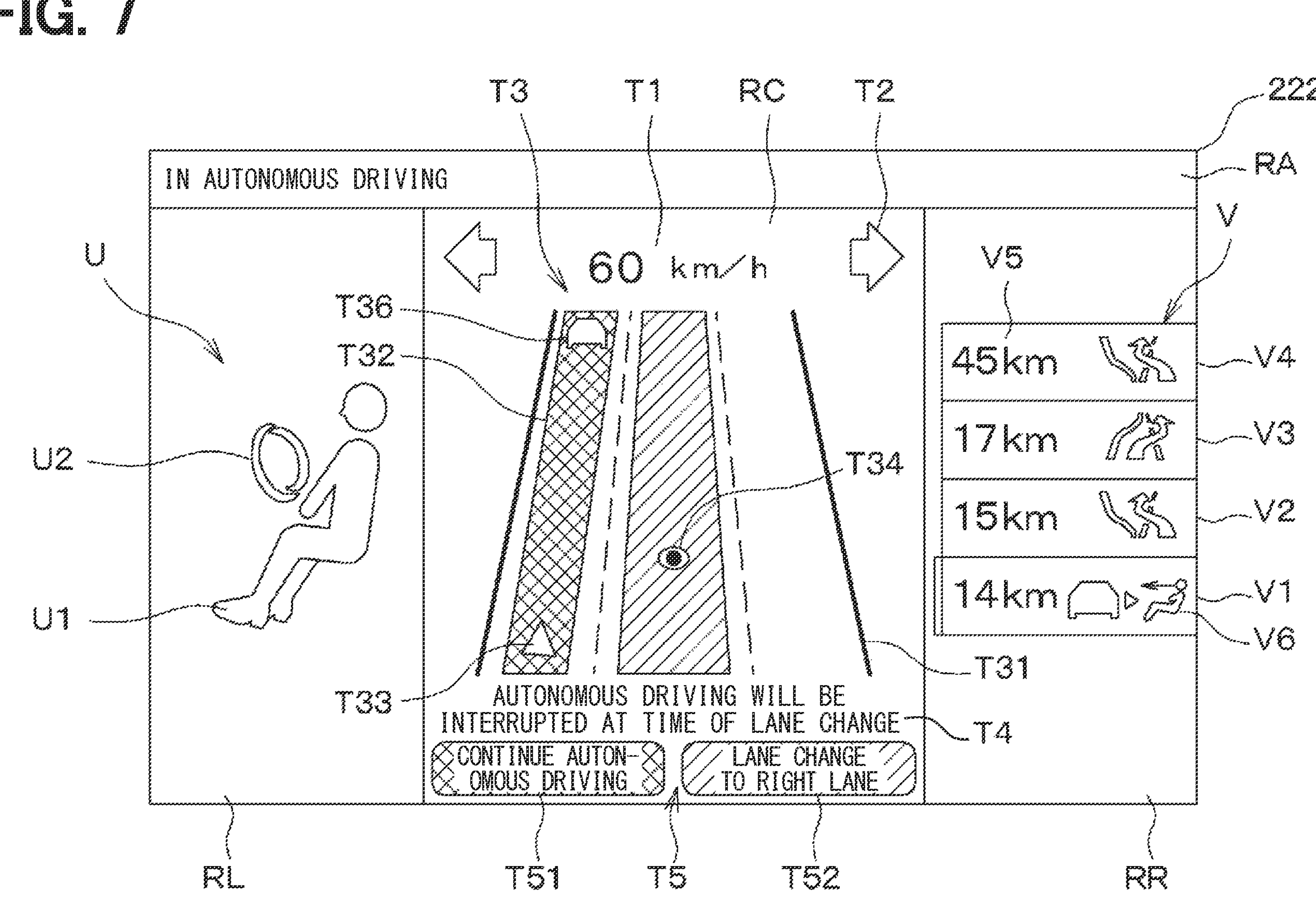
FIG. 7 is a schematic diagram illustrating a display example of the meter display according to the first operation example of HMI control apparatus illustrated in FIG. 1.

FIG. 7 illustrates a display example after a lapse of some time from the start of the autonomous driving started by receipt of approval operation for the autonomous driving start with the input button display T5 in the situation illustrated in FIG. 6. In this case, the presentation control unit 256 displays status information by text display of "IN AUTONOMOUS DRIVING" in the upper display region RA. The presentation control unit 256 also displays, in the left display region RL, a driver requirement display U corresponding to the autonomous driving. That is, the driver icon U1 is displayed in the "hands-off state", in which the hands are apart from the steering icon U2. The line-of-sight icon U3 is set to a non-displayed state, that is, a non-lighted state.

In the present example, the autonomous driving at a relatively low speed of 60 km/h or lower is continued with while the travel in the first travel purpose lane, which is the currently traveling lane, is maintained, so that a second task can be used. On the other hand, low speed traveling in the currently traveling lane can be avoided, so that it is possible to travel in a high speed range exceeding 60 km/h in the second travel purpose lane, which is the adjacent lane. In particular, in a case where the vehicle speed in a low speed travel section occurring in the currently traveling lane decelerates to an extent corresponding to traffic jam travel, the demand for lane change by the driver may rise. However, at the time of a lane change to the second travel purpose lane, it is necessary to interrupt or end the autonomous driving, but an automated lane change by the hands-off driving is possible.

As described above, the present example corresponds to a scene where the host vehicle may change lanes from the currently traveling lane to the adjacent lane. Therefore, the presentation control unit 256 presents, using the HMI apparatus 20, the automation related information regarding the currently traveling lane and the adjacent lane. More specifically, in the first travel purpose lane, which is the currently traveling lane, an automation level display T32 corresponding to the autonomous driving and an autonomous driving icon T36 are displayed to indicate that the autonomous driving is being performed. In the second travel purpose lane, which is the adjacent lane, an automation level display T32 corresponding to the hands-off driving and a monitoring obligation icon T34 are displayed to indicate that the hands-off driving will be executed when the lane change is performed to travel the second travel purpose lane. No automation related information display is displayed in the overtake purpose lane, which is not adjacent to the first travel purpose lane, which is the currently traveling lane, and is not a lane change destination.

The presentation control unit 256 also displays a selective display with a guidance information display T4 and an input button display T5 in the central display region RC. More specifically, in the present example, the presentation control unit 256 displays, in the guidance information display T4, information to the effect that the autonomous driving will be interrupted at the time of the lane change. That is, in a case where the autonomous driving, which is the superior automation level, is being executed, the presentation control unit 256 executes, before the lane change, an attention drawing notification to the effect that the autonomous driving will be interrupted or ended to be switched to the inferior automation level. The guidance information display T4 in this case is included in the "automation related information" in the present disclosure. As the input button display T5, a first input button display T51 for selecting autonomous driving continuation by keeping the currently traveling lane, and a second input button display T52 for selecting interrupting the autonomous driving to execute a lane change to the right adjacent lane are displayed.

The presentation control unit 256 displays, using the HMI apparatus 20, the selective display such that the selective display is correlated with the display of the automation related information corresponding to the driving automation level. That is, the display of the input button display T5 is associated with the display of the automation level display T32. More specifically, as illustrated in FIG. 7, the first input button display T51 for selecting autonomous driving continuation by keeping the currently traveling lane is displayed on the left side in a display mode similar to the display mode of the automation level display T32 corresponding to the autonomous driving in the first travel purpose lane. The second input button display T52 for selecting switching to the hands-off driving to change lanes to the second travel purpose lane, which is the right adjacent lane, is displayed on the right side in a display mode similar to the display mode of the automation level display T32 corresponding to the hands-off driving in the second travel purpose lane.

As described above, when the vehicle heads in a divergence direction at a junction, it is necessary to temporarily end the currently executed autonomous driving to change lanes to a divergence guiding lane that appears on the left side of the first travel purpose lane, that is, on the road shoulder side. However, if the autonomous driving switches to the hands-off driving, the in-vehicle system 10 can automatically change lanes. Therefore, in the first segment V1 in the time chart V, the presentation control unit 256 displays an event icon V6 corresponding to the switch from the autonomous driving to the hands-off driving together with a distance display V5. Accordingly, in the first segment V1 in the time chart V, the time until which the switch from the autonomous driving to the inferior automation level, that is, the driving mode switch is necessary is displayed.

(Seventh Display Example)

Figure 8:
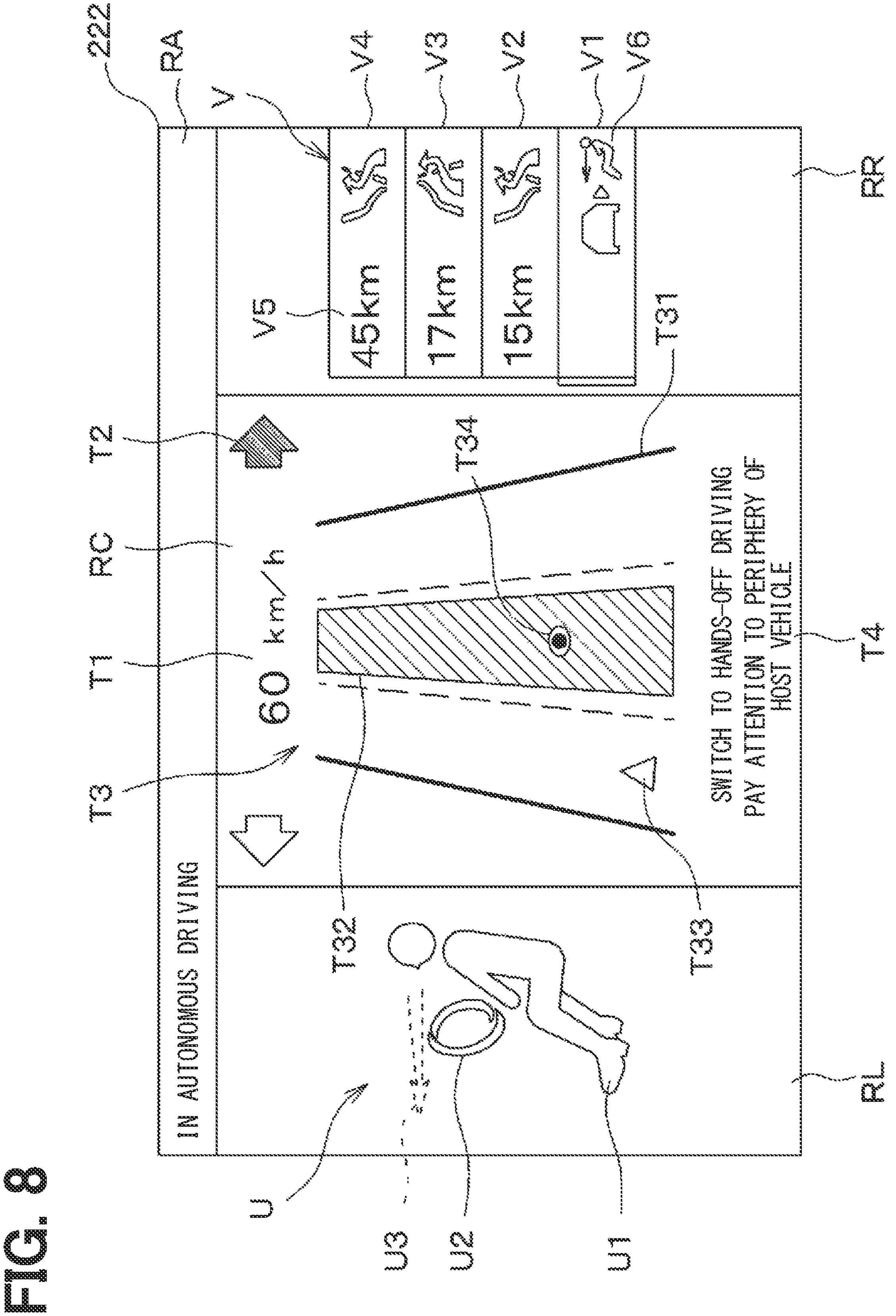
FIG. 8 is a schematic diagram illustrating a display example of the meter display according to the first operation example of HMI control apparatus illustrated in FIG. 1.

FIG. 8 illustrates a display example in a case where in the situation illustrated in FIG. 7, input operation is performed on the second input button display T52 for changing lanes to the right. In this case, the presentation control unit 256 displays and lights or displays and blinks the direction indicator display T2 corresponding to the rightward heading. In a case where the direction indicator switch 212 has not been operated at this time, the direction indicator command output unit 257 outputs a lighting-up interruption command signal to the direction indicator ECU 19. Accordingly, the direction indicator 191 corresponding to the rightward heading light up or blink.

At this time, it is assumed that the driver's input of the decision on the lane change has been received by the HMI apparatus 20 as described above, but the driving mode switch for interrupting the autonomous driving and switching to the hands-off driving has not been completed. In this case, the presentation control unit 256 displays status information by text display of "IN AUTONOMOUS DRIVING" in the upper display region RA.

The driver needs to fulfil the periphery monitoring obligation to perform switch to the hands-off driving and a lane change. Therefore, the presentation control unit 256 displays, in the left display region RL, a driver icon U1 in the hands-off state, and displays and blinks a line-of-sight icon U3 to improve the visibility of the line-of-sight icon U3 to draw attention to the periphery monitoring obligation. The displaying and blinking of the line-of-sight icon U3 is included in the attention drawing notification to the effect that the autonomous driving will be interrupted to be switched to the inferior automation level.

In the right display region RR, the presentation control unit 256 displays, in the first segment V1 in the time chart V, an event icon V6 corresponding to the switch from the autonomous driving to the hands-off driving, that is, the driving mode switch, while not displaying a distance display V5. Accordingly, the necessity for the driving mode switch at the present time is displayed in the time chart V. The display of the first segment V1 is included in the attention drawing notification to the effect that the autonomous driving will be interrupted to be switched to the inferior automation level.

In the central display region RC, the presentation control unit 256 changes the HMI display regarding the driving automation level and the driver requirements, from the display regarding the currently traveling lane and the adjacent lane to the display regarding only the adjacent lane. More specifically, the presentation control unit 256 does not display the selective display, and deletes the automation related information display regarding the currently traveling lane. On the other hand, the presentation control unit 256 maintains the automation related information display regarding the adjacent lane.

The presentation control unit 256 also displays a guidance information display T4 for drawing attention relating to switch from the autonomous driving to the hands-off driving, and the periphery monitoring obligation. That is, in a case where the autonomous driving, which is the superior automation level, is being executed, the presentation control unit 256 executes, before the lane change, an attention drawing notification to the effect that the autonomous driving will be interrupted to be switched to the inferior automation level. The guidance information display T4 in this case is included in the "automation related information" in the present disclosure.

(Eighth Display Example)

Figure 9:
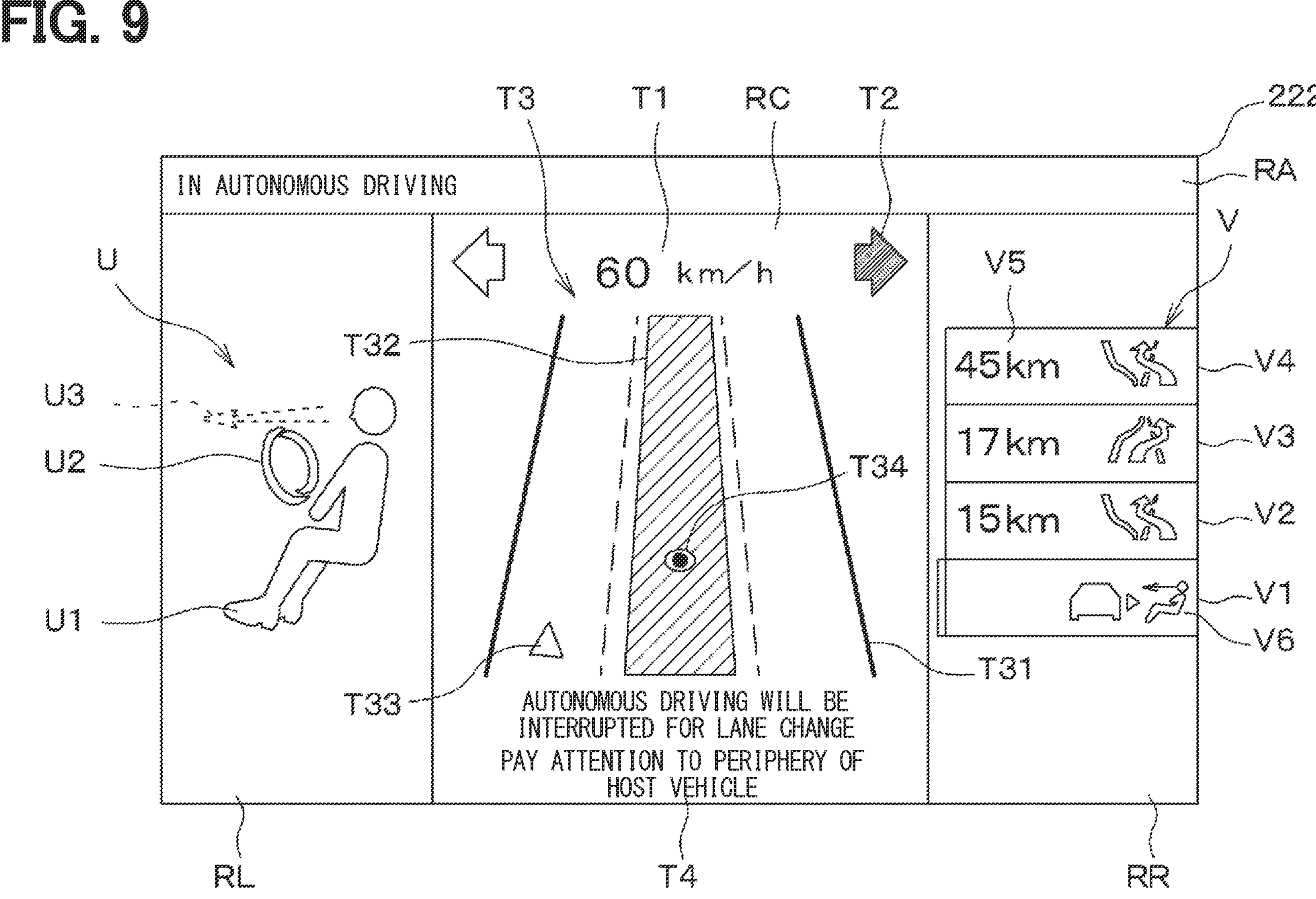
FIG. 9 is a schematic diagram illustrating a display example of the meter display according to the first operation example of HMI control apparatus illustrated in FIG. 1.

FIG. 9 illustrates a display example in a case where in the situation illustrated in FIG. 8, the driver neglects periphery monitoring corresponding to the attention drawing notification. That is, the movement of the host vehicle in the lateral direction (that is, the right direction in the present example) for the lane change is waited for until the driving mode switch including the execution of the periphery monitoring by the driver is performed. During such a wait for the lane change, the presentation control unit 256 executes the HMI display illustrated in FIG. 9 for a predetermined time.

That is, the presentation control unit 256 maintains the display of the status information of "IN AUTONOMOUS DRIVING" in the upper display region RA and the displaying and blinking of the line-of-sight icon U3, which have been displayed in the display example in FIG. 8. The presentation control unit 256 also displays a guidance information display T4 to the effect that the autonomous driving is interrupted to change lanes, and for drawing attention relating to the periphery monitoring obligation. As described above, in a case where a driver behavior corresponding to the attention drawing notification has not been confirmed, the presentation control unit 256 notifies to the effect that the superior automation level is continuing, and executes again the attention drawing notification.

At this time, at least lighting or blinking of the direction indicator 191 is temporarily stopped. That is, in a case where a direction indicator display T2 is executed by the determination of the execution of the lane change, and a driver behavior corresponding to the attention drawing notification has not been confirmed, the HMI control apparatus 25 executes processing for switching off the direction indicator 191. At this time, the lighted or blinked state of the direction indicator display T2 in the meter display 222 may be maintained to draw attention relating to the lane change. The HMI display illustrated in FIG. 9 is similar to the HMI display illustrated in FIG. 8 except for the above description.

(Ninth Display Example)

Figure 10:
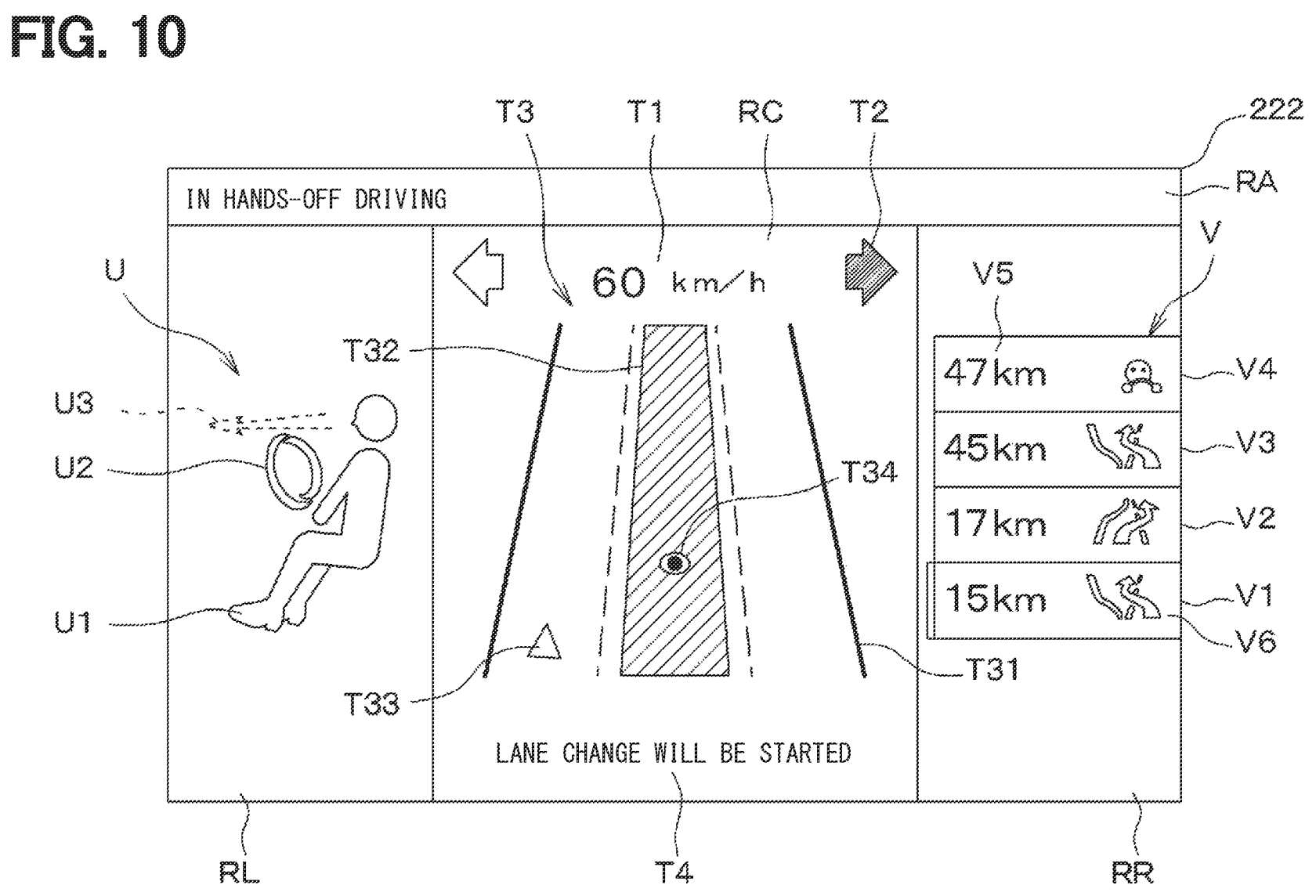

FIG. 10 illustrates a display example in a case where in the situation illustrated in FIG. 8, the driver has fulfilled the periphery monitoring obligation according to the attention drawing notification. In this case, the driving mode switch and the switch from the autonomous driving to the hands-off driving due to the driving mode switch are completed at this time.

Therefore, the presentation control unit 256 displays status information by text display of "IN HANDS-OFF DRIVING" in the upper display region RA. The presentation control unit 256 also displays a driver requirement display U corresponding to the hands-off driving in the left display region RL. The presentation control unit 256 displays and blinks a line-of-sight icon U3 to improve the visibility of the line-of-sight icon U3 to draw attention to periphery monitoring during the lane change. The presentation control unit 256 also deletes the display of an event corresponding to the switch from the autonomous driving to the hands-off driving in the time chart V.

In the present example, it is assumed that the switch from the autonomous driving to the hands-off driving is completed by the driving mode switch, but the lateral movement of the host vehicle is not yet started. In this case, the presentation control unit 256 displays a guidance information display T4 to the effect that the lane change will be started. That is, in a case where a driver behavior corresponding to the attention drawing notification has been confirmed, the presentation control unit 256 executes a lane change notification, which is a notification indicating the execution of the lane change. The HMI display illustrated in FIG. 10 is similar to the HMI display illustrated in FIG. 8 except for the above description.

(Tenth Display Example)

Figure 11:
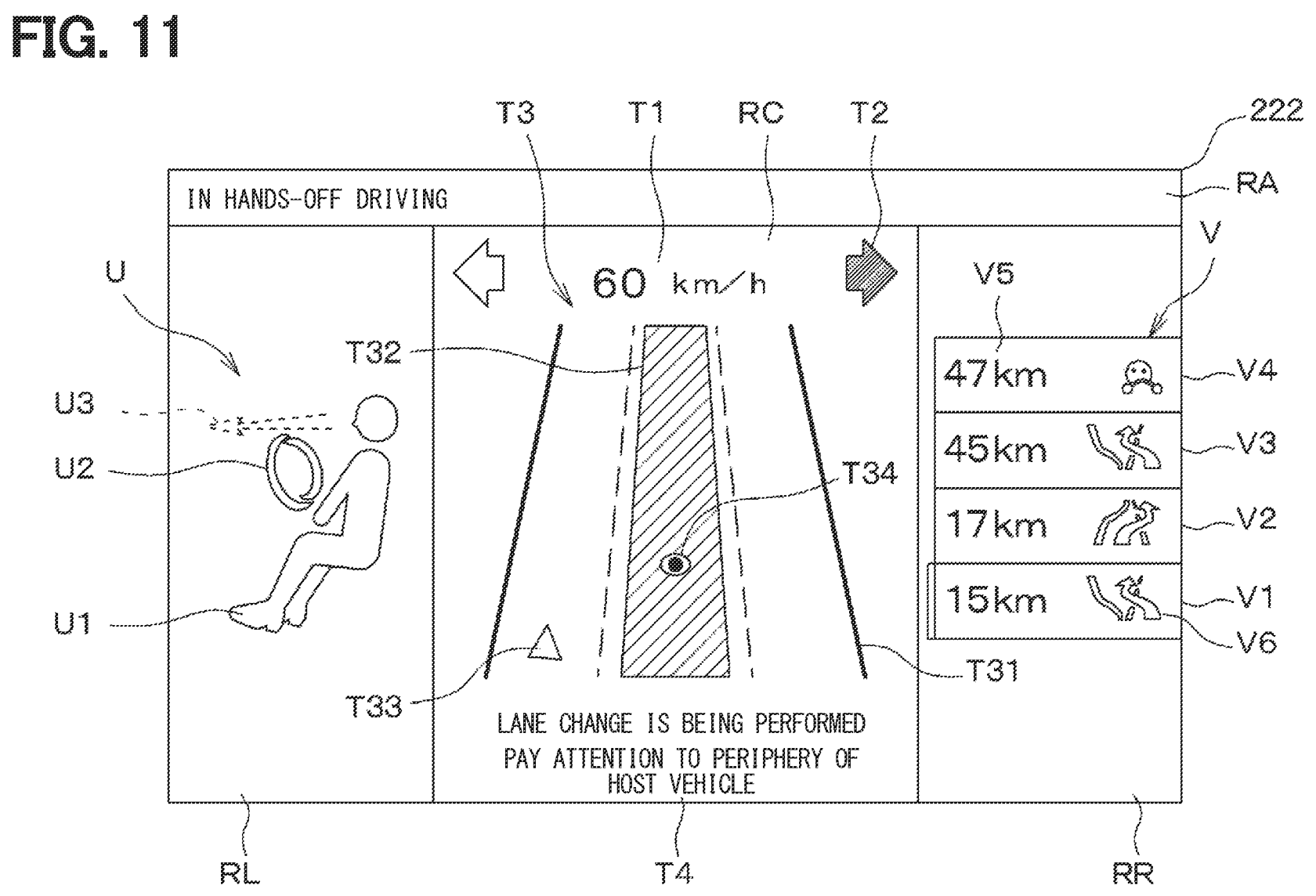

FIG. 11 illustrates a display example in a case where the driver neglects periphery monitoring after the lane change control by the in-vehicle system 10, that is, the driving control ECU 18 is started and the HMI display illustrated in FIG. 10 is executed. More specifically, for example, the driver may neglect periphery monitoring between the start of the HMI display illustrated in FIG. 10 and the actual start of the lateral movement of the host vehicle. Alternatively, for example, the driver may neglect periphery monitoring after the start of the lateral movement of the host vehicle.

That is, the present example corresponds to a case where after a driver behavior corresponding to the attention drawing notification relating to the periphery monitoring is confirmed, the driver requirements corresponding to the periphery monitoring fail to be satisfied before the start of execution of the lane change. Alternatively, the present example corresponds to a case where the driver requirements corresponding to the periphery monitoring fail to be satisfied after the start of execution of the lane change.

In this case, the presentation control unit 256 displays a guidance information display T4 for requesting the driver to monitor the periphery during the lane change. That is, the presentation control unit 256 executes an attention drawing notification relating to the periphery monitoring. The HMI display illustrated in FIG. 11 is similar to the HMI display illustrated in FIG. 10 except for the above description.

(Eleventh Display Example)

Figure 12:
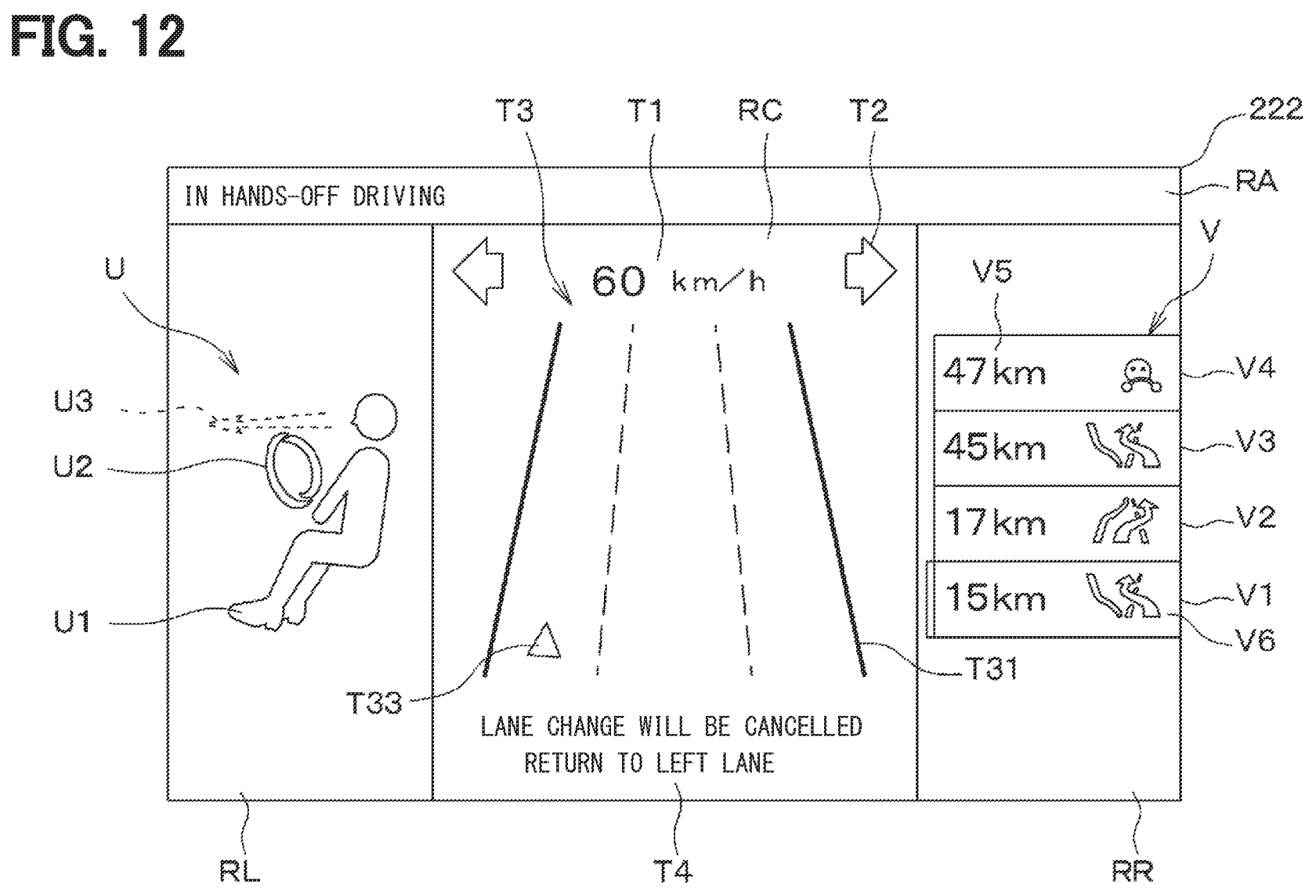

FIG. 12 illustrates a display example in a case where the lane change is canceled in the situation illustrated in FIG. 11. In this case, the presentation control unit 256 executes a notification to the effect that the lane change will be canceled. More specifically, the presentation control unit 256 displays, in a guidance information display T4, information to the effect that the lane change will be canceled. The presentation control unit 256 also executes a notification relating to a return to the currently traveling lane, that is, the first travel purpose lane. More specifically, the presentation control unit 256 displays, in the guidance information display T4, information to the effect that a return to traveling in the first travel purpose lane will be performed.

At the time of the return to the currently traveling lane accompanying the cancellation of the lane change, it is preferable that the driver sufficiently monitors the periphery of the host vehicle. Therefore, the presentation control unit 256 displays and blinks a line-of-sight icon U3 to improve the visibility of the line-of-sight icon U3 to draw attention to the periphery monitoring obligation.

The presentation control unit 256 also stops the lighting or blinking of the direction indicator display T2 corresponding to the rightward heading. The direction indicator command output unit 257 outputs a switching-off interruption command signal to the direction indicator ECU 19. Then the lighting or blinking of the direction indicator 191 is stopped. Accordingly, the driver of another vehicle traveling around the host vehicle can grasp well that the host vehicle has canceled the lane change.

The present example corresponds to a case where the driver selects a refusal of the lane change as a result. Therefore, the presentation control unit 256 deletes the automation related information displays in the currently traveling lane and the adjacent lane. The HMI display illustrated in FIG. 12 is similar to the HMI display illustrated in FIG. 10 except for the above description.

(Twelfth Display Example)

FIG. 13 illustrates a display example in a case where the lane change is completed after the situation illustrated in FIG. 10 or 11. In this case, the presentation control unit 256 moves the host vehicle icon T33 to the second travel purpose lane, that has been the lane change destination in this lane change. The presentation control unit 256 does not display the automation related information displays in the lane currently being traveled and the adjacent lanes. The presentation control unit 256 ends the displaying and blinking of the line-of-sight icon U3.

The presentation control unit 256 also stops the lighting or blinking of the direction indicator display T2 corresponding to the rightward heading. The direction indicator command output unit 257 outputs a switching-off interruption command signal to the direction indicator ECU 19. Accordingly, the lighting or blinking of the direction indicator 191 is stopped. The HMI display illustrated in FIG. 13 is similar to the HMI display illustrated in FIG. 10 except for the above description.

(Thirteenth Display Example)

FIGS. 14 and 15 illustrate display examples in a case where there is a possibility of a lane change between a travel purpose lane and an overtake purpose lane that are adjacent to each other, unlike a case where there is a possibility of a lane change between two adjacent travel purpose lanes, such as FIG. 3. FIG. 14 illustrates a case where the host vehicle is in the hands-off driving in a travel purpose lane of two lanes on each side. More specifically, the present example is a case where since a preceding vehicle traveling at a low speed appears in front of the currently traveling lane in the hands-off driving, the in-vehicle system 10 makes a lane change proposal, that is, an overtake proposal.

The present example corresponds to a scene where the host vehicle may change lanes from the currently traveling lane to an adjacent lane. The present example also corresponds to a case where the host vehicle executes a lane change to overtake a preceding vehicle. Therefore, the presentation control unit 256 presents, using the HMI apparatus 20, automation related information regarding the travel purpose lane, which is the currently traveling lane, and the overtake purpose lane, which is the adjacent lane. The presentation control unit 256 also executes an attention drawing notification relating to periphery monitoring until the overtake is completed.

More specifically, in the hands-off driving, even if the currently executed hands-off driving is not interrupted or ended, the in-vehicle system 10 can automatically change lanes as far as completion of the overtake. However, in a case where a lane change to the right overtake purpose lane is performed to overtake the preceding vehicle, it is preferable to execute attention drawing relating to periphery monitoring considering the possibility of unexpected behavior of the preceding vehicle and other vehicles traveling in the overtake purpose lane. The same applies to the case of a second lane change at a time of a return from the overtake purpose lane to the travel purpose lane. Therefore, the presentation control unit 256 displays and blinks a line-of-sight icon U3 to improve the visibility of the line-of-sight icon U3 to draw attention to the periphery monitoring obligation. The displaying and blinking are continued until the overtake is completed and then the host vehicle returns to the travel purpose lane.

The host vehicle can perform the hands-off driving in both the travel purpose lane and the overtake purpose lane. Therefore, the presentation control unit 256 displays automation related information corresponding to the hands-off driving, that is, an automation level display T32 and a monitoring obligation icon T34 in both the travel purpose lane and the overtake purpose lane. The automation level display T32 corresponding to the hands-off driving in the travel purpose lane and the automation level display T32 corresponding to the hands-off driving in the overtake purpose lane are displayed such that both the automation level displays T32 can be distinguished from each other. More specifically, in the present example, the outline of the automation level display T32 corresponding to the hands-off driving in the travel purpose lane is displayed with high saturation or high luminance.

In the time chart V, the presentation control unit 256 displays, in the first segment V1, an event icon V6 corresponding to the lane change to the overtake purpose lane at the present time. The presentation control unit 256 also displays, in the second segment V2, an event icon V6 corresponding to a return to the travel purpose lane, which will be as soon as possible after the lane change to the overtake purpose lane is performed and the above-described preceding vehicle is overtaken. Accordingly, in the time chart V, it is indicated that the first lane change from the travel purpose lane, which is the lane currently being traveled, to the overtake purpose lane will be performed, and then the second lane change to the travel purpose lane will be performed. The events corresponding to the first segment V1 and the second segment V2 are events at the present time or for a relatively short time period from the present time. Therefore, the presentation control unit 256 does not display a distance display V5 in the first segment V1 and the second segment V2.

The presentation control unit 256 also displays a selective display with a guidance information display T4 and an input button display T5 in the central display region RC. More specifically, in the present example, in the guidance information display T4, information to the effect that the return to the travel purpose lane will be performed immediately after completion of the overtake, and information relating to drawing attention relating to periphery monitoring until completion of the overtake are displayed. As the input button display T5, a first input button display T51 for selecting keeping the currently traveling lane, and a second input button display T52 for approving the overtake are displayed.

The presentation control unit 256 displays, using the HMI apparatus 20, the selective display such that the selective display is correlated with the display of the automation related information corresponding to the driving automation level. That is, the display of the input button display T5 is associated with the display of the automation level display T32. More specifically, the first input button display T51 for selecting keeping the currently traveling lane is displayed on the left side in a display mode similar to the display mode of the automation level display T32 corresponding to the hands-off driving in the travel purpose lane. The second input button display T52 for approving the overtake is displayed on the right side in a display mode similar to the display mode of the automation level display T32 corresponding to the hands-off driving in the overtake purpose lane. The presentation control unit 256 displays the automation related information display and the selective display substantially at the same time as the determination timing at which it is determined that the host vehicle may change lanes from the currently traveling lane to the adjacent lane. The determination timing in this case is a timing at which it is determined that the planned travel distance or the planned travel time period between the host vehicle and the preceding vehicle that has appeared in front of the currently traveling lane and is traveling at a low speed has become less than a predetermined value.

(Fourteenth Display Example)

FIG. 15 is the example of FIG. 14 changed into a situation where the host vehicle is in the autonomous driving. The present example corresponds to a scene where the host vehicle may change lanes from the currently traveling lane to an adjacent lane. The present example also corresponds to a case where the host vehicle executes a lane change to overtake a preceding vehicle. Therefore, the presentation control unit 256 presents, using the HMI apparatus 20, automation related information regarding the travel purpose lane, which is the currently traveling lane, and the overtake purpose lane, which is the adjacent lane. That is, the presentation control unit 256 executes a notification relating to switch to the inferior automation level. The presentation control unit 256 also executes an attention drawing notification relating to periphery monitoring until completion of the overtake due to a return of the host vehicle to the travel purpose lane.

In a case where in the autonomous driving, a lane change request occurs due to operation of the direction indicator switch 212 operated by the driver, or the like, it is necessary to interrupt or end the autonomous driving being executed to actually execute the lane change as requested. The switch from the autonomous driving to the hands-off driving or the hands-on driving allows an automated lane change performed by the in-vehicle system 10.

However, it is assumed that in the autonomous driving, driver's awareness is away from the driving due to use of a second task or the like. Therefore, in order to effectively enhance the driver's awareness of the driving, at the time of the lane change for the overtake, it is preferable to execute switch from the autonomous driving to the hands-on driving, and a driving mode switch for the switch. Therefore, before the execution of the automated lane change by the in-vehicle system 10, the presentation control unit 256 executes, as presentation of automation related information, an attention drawing notification, which is a notification relating to the switch to the hands-on driving, which is the inferior automation level, or a notification relating to periphery monitoring.

More specifically, the presentation control unit 256 displays, for the overtake purpose lane, an automation level display T32 corresponding to the hands-on driving, a monitoring obligation icon T34, and a hands-on icon T35. That is, the presentation control unit 256 displays, for the overtake purpose lane, which is the lane change destination, the automation related information corresponding to the hands-on driving. The presentation control unit 256 displays, for the currently traveling lane, an automation level display T32 corresponding to the currently executed autonomous driving and an autonomous driving icon T36. The presentation control unit 256 also displays, for the currently traveling lane, a monitoring obligation icon T34 to draw attention to the periphery monitoring obligation.

In order to draw attention to the switch to the hands-on driving, the presentation control unit 256 displays a driver icon U1 in the hands-on state, and displays and blinks the hand portion. The displaying and blinking of the hand portion of the driver icon U1 ends due to the driving mode switch, that is, completion of the switch to the hands-on driving. The presentation control unit 256 also displays and blinks a line-of-sight icon U3 to improve the visibility of the line-of-sight icon U3 to draw attention to the periphery monitoring obligation. The displaying and blinking of the line-of-sight icon U3 continues until the overtake is completed.

In the present example, in the time chart V, an event icon V6 corresponding to the switch from the autonomous driving at the present time to the hands-on driving is displayed in the first segment V1. In the second segment V2, an event icon V6 corresponding to a lane change to the overtake purpose lane after the start of the hands-on driving is displayed. In the third segment V3, an event icon V6 corresponding to a return to the travel purpose lane, which will be as soon as possible after the lane change to the overtake purpose lane is performed and the above-described preceding vehicle is overtaken is displayed. Accordingly, in the time chart V, it is indicated that the first lane change from the travel purpose lane, which is the lane currently being traveled, to the overtake purpose lane will be performed, and then the second lane change to the travel purpose lane will be performed. The events corresponding to the first segment V1 to the third segment V3 are events at the present time or for a relatively short time period from the present time. Therefore, a distance display V5 is not displayed in the first segment V1 to the third segment V3.

The presentation control unit 256 displays a selective display with a guidance information display T4 and an input button display T5 in the central display region RC. More specifically, in the present example, in the guidance information display T4, information to the effect that for the overtake, the autonomous driving will be interrupted to be switched to the hands-on driving, and to the effect that immediately after completion of the overtake, a return to the travel purpose lane will be performed. As the input button display T5, a first input button display T51 for selecting keeping the currently traveling lane and the autonomous driving continuation, and a second input button display T52 for approving the overtake are displayed.

The presentation control unit 256 displays, using the HMI apparatus 20, the selective display such that the selective display is correlated with the display of the automation related information corresponding to the driving automation level. That is, the display of the input button display T5 is associated with the display of the automation level display T32. More specifically, the first input button display T51 for selecting keeping the currently traveling lane and the autonomous driving continuation is displayed on the left side in a display mode similar to the display mode of the automation level display T32 corresponding to the autonomous driving in the travel purpose lane. The second input button display T52 for approving the overtake and the switch to the hands-on driving for the overtake is displayed on the right side in a display mode similar to the display mode of the automation level display T32 corresponding to the hands-on driving in the overtake purpose lane.

(Fifteenth Display Example)

Figure 16:
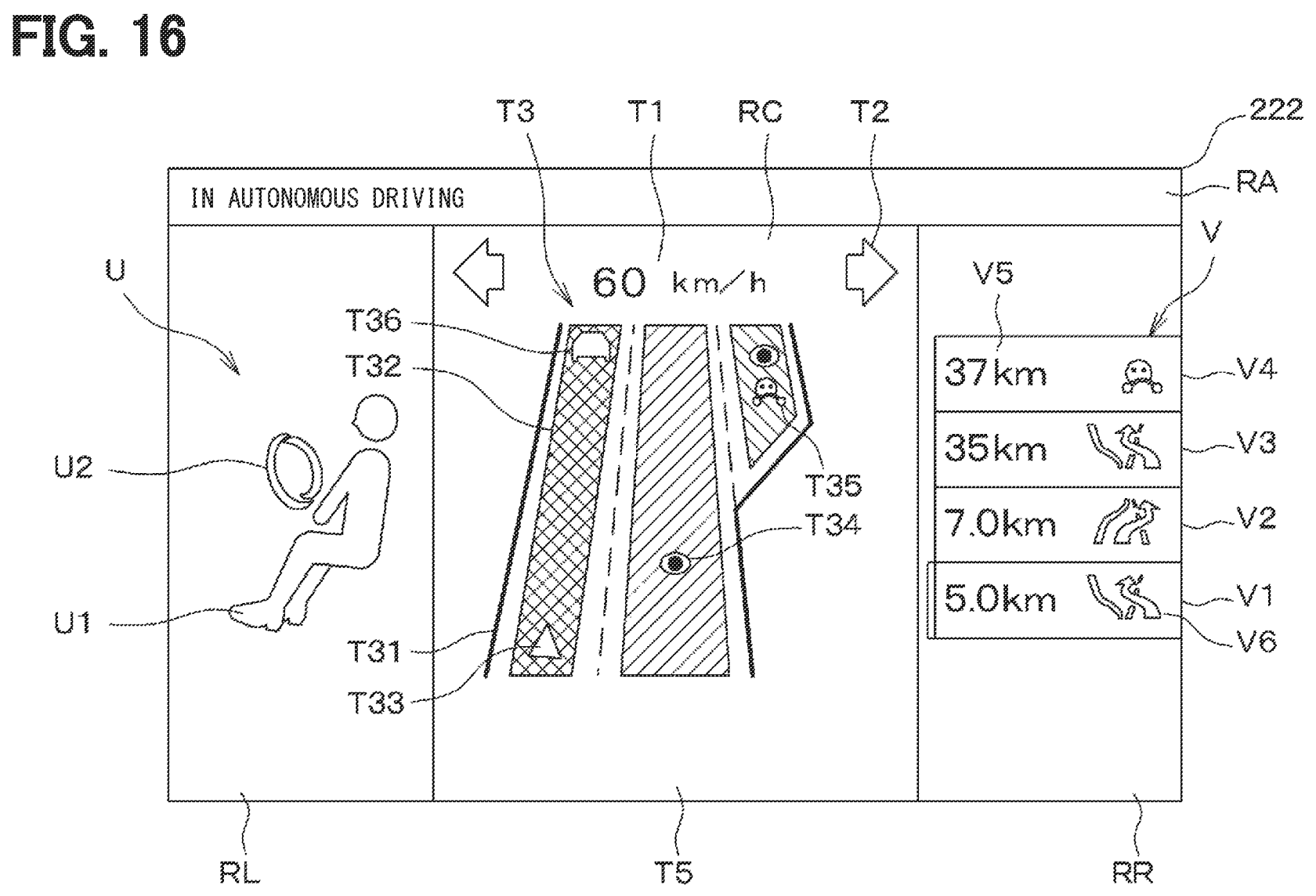

FIG. 16 illustrates a display example in a case where the number of lanes changes in the traveling road. In the present example, it is assumed that the host vehicle is in the autonomous driving in a travel purpose lane of two lanes on each side, and a new lane appears on the right side several hundred meters ahead, and thus the two lanes on each side change into three lanes on each side. In this case, the presentation control unit 256 presents, using the HMI apparatus 20, automation related information regarding all the lanes in which the host vehicle can head in the same direction as the current heading direction on the traveling road.

More specifically, in a first travel purpose lane, which is the currently traveling lane, an automation level display T32 corresponding to the autonomous driving and an autonomous driving icon T36 are displayed. In an adjacent lane, an automation level display T32 corresponding to the hands-off driving and a monitoring obligation icon T34 are displayed. An automation level display T32 corresponding to the hands-on driving, a monitoring obligation icon T34, and a hands-on icon T35 are displayed in an overtake purpose lane, which newly appears on the right side of the adjacent lane. The presentation control unit 256 presents, using the HMI apparatus 20, the automation related information substantially at the same time as an determination timing at which it is determined that the number of lanes will change. The determination timing in this case is a timing at which it is determined that the point at which the two lanes on each side change into the three lanes on each side has entered a drawing range in a graphic road display T3.

(Operation Example)

One specific example of the control operations or the control method described above and a control program corresponding to the control operations or the control method will be described with reference to the flowcharts illustrated in FIGS. 17A to 17C. In the illustrated flowcharts, "S" is an abbreviation for "step", "LC" is an abbreviation for "lane change", "RLC" is an abbreviation for "second lane change", and "LV" is an abbreviation for "level". Hereinafter, the CPU in the HMI control apparatus 25 is simply referred to as the "CPU".

In the following description, a first scene to a fourth scene are defined as follows: The first scene is a scene where there exists a possibility of lane change by the host vehicle from the currently traveling lane to the adjacent lane. The second scene is a scene where the host vehicle has entered a motorway, such as an automatically drivable road, a road for only vehicle use, on which the autonomous driving is available. The third scene is a scene where a number of lanes changes in the currently traveling road of the host vehicle. The fourth scene is a scene where the driver has executed autonomous driving start operation. The first scene to the fourth scene are collectively referred to as the "specific scenes".

Figure 17A:
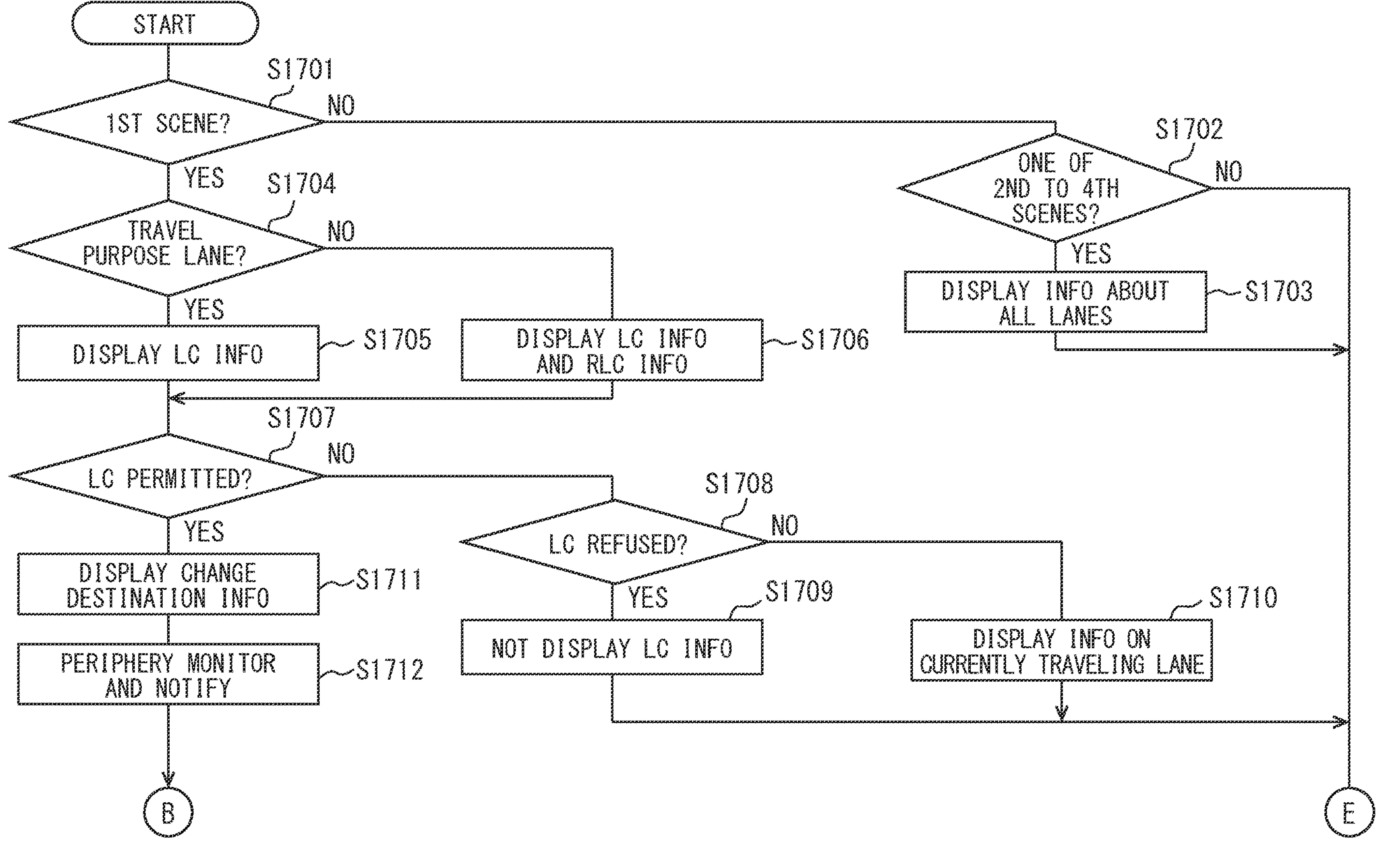
FIG. 17A is a flowchart schematically illustrating the first operation example of HMI control apparatus illustrated in FIG. 1.
Figure 17B:
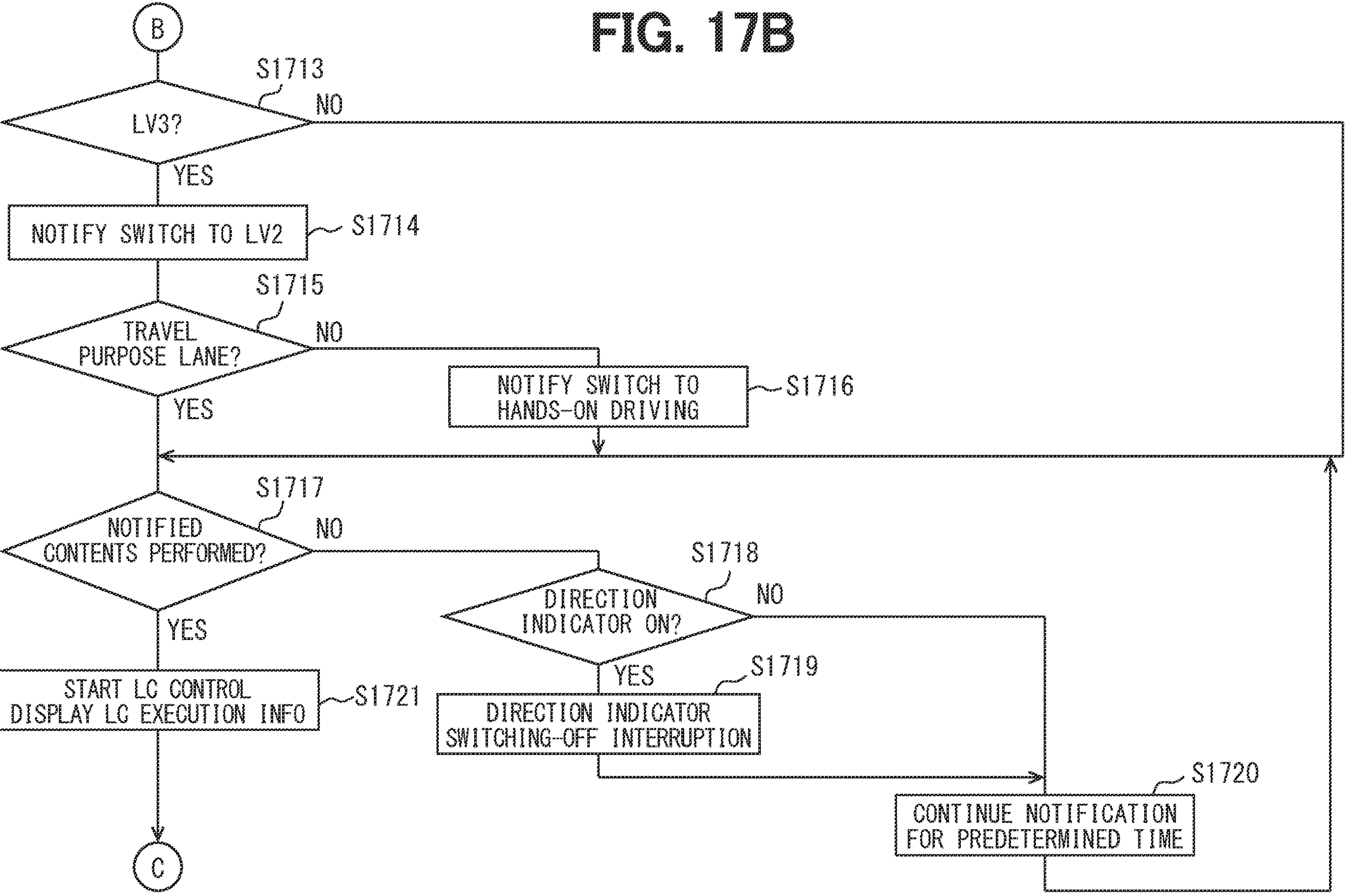
FIG. 17B is a flowchart schematically illustrating the first operation example of HMI control apparatus illustrated in FIG. 1.
Figure 17C:
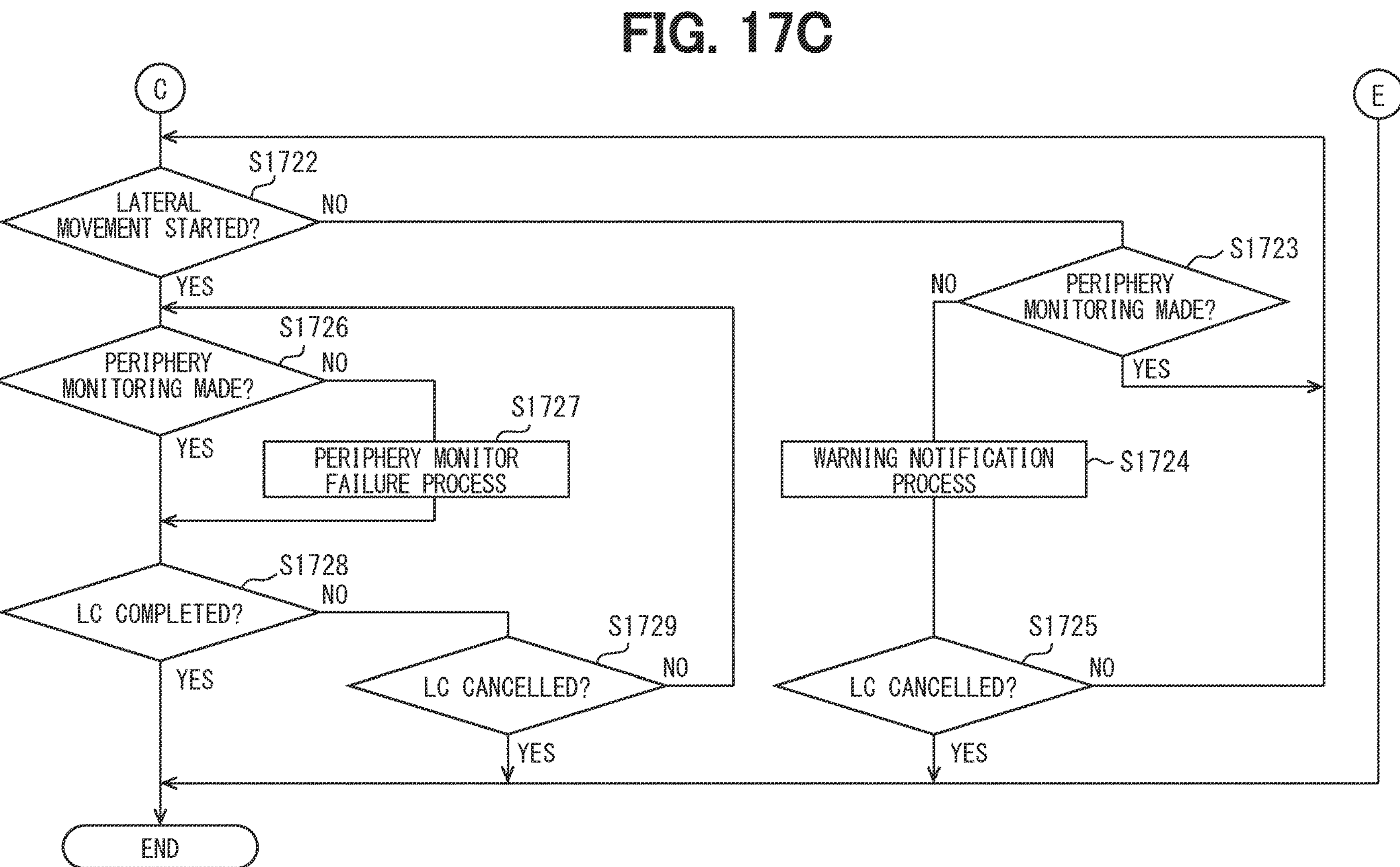
FIG. 17C is a flowchart schematically illustrating the first operation example of HMI control apparatus illustrated in FIG. 1.

When the routine illustrated in FIGS. 17A to 17C is started, first, in S1701, the CPU determines whether the scene is the first scene. In a case where the scene is not the first scene (that is, S1701: NO), the CPU makes the processing proceed to S1702. In S1702, the CPU determines whether the scene is any of the second scene to the fourth scene. That is, the processing of S1701 and S1702 corresponds to the processing for determining whether the scene is the specific scenes.

In a case where the scene is any of the second scene to the fourth scene (that is, S1702: YES), the CPU executes the processing of S1703 and then ends the present routine. In S1703, as illustrated in FIGS. 2, 6, and 16, the CPU displays automation related information regarding all the lanes using the HMI apparatus 20, that is, the meter display 222. In a case where the scene is not any of the second scene to the fourth scene (that is, S1702: NO), that is, in a case where the scene is not the specific scenes, the CPU skips the processing of S1703 and ends the present routine.

In a case where the scene is the first scene (that is, S1701: YES), the CPU makes the processing proceed to S1704. In S1704, the CPU determines whether the lane change destination is a travel purpose lane. In a case where the lane change destination is a travel purpose lane (that is, S1704: YES), the CPU makes the processing proceed to S1705. In S1705, as illustrated in FIGS. 3 and 7, the CPU displays, using the HMI apparatus 20, an HMI display for making the driver determine whether to change lanes.

In a case where the lane change destination is an overtake purpose lane (that is, S1704: NO), the CPU makes the processing proceed to S1706. In S1706, as illustrated in FIGS. 14 and 15, the CPU displays, using the HMI apparatus 20, an HMI display for making the driver determine whether to change lanes, and an HMI display indicating that after the lane change, a second lane change from the overtake purpose lane to the travel purpose lane will be performed.

As described above, according to the present embodiment, in the specific scenes where it is preferable to present automation related information to the driver, and urge a confirmation or a selection on the driver, appropriate information presentation is performed for the driver, and thus the convenience is improved. Further, the information presentation corresponding to a scene is performed, so that the convenience is further improved.

After executing the processing of S1705 or S1706 according to the determination result in S1704, the CPU makes the processing proceed to S1707. In S1707, the CPU determines whether the driver has executed input operation to the effect that the lane change is permitted.

In a case where the driver has not executed input operation to the effect that the lane change is permitted (that is, S1707: NO), the CPU makes the processing proceed to S1708. In S1708, the CPU determines whether the driver has executed input operation to the effect that the lane change is refused.

In a case where the driver executes input operation to the effect that the lane change is refused (that is, S1708: YES), the CPU executes the processing of S1709 and then ends the present routine. In S1709, as illustrated in FIG. 4, the CPU does not display an HMI display for making the driver determine whether to change lanes. Accordingly, an automation related information display and a selective display are deleted in the currently traveling lane and the adjacent lane.

In a case where the driver has not executed input operation to the effect that the lane change is refused (that is, S1708: NO), the driver has not performed any input operation relating to the lane change. Therefore, in this case, the CPU executes the processing of S1710 and then ends the present routine. In S1710, the CPU makes a transition of the display mode from an automation related information display regarding the currently traveling lane and the adjacent lane, that is, an HMI display for making the driver determine whether to change lanes, to an automation related information display regarding the currently traveling lane, as illustrated in FIG. 5.

In a case where the driver executes input operation to the effect that the lane change is permitted (that is, S1707: YES), the CPU makes the processing proceed to S1711 to S1713. In S1711, the CPU makes a transition of the display mode from an automation related information display regarding the currently traveling lane and the adjacent lane, to an automation related information display regarding the adjacent lane, which is the lane change destination, as illustrated in FIG. 8. In S1712, as illustrated in FIG. 8, the CPU executes a display for urging the driver to monitor the periphery.

In S1713, the CPU determines whether the autonomous driving not including the periphery monitoring obligation, that is, SAE level 3 is being executed. In a case where the autonomous driving is being performed (that is, S1713: YES), the CPU makes the processing proceed to S1714 and S1715. In a case where a driving automation level including the periphery monitoring obligation is being executed (that is, S1713: NO), the CPU skips the processing of S1714 to S1716 and makes the processing proceed to S1717.

In a case where the autonomous driving is being performed, it is necessary to interrupt or end the currently executed autonomous driving to change lanes. Therefore, in S1714, as illustrated in FIG. 8, the CPU executes notification processing to the effect that the autonomous driving, that is, the superior automation level will switch to the inferior automation level.

In S1715, the CPU determines whether the lane change destination is a travel purpose lane. In a case where the lane change destination is an overtake purpose lane (that is, S1715: NO), the CPU executes the processing of S1716 and then makes the processing proceed to S1717. The processing of S1716 is executed in a case where the autonomous driving is currently being performed and a lane change from a travel purpose lane to an overtake purpose lane will be executed. Therefore, in S1716, as illustrated in FIG. 15, the CPU executes notification processing to the effect that switch to the hands-on driving will be performed. In a case where the lane change destination is a travel purpose lane (that is, S1715: YES), the CPU skips the processing of S1716 and makes the processing proceed to S1717.

In S1717, the CPU determines whether the driver has performed the contents notified to the driver by the HMI apparatus 20, or more specifically, the periphery monitoring, the switch to the hands-off driving, or the switch to the hands-on driving. In a case where the driver has not performed the notified contents (that is, S1717: NO), the CPU makes the processing proceed to S1718.

In S1718, the CPU determines whether the driver has performed direction indicator operation. The "direction indicator operation" is operation for lighting or blinking the direction indicator 191 to change lanes, and is typically operation of the direction indicator switch 212.

In a case where the driver has performed the direction indicator operation (that is, S1718: YES), the CPU executes the processing of S1719 and S1720 and then returns the processing to S1717. In S1719, the CPU outputs a switching-off interruption command signal to the direction indicator ECU 19. In S1720, the CPU continues the notification to the driver for a predetermined time. In a case where the driver has not performed the direction indicator operation (that is, S1718: NO), the CPU skips the processing of S1719, executes the processing of S1720, and then returns the processing to S1717.

In a case where the driver has performed the notified contents (that is, S1717: YES), the driving control ECU 18 starts a lane change control. Therefore, the CPU makes the processing proceed to S1721 and S1722.

In S1721, as illustrated in FIG. 10, the CPU executes a lane change notification, which is a notification indicating execution of the lane change. In S1722, the CPU determines whether the lateral movement of the host vehicle has started.

If the lateral movement of the host vehicle has not started (that is, S1722: NO), the CPU makes the processing proceed to S1723. In S1723, the CPU determines whether the driver is performing periphery monitoring. In a case where the driver is performing periphery monitoring (that is, S1723: YES), the CPU returns the processing to S1722.

In a case where the driver neglects periphery monitoring before the lateral movement of the host vehicle starts (that is, S1723: NO), the CPU makes the processing proceed to S1724 and S1725. In S1724, as illustrated in FIG. 11, the CPU executes a warning notification in a case where the driver has neglected periphery monitoring.

In S1725, the CPU determines whether the lane change has been canceled. The cancellation of the lane change may be determined by, for example, input operation of the driver. Alternatively, the cancellation of the lane change may be determined by the driving control ECU 18. In a case where the lane change has been canceled (that is, S1725: YES), the CPU ends the present routine. In a case where the lane change has not been canceled (that is, S1725: NO), the CPU returns the processing to S1722.

When the lateral movement of the host vehicle starts (that is, S1722: YES), the CPU makes the processing proceed to S1726. In S1726, the CPU determines whether the driver is performing periphery monitoring.

In a case where the driver has neglected periphery monitoring during the lateral movement of the host vehicle for the lane change (that is, S1726: NO), the CPU executes the processing of S1727 and then makes the processing proceed to S1728. In S1727, as illustrated in FIG. 11, the CPU executes a warning notification in a case where the driver has neglected periphery monitoring. In a case where the driver has not neglected periphery monitoring (that is, S1726: YES), the CPU skips the processing of S1727 and makes the processing proceed to S1728.

In S1728, the CPU determines whether the lane change has been completed. In a case where the lane change is in progress (that is, S1728: NO), the CPU makes the processing proceed to S1729. In S1729, the CPU determines whether the lane change has been canceled. In a case where the lane change has not been canceled (that is, S1729: NO), the CPU returns the processing to S1726.

In a case where the lane change has been completed (that is, S1728: YES), the CPU ends the present routine. In a case where the lane change has been canceled (that is, S1729: YES), the CPU ends the present routine.

MODIFICATIONS

The present disclosure is not limited to the above embodiment. Therefore, the above embodiment can be appropriately modified. Hereinafter, representative modifications will be described. In the following description of the modifications, differences from the above embodiment will be mainly described. In the above embodiment and modifications, the same or equivalent portions are denoted by the same reference numerals. Therefore, in the following description of the modifications, the description in the above embodiment can be appropriately incorporated with respect to the components having the same reference numerals as the reference numerals in the above embodiment unless there is a technical contradiction or a special additional description.

The present disclosure is not limited to the specific apparatus configuration described in the above embodiment. That is, for example, a vehicle on which the in-vehicle system 10 is mounted is not limited to a four wheeled car. More specifically, such a vehicle may be a three wheeled car, or may be a six wheeled or eight wheeled car, such as a cargo truck. The type of the vehicle may be a conventional car including only an internal combustion engine, may be an electric car or a fuel cell car not including an internal combustion engine, or may be what is called a hybrid car. The shape and structure of the vehicle body in the vehicle are not limited to a box shape, that is, a substantially rectangular shape in plan view. The application of the vehicle, the position of the steering wheel 211 or the driver's seat, the number of the occupants, and the like are not particularly limited.

In the above embodiment, the in-vehicle system 10 is configured to be able to execute the low speed autonomous driving. However, the present disclosure is not limited to such an aspect. That is, for example, the in-vehicle system 10 may be configured to be able to execute "traffic jam autonomous driving" defined below, instead of or in addition to the low speed autonomous driving. The "traffic jam autonomous driving" is autonomous driving that enables traveling in a predetermined traffic jam speed range in a traffic jam section as a limited domain. The "traffic jam section" is a section from the head to the end of a traffic jam line. The predetermined traffic jam speed range is, for example, less than 60 km/h. According to the definitions of East Nippon Expressway Co., Ltd. and the Tokyo Metropolitan Police Department, the "traffic jam" refers to a state in which a line of vehicles traveling at a low speed or repeatedly stopping and starting at a speed equal to or lower than a threshold speed continues to a predetermined extent. The threshold speed is, for example, 20 km/h on an ordinary road, and 40 km/h on an expressway. The "predetermined extent" is, for example, 1 km or longer and 15 minutes or longer. The traffic jam autonomous driving may be executable on a road except for an automatically drivable road.

In the above embodiment, the in-vehicle system 10 is configured to be able to execute the vehicle control operation corresponding to SAE levels 1 to 3. More specifically, the in-vehicle system 10 can selectively execute any one of the hands-on driving of SAE level 2, the hands-off driving of SAE level 2, and the low speed autonomous driving of SAE level 3, as the driving automation level of SAE level 2 or higher. However, the present disclosure is not limited to such an aspect. That is, for example, the present disclosure can be suitably applied to a case where a vehicle control operation corresponding to SAE levels 1 to 5 can be executed. Further, the level or category of driving automation in the present disclosure is not limited to the level or category defined in "SAE J3016".

More specifically, the "autonomous driving" in the above embodiment is a driving automation level that corresponds to levels 3 to 5 in "SAE J3016", and at which the driving automation system is in charge of, that is, executes all the dynamic driving tasks. Therefore, the definition of the "autonomous driving" in the above embodiment naturally includes a fact that the periphery monitoring obligation is not imposed on the driver. However, the present disclosure is not limited to such an aspect.

That is, for example, depending on the definition contents of the "autonomous driving", not only the "autonomous driving not including the periphery monitoring obligation" but also the "autonomous driving including the periphery monitoring obligation" may be conceptualized. More specifically, for example, the hands-on driving and the hands-off driving in the above embodiment can also be interpreted as the "autonomous driving including the periphery monitoring obligation". The "autonomous driving" in this case is a concept including what is called "partial autonomous driving" in which the driver is in charge of, that is, executes some of the dynamic driving tasks, such as the periphery monitoring obligation. The "partial autonomous driving" can be evaluated as being substantially synonymous with "advanced driving assistance".

As described above, in the road traffic system of each country, the types and conditions of the autonomous driving (for example, the executable roads, traveling speed range, lane change approval and prohibition, and the like) can be appropriately considered according to the domestic circumstances and the like. Therefore, the present disclosure may be implemented in specifications adapted to the road traffic system of each country.

More specifically, the present disclosure can also be suitably applied to the in-vehicle system 10 adapted to a road traffic system in which a lane change is possible in the autonomous driving. In this case, the in-vehicle system 10 may be configured to be able to execute the autonomous driving even in an overtake purpose lane.

FIGS. 18 and 19 illustrate display examples corresponding to specifications with which a lane change can be executed in the autonomous driving but the autonomous driving cannot be executed in an overtake purpose lane. Specifically, for example, FIGS. 18 and 19 correspond to display examples corresponding to specifications for which a lane change can be executed if the driver performs periphery monitoring in the autonomous driving not including the periphery monitoring obligation, but the autonomous driving cannot be executed in the overtake purpose lane. With such specifications, in a case where the type of an adjacent lane is an overtake purpose lane, the presentation control unit 256 executes a notification relating to switch to the inferior automation level, as an attention drawing notification. In a case where the type of an adjacent lane is a travel purpose lane, the presentation control unit 256 executes a notification relating to periphery monitoring, as an attention drawing notification.

The example of FIG. 18 corresponds to an HMI display for making the driver determine whether to change lanes to a first travel purpose lane on the left side while the host vehicle is in the autonomous driving in a second travel purpose lane. More specifically, for example, there may be a case where the host vehicle approaches a point where the host vehicle is going to head toward the divergence side at a junction, and it is recommended to previously move to the first travel purpose lane on the left side.

In the present modification, it is possible to execute a lane change between adjacent travel purpose lanes in the autonomous driving. However, just in case, it is preferable to make the driver monitor the periphery of the host vehicle. Therefore, as described above, in a case where the type of an adjacent lane, which is a lane change destination, is a travel purpose lane, the presentation control unit 256 executes a notification relating to periphery monitoring as an attention drawing notification.

More specifically, the presentation control unit 256 displays and blinks a line-of-sight icon U3 to improve the visibility of the line-of-sight icon U3 to draw attention to periphery monitoring. The presentation control unit 256 also displays a monitoring obligation icon T34 on the first travel purpose lane, which is the lane change destination.

The presentation control unit 256 displays a selective display with a guidance information display T4 and an input button display T5 in the central display region RC. More specifically, in the present example, in the guidance information display T4, information to the effect that during the lane change, attention should be paid to the periphery of the host vehicle. As the input button display T5, a first input button display T51 for selecting a lane change to the left, and a second input button display T52 for selecting keeping the currently traveling lane are displayed. The presentation control unit 256 displays, using the HMI apparatus 20, the selective display such that the selective display is correlated with the display of the automation related information corresponding to the driving automation level. That is, the display of the input button display T5 is associated with the display of the automation level display T32.

The example of FIG. 19 corresponds to an HMI display for making the driver determine whether to change lanes to a right overtake purpose lane while the host vehicle is in the autonomous driving in a second travel purpose lane. In order to change lanes to the overtake purpose lane, the currently executed autonomous driving needs to be interrupted or ended to be switch to the hands-on driving. Therefore, as described above, in a case where the type of an adjacent lane, which is a lane change destination, is an overtake purpose lane, the presentation control unit 256 executes a notification relating to switch to the inferior automation level, that is, the hands-on driving, as an attention drawing notification.

More specifically, the presentation control unit 256 displays, for the overtake purpose lane, an automation level display T32 corresponding to the hands-on driving, a monitoring obligation icon T34, and a hands-on icon T35. That is, the presentation control unit 256 displays, for the overtake purpose lane, which is the lane change destination, the automation related information corresponding to the hands-on driving.

In order to draw attention to the switch to the hands-on driving, the presentation control unit 256 also displays a driver icon U1 in the hands-on state, and displays and blinks the hand portion. The displaying and blinking of the hand portion of the driver icon U1 ends due to completion of the switch to the hands-on driving. The presentation control unit 256 also displays and blinks a line-of-sight icon U3 to improve the visibility of the line-of-sight icon U3 to draw attention to the periphery monitoring obligation. The displaying and blinking of the line-of-sight icon U3 continues until the overtake is completed.

In the present modification in which a lane change between adjacent travel purpose lanes can be executed in the autonomous driving, the processing of S1712 and S1714 may be provided at positions different from the positions illustrated in FIGS. 17A and 17B. More specifically, in a case where the determination of S1713 is "NO", the processing of S1712 may be executed before the processing proceeds to S1717. In a case where the determination of S1715 is "YES", the processing of S1712 may be executed before the processing proceeds to S1717. Further, the processing of S1714 is moved to the position of S1716. Accordingly, the processing of S1714 is executed instead of the processing of S1716. That is, in a case where in the autonomous driving not including the periphery monitoring obligation, a lane change destination is an overtake purpose lane (that is, S1713: YES and S1715: NO), a notification relating to switch to a driving automation level including the periphery monitoring obligation is executed before the processing proceeds to S1717. Such a notification corresponds to S1714 or processing similar to S1714. In a case where in the autonomous driving not including the periphery monitoring obligation, a lane change destination is a travel purpose lane (that is, S1713: YES and S1715: YES), a notification for urging periphery monitoring (that is, S1712 or processing similar to S1712) is executed, and then the processing proceeds to S1717. In a case where the autonomous driving not including the periphery monitoring obligation is not being performed (that is, S1713: NO), a notification for urging periphery monitoring (that is, S1712 or processing similar to S1712) is executed, and then the processing proceeds to S1717. In this way, notification processing according to a driving automation level being executed and the lane type of an adjacent lane as a lane change destination can be performed.

The present disclosure can also be suitably applied to the in-vehicle system 10 adapted to a road traffic system in which "high speed autonomous driving" defined below can be executed. The "high speed autonomous driving" is autonomous driving that enables traveling in a predetermined high speed range on an automatically drivable road. The predetermined high speed range is, for example, 60 km/h or higher, and the legal speed or lower.

As a communication standard constituting the in-vehicle system 10, instead of the CAN (an international registered trademark), for example, FlexRay (an international registered trademark) or the like can also be adopted. The communication standard constituting the in-vehicle system 10 is not limited to one type. For example, the in-vehicle system 10 may include a subnetwork line conforming to a communication standard, such as LIN. The LIN is the abbreviation for Local Interconnect Network.

The vehicle state sensor 11, the outside state sensor 12, and the periphery monitoring sensor 13 are also not limited to the above example. For example, the periphery monitoring sensor 13 may include sonar, that is, an ultrasonic sensor. Alternatively, the periphery monitoring sensor 13 may include two or more types of a millimeter wave radar sensor, a sub-millimeter wave radar sensor, a laser radar sensor, and an ultrasonic sensor. The number of the installed various sensors is not particularly limited.

The locator 14 is also not limited to the above example. For example, the locator 14 may not have a configuration incorporating a gyro sensor and an acceleration sensor. More specifically, the inertia acquiring unit 142 may receive output signals from an angular velocity sensor and an acceleration sensor provided as the vehicle state sensor 11 outside the locator 14.

The DCM 15 may be omitted. That is, the traffic information may be acquired by the navigation apparatus 16. Alternatively, the navigation apparatus 16 may have a configuration including the locator 14 and the DCM 15.

The navigation apparatus 16 may be connected to the HMI control apparatus 25 via a subsidiary communication line different from the in-vehicle communication line 10A, such that the navigation apparatus 16 can communicate information with the HMI control apparatus 25.

The navigation apparatus 16 may include a display screen which is different from the HMI apparatus 20 and is dedicated to navigation screen display. Alternatively, the navigation apparatus 16 may be provided to constitute part of the HMI apparatus 20. More specifically, for example, the navigation apparatus 16 may be integrated with the CID apparatus 23.

The driver state sensing unit 17 may be connected to the HMI control apparatus 25 via a subsidiary communication line different from the in-vehicle communication line 10A, such that the driver state sensing unit 17 can communicate information with the HMI control apparatus 25.

The driver state sensing unit 17 is not limited to a configuration that senses the direction of the line of sight or the face of the driver by image recognition. That is, for example, the driver state sensing unit 17 may have a configuration in which the seated posture and the steering wheel holding state of the driver are sensed by a sensor of a type different from an image sensor.

The HMI apparatus 20 is not limited to the configuration including the meter panel 22, the CID apparatus 23, and the HUD apparatus 24. That is, for example, the HMI apparatus 20 may not include the CID apparatus 23 and/or the HUD apparatus 24.

The meter 221 and the meter display 222 may be implemented by one display device. In this case, the meter 221 may be provided as display regions at both left and right ends of the one display device, which is a liquid crystal or organic EL display. That is, the meter 221 can be implemented by displaying, as an image, a bezel, pointers, scales, and the like corresponding to a tachometer, a speedometer, a water temperature gauge, and the like. The meter display 222 may be provided as a display region in the display device except for the meter 221.

The input device 232 may include a pointing device or the like operated by the hand of the driver instead of or in addition to the touch panel superimposed on the CID display 231. The input device 232 may include a sound input apparatus that senses the utterance of the driver.

In the above embodiment, the driving control ECU 18 and the HMI control apparatus 25 have a configuration as what is called an in-vehicle microcomputer including a CPU and the like. However, the present disclosure is not limited to the configuration.

For example, all or part of the driving control ECU 18 may include a digital circuit, such as an ASIC or an FPGA, configured to be able to perform such operations as described above. The ASIC is the abbreviation for application specific integrated circuit. The FPGA is the abbreviation for field programmable gate array. That is, in the driving control ECU 18, the in-vehicle microcomputer part and the digital circuit part may coexist. The same applies to the HMI control apparatus 25.

The program according to the present disclosure that allows various operations, procedures, or processing described in the above embodiment to be executed may be downloaded or upgraded via V2X communication by the DCM 15 or the like. The V2X is the abbreviation for vehicle to X. Alternatively, the program may be downloaded or upgraded via a terminal apparatus provided in a vehicle manufacturing factory, a maintenance factory, a store, and the like. The program may be stored in a memory card, an optical disk, a magnetic disk, or the like.

As described above, each functional configuration and method described above may be implemented by a dedicated computer provided by configuring a processor and a memory programmed to execute one or a plurality of functions embodied by a computer program. Alternatively, each functional configuration and method described above may be implemented by a dedicated computer provided by configuring a processor with one or more dedicated hardware logic circuits. Alternatively, each functional configuration and method described above may be implemented by one or more dedicated computers configured with a combination of a processor and a memory programmed to execute one or a plurality of functions and a processor configured with one or more hardware logic circuits. In addition, the computer program may be stored in a computer-readable non-transitory tangible storage medium, as instructions executed by a computer. That is, each functional configuration and method described above can also be expressed as a computer program including procedures for implementing the functional configuration and method, or a non-transitory tangible storage medium storing the program.

The present disclosure is not limited to the specific functional configuration and operation examples described in the above embodiment. For example, all or part of the various information displays illustrated in FIG. 2 and the like may be executed by another HMI device instead of or together with the meter display 222. The "another HMI device" is, for example, the CID apparatus 23 and/or the HUD apparatus 24.

In addition, a display mode including display positions of various types of information displayed in the upper display region RA, the central display region RC, the left display region RL, and the right display region RR may be appropriately adjusted. More specifically, a graphic road display T3 may be superimposed and displayed on the road surface of a heading destination of the host vehicle by the HUD apparatus 24. In this case, driving lane line displays T31 can be omitted. Alternatively, driving lane line displays T31 may be displayed in a mode corresponding to a driving assistance state being executed. On the other hand, other displays may be displayed at locations that do not interfere with the graphic road display T3. The functions and configuration of the HUD apparatus 24 are also not particularly limited.

A warning notification in S1724 may include notification contents indicating a wait for a lane change. Alternatively, a warning notification in S1724 may include a notification or proposal regarding a lane change cancellation.

In a case where domestic road traffic legislation allows, a decline or temporary decline in the driving automation level at the time of a lane change may be an appearance. That is, even if periphery monitoring and/or the hands-on operation has been requested and fulfilled for a lane change, the driving automation level actually executed by the driving control ECU 18 may be unchanged before and after the lane change. More specifically, for example, at the time of a lane change, there may be a case where switch to the hands-on driving is requested. However, in such a case, even if a display corresponding to the hands-on driving is performed on the screen (for example, a display of status information in the upper display region RA), vehicle control with a higher driving automation level than the hands-on driving may be actually executed.

The above display examples may also be appropriately changed. More specifically, for example, the vehicle speed display T1 may be omitted. The direction indicator display T2 may be provided in a region except for the central display region RC in the meter display 222. Alternatively, the direction indicator display T2 may be provided outside the meter display 222 in the meter panel 22, for example.

The automation level display T32 and the like may be always displayed in all the lanes except for an adjacent lane. Alternatively, for example, the automation level display T32 and the like in the currently traveling lane are displayed or are not displayed according to the lapse of a time or the progress situation of a lane change in each of the above examples, but the present disclosure is not limited to such an aspect. That is, for example, an automation level display T32 and the like in the currently traveling lane may never be displayed. A guidance information display T4 and/or an input button display T5 may be displayed in a lower display region provided below the central display region RC or the like.

(Additional Operation Examples)

Hereinafter, additional operation examples will be described.

(First Additional Operation Example)

For example, in a situation where the superior automation level (that is, the autonomous driving) in which the driver does not need to fulfil the periphery monitoring obligation can be executed, switch to the superior automation level of the driving automation level may not be performed due to the driver's optional selection. In such a situation, if the driver has selected the autonomous driving, the driver's awareness is allowed to be away from the traffic environment around the host vehicle to the extent that the driver can freely execute a second task. Therefore, in such a situation, an automated lane change by the vehicle control unit 184 can be performed very safely without any particular inconvenience even if the driver's awareness is away from the traffic environment around the host vehicle before, after, or in the middle of the automated lane change. Therefore, in such a case, an automated lane change under the inferior automation level may be allowed regardless of whether the driver is actually performing periphery monitoring. However, just in case, it is desirable to draw the driver's attention to the periphery monitoring.

Therefore, in the present operation example, in a case where in a situation where the superior automation level can be executed, there is no switch to the superior automation level, and while the inferior automation level is being executed, a lane change request occurs, the presentation control unit 256 executes a periphery monitoring notification. The "situation" is specifically a travel situation. The "periphery monitoring notification" is a notification for requesting a driver behavior corresponding to periphery monitoring (that is, a display for urging periphery monitoring on the driver, or the like), and corresponds to, for example, processing contents similar to S1712 in the above operation example.

In addition, in a case where in a situation where the superior automation level can be executed, there is no switch to the superior automation level, and while the inferior automation level is being executed, a lane change request occurs, the vehicle control unit 184 permits, that is, executes an automated lane change even if the driver is not performing periphery monitoring. When a situation in which the superior automation level can be executed is established, the HMI apparatus 20 executes a notification to the effect that the superior automation level can be executed in order to make the driver select whether to start execution of the superior automation level. Therefore, in a case where in a situation where the superior automation level can be executed, a notification to that effect is executed, but there is no switch to the superior automation level, and while the inferior automation level is being executed, a lane change request occurs and a periphery monitoring notification is issued, the vehicle control unit 184 starts execution of the lane change even if a driver behavior corresponding to the periphery monitoring has not been confirmed after the periphery monitoring notification.

On the other hand, in a case where the inferior automation level is being executed in a situation where the superior automation level cannot be executed, the vehicle control unit 184 does not permit an automated lane change unless the driver actually monitors the periphery. That is, in this case, the vehicle control unit 184 starts execution of the lane change on condition that a driver behavior corresponding to the periphery monitoring is confirmed.

FIG. 20 illustrates a flowchart corresponding to the present operation example. This flowchart is obtained by modifying part of the flowchart illustrated in FIG. 17B. Referring to FIG. 20, in a case where a driving automation level equal to or lower than SAE level 2 including the periphery monitoring obligation is being executed (that is, S1713: NO), the CPU makes the processing proceed to S2001.

In S2001, the CPU determines whether the situation is a situation where the autonomous driving, that is, SAE level 3, which is a superior automation level not including the periphery monitoring obligation, can be executed. In a case where the situation is not a situation where the autonomous driving can be executed (that is, S2001: NO), the CPU makes the processing proceed to S1717, and determines whether the driver has fulfilled the periphery monitoring obligation. In a case where the driver has fulfilled the periphery monitoring obligation (that is, S1717: YES), the processing proceeds to S1721, the driving control ECU 18 starts a lane change control, and the CPU executes a lane change notification, which is a notification indicating the execution of the lane change. On the other hand, in a case where the situation is a situation where the autonomous driving can be executed (that is, S2001: YES), the CPU executes periphery monitoring notification processing in S2002, and then makes the processing proceed to S1721. That is, in this case, the processing of S1717, in which the fulfillment of the periphery monitoring obligation by the driver is the condition of the start of the lane change, is skipped.

Referring to FIG. 17A, in a case where the driver has executed input operation to the effect that the lane change is permitted (that is, S1707: YES), a periphery monitoring notification has already been issued by S1712. Therefore, in a case where the situation is a situation where the autonomous driving can be executed (that is, S2001: YES), the processing of S2002 for notifying the driver of periphery monitoring again just in case may be omitted. In addition, the processing of S1723 to S1727 in FIG. 17C, which imposes the periphery monitoring obligation on the driver during the lane change, may be omitted. More specifically, in a case where an determination result in S1722 is "NO", the processing returns to S1722. On the other hand, in a case where an determination result in S1722 is "YES", the processing proceeds to S1728.

(Second Additional Operation Example)

For example, even in a situation the autonomous driving (specifically, SAE level 3) in which the periphery monitoring obligation is not imposed on the driver can be executed, the driver may select the driving automation level of SAE level 2, in which the periphery monitoring obligation is imposed on the driver but the driving assistance level is high. In particular, according to the hands-off driving, among SAE level 2, in which the hands-on state in which the driver can immediately perform steering operation is not requested, the advanced driving assistance operation to the extent that there is not much difference from the autonomous driving of SAE level 3 is executed. Therefore, in such a case, an automated lane change by the vehicle control unit 184 can be performed very safely without any particular inconvenience. Therefore, in a case where in a situation where the autonomous driving, which is the superior automation level, can be executed, there is no switch to the autonomous driving, and while the driving automation level of SAE level 2 is being executed, a lane change request occurs, the presentation control unit 256 executes a notification operation corresponding to the contents of SAE level 2. More specifically, in a case where the hands-on driving, which requests, as a driver requirement, the hands-on state in which the driver can perform steering operation, is being executed, the presentation control unit 256 executes a hands-on notification for requesting the hands-on state of the driver. On the other hand, in a case where the hands-off driving, which does not request the hands-on state as a driver requirement, is being executed, the presentation control unit 256 does not execute the above-described hands-on notification.

FIG. 21 illustrates a flowchart corresponding to the present operation example. This flowchart is obtained by omitting and modifying part of the flowchart illustrated in FIG. 20. Referring to FIG. 21, in a case where a driving automation level equal to or lower than SAE level 2 including the periphery monitoring obligation is being executed (that is, S1713: NO), the CPU makes the processing proceed to S2101.

In S2101, the CPU determines whether the situation is a situation where the autonomous driving, that is, SAE level 3, which is a superior automation level not including the periphery monitoring obligation, can be executed. That is, the determination contents in S2101 are similar to the determination contents in S2001 illustrated in FIG. 20. In a case where the situation is not a situation where the autonomous driving can be executed (that is, S2101: NO), the CPU executes processing similar to the processing in a case where the determination result of S2001 in the above first additional operation example is "NO". On the other hand, in a case where the situation is a situation where the autonomous driving can be executed (that is, S2101: YES), the CPU makes the processing proceed to S2102.

In S2102, the CPU determines whether the hands-off driving is being executed. In a case where the hands-off driving is not being executed (that is, S2102: NO), the CPU makes the processing proceed to S2103. In S2103, the CPU determines whether the hands-on driving is being executed. In a case where neither the hands-on driving nor the hands-off driving is being executed (that is, S2103: NO), the CPU makes the processing proceed similarly to a case where the situation is not a situation where the autonomous driving can be executed (that is, S2101: NO).

In a case where the hands-on driving is being executed (that is, S2103: YES), the CPU executes a hands-on notification in S2104, and then makes the processing proceed to the next S (for example, S1717 or 1721). In a case where the hands-off driving is being executed (that is, S2102: YES), the processing of S2103 and S2104 is skipped.

As described above, in a case where even in a situation where the autonomous driving can be executed, the hands-off driving is being executed (that is, S2102: YES), an automated lane change can be performed very safely without any particular inconvenience. Therefore, a hands-on notification in S2104 is skipped and thus is not executed. Further, the processing of S1723 to S1727 in FIG. 17C that imposes the periphery monitoring obligation on the driver during the lane change may be omitted.

Similar expressions, such as "acquisition", "calculation", "assumption", "sensing", "detection", and "determination", can be appropriately replaced with each other within a range including no technical contradiction. "Sensing" or "detection" and "extraction" can be appropriately replaced within a range including no technical contradiction.

Needless to say, the elements constituting the above embodiment are not necessarily essential, except for cases, such as a case where it is clearly indicated that the elements are particularly essential, and a case where it is considered that the elements are obviously essential in principle. In addition, in a case where numerical values, such as the numbers, amounts, and ranges, of constituent elements are mentioned, the present disclosure is not limited to the specific numerical values, except for cases, such as a case where it is clearly indicated that the numerical values are particularly essential, and a case where the numerical values are obviously limited to the specific numerical values in principle. Similarly, in a case where the shapes, directions, positional relationships, and the like of constituent elements and the like are mentioned, the present disclosure is not limited to the shapes, directions, positional relationships, and the like, except for cases, such a case where it is clearly indicated that the shapes, directions, positional relationships, and the like are particularly essential, and a case where the shapes, directions, positional relationships, and the like are limited to specific shapes, directions, positional relationships, and the like in principle.

The modifications are also not limited to the above examples. For example, a plurality of embodiments may be combined with each other unless there is a technical contradiction. Further, a plurality of modifications may be combined with each other unless there is a technical contradiction. Further, all or part of the above embodiments and all or part of the modifications may be combined with each other unless there is a technical contradiction.

What is claimed is:

1. A human machine interface (HMI) control apparatus configured to control an HMI apparatus mounted on a host vehicle, the HMI control apparatus comprising: a lane information acquiring unit that acquires lane information including a presence state of an adjacent lane adjacent to a currently traveling lane of the host vehicle, the host vehicle having a vehicle control unit configured to perform vehicle speed control, steering control, and braking control to execute an automated lane change of the host vehicle; and a presentation control unit that displays on a display device included in the HMI apparatus, automation related information based on the lane information acquired by the lane information acquiring unit, the automation related information corresponding to a driving automation level that is executable or a driver requirement that is required to be executed by a driver, regarding the adjacent lane or a lane change from the currently traveling lane to the adjacent lane; wherein: the presentation control unit displays, on the display device, the driving automation level or the driver requirement regarding the adjacent lane, as the automation related information; the presentation control unit displays, on the display device, the driving automation level or the driver requirement regarding the currently traveling lane, as the automation related information; the presentation control unit displays, on the display device, the automation related information in specific scenes; the specific scenes include a first scene in which there is a possibility of lane change by the host vehicle from the currently traveling lane to the adjacent lane, a second scene in which the host vehicle has entered a motorway on which an autonomous driving is available, a third scene in which a quantity of lanes changes on a currently traveling road of the host vehicle, and a fourth scene in which the driver has executed an autonomous driving start operation; among the specific scenes, the presentation control unit changes a display state of the automation related information regarding lanes in the first scene from remaining specific scenes; in the first scene, the presentation control unit displays, on the display device, the driving automation level and the driver requirement for the currently traveling lane and the adjacent lane; and in the remaining specific scenes, the presentation control unit displays, on the display device, the driving automation level and the driver requirement for all lanes that have identical traveling directions to a traveling direction of the host vehicle.

2. The HMI control apparatus according to claim 1, wherein: the presentation control unit displays, on the display device, the automation related information substantially at a same time as a time when one of the specific scenes is determined.

3. The HMI control apparatus according to claim 1, wherein: the presentation control unit displays, on the display device, a selective display, which corresponds to a selection operation for selecting a planned travel lane of the host vehicle, by correlating a display mode of the selective display with a display mode of the automation related information related to the driving automation level.

4. The HMI control apparatus according to claim 1, wherein: in a case where the lane change from the currently traveling lane to the adjacent lane is not executed, the presentation control unit deletes a display of the automation related information related to the adjacent lane.

5. The HMI control apparatus according to claim 1, wherein; in a case where the vehicle control unit is executing a superior automation level, which is the driving automation level at which a periphery monitoring is not imposed on the driver as the driver requirement, the presentation control unit presents, as the automation related information, an attention drawing notification before the vehicle control unit automatically executes a lane change, and the attention drawing notification notifies, to the driver, (i) a switch from the superior automation level to an inferior automation level in which the periphery monitoring is imposed on the driver as the driver requirement, or (ii) an execution of the periphery monitoring.

6. The HMI control apparatus according to claim 5, wherein in a case where a driver behavior corresponding to the attention drawing notification is confirmed, the presentation control unit executes a lane change notification, which is a notification indicating execution of the lane change.

7. The HMI control apparatus according to claim 5, wherein in a case where a driver behavior corresponding to the attention drawing notification is not confirmed, the presentation control unit notifies that the superior automation level is being continued and executes again the attention drawing notification.

8. The HMI control apparatus according to claim 5, wherein: the display device of the HMI apparatus is configured to execute a direction indication display corresponding to a direction indication mode of a direction indicator, the display device of the HMI apparatus executes the direction indication display in response to execution of the lane change being determined, and the display device of the HMI apparatus executes a process to turn off the direction indicator in response to a driver behavior corresponding to the attention drawing notification is not confirmed.

9. The HMI control apparatus according to claim 5, wherein after a driver behavior corresponding to the attention drawing notification notifying the periphery monitoring is confirmed and before a start of execution of the lane change, in response to the driver requirement, which requires the periphery monitoring for the execution of the lane change, being not satisfied, the presentation control unit executes a notification notifying cancellation of the lane change, a notification notifying standby of the lane change, or the attention drawing notification notifying the periphery monitoring.

10. The HMI control apparatus according to claim 5, wherein after a start of execution of the lane change, in response to the driver requirement, which requires the periphery monitoring for the lane change, being not satisfied, the presentation control unit executes a notification notifying cancellation of lane change, a notification notifying return to a travelling lane before execution of lane change, or the attention drawing notification notifying the periphery monitoring.

11. The HMI control apparatus according to claim 5, wherein in a case where the host vehicle executes the lane change to overtake a preceding vehicle, the presentation control unit executes (i) the attention drawing notification notifying the periphery monitoring or (ii) a notification notifying switch to the inferior automation level.

12. The HMI control apparatus according to claim 5, wherein: the presentation control unit changes a display content of the automation related information corresponding to a lane type of the adjacent lane, when the lane type of the adjacent lane is an overtake purpose lane, the presentation control unit executes a notification notifying switch to the inferior automation level as the attention drawing notification, and when the lane type of the adjacent lane is a travel purpose lane, the presentation control unit executes a notification notifying the periphery monitoring as the attention drawing notification.

13. The HMI control apparatus according to claim 1, wherein in a case where (i) a superior automation level, which is the driving automation level at which a periphery monitoring is not imposed on the driver as the driver requirement, is available, (ii) an inferior automation level, which is the driving automation level at which the periphery monitoring is imposed on the driver as the driver requirement, is continued to be executed without switch to the superior automation level although a notification, which notifies that the superior automation level is available, is executed, and (iii) a lane change request occurs while the inferior automation level is continued to be executed, the presentation control unit outputs a notification requiring a driver behavior corresponding to the periphery monitoring.

14. The HMI control apparatus according to claim 5, wherein in a case where (i) the superior automation level is available, (ii) the inferior automation level is continued to be executed without switch to the superior automation level although a notification, which notifies that the superior automation level is available, is executed, and (iii) a lane change request occurs while the inferior automation level is continued to be executed, the presentation control unit outputs a notification requiring a driver behavior corresponding to the periphery monitoring.

15. The HMI control apparatus according to claim 5, wherein in a case where the inferior automation level is hands-on driving, which requests, as the driver requirement, a hands-on state in which the driver is able to perform a steering operation, the presentation control unit executes a hands-on notification that requests the hands-on state of the driver, and in a case where the inferior automation level is hands-off driving, which does not request the hands-on state as the driver requirement, the presentation control unit does not execute the hands-on notification.

16. A human machine interface (HMI) control apparatus configured to control an HMI apparatus mounted on a host vehicle, the HMI control apparatus comprising: a lane information acquiring unit that acquires lane information including a presence state of an adjacent lane adjacent to a currently traveling lane of the host vehicle, the host vehicle having a vehicle control unit configured to perform vehicle speed control, steering control, and braking control to execute an automated lane change of the host vehicle; and a presentation control unit that displays, on a display device included in the HMI apparatus, automation related information based on the lane information acquired by the lane information acquiring unit, the automation related information corresponding to a driving automation level that is executable or a driver requirement that is required to be executed by a driver, regarding the adjacent lane or a lane change from the currently traveling lane to the adjacent lane; wherein in a case where (i) a superior automation level, which is the driving automation level at which a periphery monitoring is not imposed on the driver as the driver requirement, is available, (ii) an inferior automation level, which is the driving automation level at which the periphery monitoring is imposed on the driver as the driver requirement, is continued to be executed without switch to the superior automation level although a notification, which notifies that the superior automation level is available, is executed, and (iii) a lane change request occurs while the inferior automation level is continued to be executed, and (iv) the inferior automation level is hands-on driving, which requests, as the driver requirement, a hands-on state in which the driver is able to perform a steering operation, the presentation control unit executes a hands-on notification that requests the hands-on state of the driver, and in a case where (i) a superior automation level, which is the driving automation level at which a periphery monitoring is not imposed on the driver as the driver requirement, is available, (ii) an inferior automation level, which is the driving automation level at which the periphery monitoring is imposed on the driver as the driver requirement, is continued to be executed without switch to the superior automation level although a notification, which notifies that the superior automation level is available, is executed, and (iii) a lane change request occurs while the inferior automation level is continued to be executed, and (iv) the inferior automation level is hands-off driving, which does not request the hands-on state as the driver requirement, the presentation control unit does not execute the hands-on notification.

* * * * *